(12) United States Patent
Dong et al.

(10) Patent No.: US 12,342,038 B2
(45) Date of Patent: Jun. 24, 2025

(54) VIDEO PROCESSING METHOD AND RELATED APPARATUS

(71) Applicant: Honor Device Co., Ltd., Shenzhen (CN)

(72) Inventors: Zhen Dong, Shenzhen (CN); Shiyu Zhu, Shenzhen (CN); Weilong Hou, Shenzhen (CN); Yuanchao Du, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/268,799

(22) PCT Filed: Dec. 30, 2022

(86) PCT No.: PCT/CN2022/143814
§ 371 (c)(1),
(2) Date: Jun. 21, 2023

(87) PCT Pub. No.: WO2023/160241
PCT Pub. Date: Aug. 31, 2023

(65) Prior Publication Data
US 2025/0024097 A1   Jan. 16, 2025

(30) Foreign Application Priority Data
Feb. 28, 2022   (CN) .......................... 202210193721.3

(51) Int. Cl.
*H04N 21/44*     (2011.01)
*H04N 21/431*    (2011.01)
*H04N 21/472*    (2011.01)
*H04N 21/845*    (2011.01)

(52) U.S. Cl.
CPC ... *H04N 21/44016* (2013.01); *H04N 21/4312* (2013.01); *H04N 21/47205* (2013.01); *H04N 21/8456* (2013.01)

(58) Field of Classification Search
CPC . A61K 6/61; A61K 6/60; A61K 6/853; A61K 6/858
See application file for complete search history.

(56) References Cited

U.S. PATENT DOCUMENTS

| | | | |
|---|---|---|---|
| 2003/0237091 A1 | 12/2003 | Toyama et al. |
| 2021/0382941 A1 | 12/2021 | Wu et al. |
| 2022/0188352 A1 | 6/2022 | Wu |
| 2022/0279239 A1 | 9/2022 | Wang et al. |

(Continued)

FOREIGN PATENT DOCUMENTS

| | | | |
|---|---|---|---|
| CN | 105245810 A | 1/2016 |
| CN | 105979188 A | 9/2016 |
| CN | 106803987 A | 6/2017 |

(Continued)

*Primary Examiner* — Anthony Bantamoi
(74) *Attorney, Agent, or Firm* — Leydig, Voit & Mayer, Ltd.

(57) ABSTRACT

This application provides a video processing method and a related apparatus, to perform scene analysis and scene transition analysis on a video recorded by a user, to delete an invalid segment from the recorded video, edit a plurality of highlight video segments from the recorded video, and fuse the plurality of highlight video segments into one highlight video. In this way, viewing experience of the video recorded by the user can be improved.

20 Claims, 48 Drawing Sheets

(56) References Cited

U.S. PATENT DOCUMENTS

2022/0385997 A1    12/2022   Zhong et al.

FOREIGN PATENT DOCUMENTS

| CN | 108965599 A | 12/2018 |
| CN | 110602546 A | 12/2019 |
| CN | 111061912 A |  4/2020 |
| CN | 111447489 A |  7/2020 |
| CN | 111866585 A | 10/2020 |
| CN | 112738557 A |  4/2021 |
| CN | 112822563 A |  5/2021 |
| CN | 113163272 A |  7/2021 |
| CN | 113709561 A | 11/2021 |
| CN | 113766314 A | 12/2021 |
| CN | 113973216 A |  1/2022 |

VIDEO PROCESSING METHOD AND RELATED APPARATUS

CROSS-REFERENCE TO RELATED APPLICATIONS

This application is a national stage of International Application No. PCT/CN2022/143814, filed on Dec. 30, 2022, which claims priority to Chinese Patent Application No. 202210193721.3, filed on Feb. 28, 2022. The disclosures of both of the aforementioned applications are hereby incorporated by reference in their entireties.

TECHNICAL FIELD

This application relates to the field of computer vision technologies, and in particular, to a video processing method and a related apparatus.

BACKGROUND

With the development of smartphones, photographing and recording has become one of most important features. With an increasingly powerful photographing and recording function of an electronic device such as a smartphone, an increasing quantity of people use an electronic device such as a smartphone to take a photo instead of a professional camera.

When a user records a video by using an electronic device such as a smartphone, the electronic device needs to fuse an image stream and an audio stream that are continuously obtained within a time period into a video stream. The video recorded by the user includes a relatively large amount of content. Therefore, when the user reviews the recorded video, the user is prone to feel tired due to excessive content in which the user has no interest and that is included in the video, resulting in poor viewing experience of the user.

SUMMARY

This application provides a video processing method and a related apparatus, to implement scene analysis and scene transition analysis on a video recorded by a user, delete a meaningless segment from the recorded video, edit a plurality of highlight video segments from the recorded video, and fuse the plurality of highlight video segments into one highlight video. In this way, viewing of the video recorded by the user is improved.

According to a first aspect, this application provides a video processing method, including: An electronic device displays a photographing interface, where the photographing interface includes a preview box and a recording start control, and a picture captured by a camera of the electronic device in real time is displayed in the preview box: the electronic device detects a first input for the recording start control: in response to the first input, the electronic device starts to record a first video: the electronic device displays a recording interface, where the recording interface includes a recording end control and a video picture that is of the first video and that is recorded by the electronic device in real time: the electronic device detects a second input for the recording end control: the electronic device ends recording the first video in response to the second input; and the electronic device stores the first video and a second video, where the first video includes a first video segment, a second video segment, and a third video segment, an end moment of the first video segment is earlier than or equal to a start moment of the second video segment, an end moment of the second video segment is earlier than or equal to a start moment of the third video segment, and the second video includes the first video segment and the third video segment, and does not include the second video segment.

According to the video processing method provided in this application, scene analysis may be performed on a video recorded by a user, an invalid segment (for example, scene switching, picture zooming, quick camera movement of a picture, or severe jerkiness of a picture) may be deleted from the recorded video, a plurality of highlight video segments in a specified photographing scene (for example, a character, Spring Festival, Christmas, an ancient building, a beach, fireworks, a plant, or a snow scene) may be edited from the recorded video, and the plurality of highlight video segments may be fused into one highlight video. In this way, viewing experience of the video recorded by the user can be improved.

In a possible implementation, duration of the first video is greater than duration of the second video, duration of the first video is less than duration of the second video, or duration of the second video is equal to duration of the second video.

In a possible implementation, before the electronic device stores the second video, the method further includes: The electronic device splices the first video segment and the third video segment in the first video, to obtain the second video.

In a possible implementation, that the electronic device splices the first video segment and the third video segment in the first video, to obtain the first video specifically includes: The electronic device splices an end location of the first video segment and a start location of the third video segment, to obtain the second video: or the electronic device splices an end location of the first video segment and a start location of a first special effect segment, and splices an end location of the first special effect segment and a start location of the third video segment, to obtain the second video.

In a possible implementation, the first video segment and the third video segment are highlight video segments, and the second video segment is an invalid video segment.

In a possible implementation, the first video further includes a fourth video segment; and if the fourth video segment is a highlight video segment, the second video includes the fourth video segment: or if the fourth video segment is an invalid video segment, the second video does not include the fourth video segment.

In a possible implementation, the highlight video segment includes a video segment that is in the first video and in which a photographing scene is a highlight scene and does not include a scene transition segment.

In a possible implementation, the highlight video segment includes a video segment that is in the first video and in which a photographing scene is a highlight scene and does not include a scene transition segment with noise or without sound.

The highlight scene includes one or more of a character, a landscape, food, Spring Festival, Christmas, a building, a beach, fireworks, a plant, a snow scene, a traveling scene, or the like.

In a possible implementation, the recording interface further includes a snapshot control, and when the electronic device displays the recording interface, the method further includes: The electronic device receives a third input from a user for the snapshot control; and in response to the third input, the electronic device stores, as a first image, a first video picture that is of the first video and that is captured when the third input is received.

In a possible implementation, after the electronic device ends recording the first video, the method further includes: The electronic device stores a third video, where the first video includes a fifth video segment and a sixth video segment, an end moment of the fifth video segment is earlier than or equal to a start moment of the sixth video segment, the third video includes the fifth video segment and the sixth video segment, and both the fifth video segment and the sixth video segment include a same photographing subject.

In a possible implementation, after the electronic device stores the first video and the second video, the method further includes: The electronic device displays a video album interface, where the video album interface includes a first option corresponding to the first video; and the electronic device displays a first video display interface of the first video after detecting a fourth input for the first option, where the first video display interface of the first video includes a first display area of the first video and a second display area of the second video, the first display area is used to display a video picture of the first video, and the second display area is used to display a video picture of the second video. In this way, the first video and the second video are classified into one video display interface, to help the user search for the first video and the second video.

In a possible implementation, after the electronic device stores the first video and the second video, the method further includes: The electronic device displays a video album interface, where the video album interface includes a first option corresponding to the first video and a second option corresponding to the second video: the electronic device displays a first video display interface of the first video after detecting a fourth input for the first option, where the first display interface of the first video includes a first display area of the first video, and the first display area is used to display a video picture of the first video; and the electronic device displays a second video display interface of the second video after detecting a fifth input for the second option, where the second display interface of the second video includes a second display area of the second video, and the second display area is used to display a video picture of the second video. In this way, the option of the first video and the option of the second video are displayed in parallel in one video album, to help the user quickly open the display interface of the first video or the display interface of the second video.

In a possible implementation, after the electronic device stores the first video and the second video, the method further includes: The electronic device displays the photographing interface, and displays a first prompt in the photographing interface, where the first prompt is used to prompt the user that the electronic device generates the second video from the recorded first video and stores the second video. In this way, the user can view the generated second video in a timely manner.

In a possible implementation, after the detecting a first input for the recording start control, the method further includes: The electronic device captures an image stream of the first video in real time by using the camera, and captures an audio stream of the first video in real time by using a microphone: the electronic device performs scene detection on the image stream of the first video, to determine a scene category of each picture frame in the image stream of the first video: the electronic device performs scene transition detection on the image stream of the first video, to determine a scene transition location at which scene transition occurs in the image stream of the first video and a scene transition category: the electronic device divides the image stream of the first video into a plurality of picture segments based on the scene category of each picture frame in the image stream of the first video, the scene transition location at which scene transition occurs in the image stream of the first video, and the scene transition category, and determines a segment theme of each of the plurality of picture segments: the electronic device determines a plurality of highlight picture segments in a highlight theme from the plurality of picture segments based on segment themes of the picture segments, and records locations of the plurality of highlight picture segments in the image stream of the first video: the electronic device mixes the image stream of the first video and the audio stream of the first video into the first video after the electronic device detects the second input for the recording end control: the electronic device extracts the first video segment and the third video segment from the original video based on the locations of the plurality of highlight picture segments in the image stream of the first video; and the electronic device generates the second video based on the first video segment and the third video segment.

In this way, scene analysis and scene transition analysis may be performed on the recorded video in a process of recording the video by the user, an invalid segment (for example, scene switching, picture zooming, quick camera movement of a picture, or severe jerkiness of a picture) may be deleted from the recorded video, a plurality of highlight video segments may be edited from the recorded video, and the plurality of highlight video segments may be fused into one highlight video. In this way, viewing experience of the video recorded by the user can be improved.

In a possible implementation, after the detecting a first input for the recording start control, the method further includes: The electronic device captures an image stream of the first video in real time by using the camera, and captures an audio stream of the first video in real time by using a microphone: the electronic device performs scene detection on the image stream of the first video, to determine a scene category of each picture frame in the image stream of the first video: the electronic device performs scene transition detection on the image stream of the first video, to determine a scene transition location at which scene transition occurs in the image stream of the first video and a scene transition category: the electronic device performs sound activation detection on the audio stream of the first video, recognizes start and end time points of a voice signal in the audio stream of the first video, and divides the audio stream of the first video into a plurality of audio segments based on the start and end time points of the voice signal: the electronic device performs audio event classification on the plurality of audio segments in the audio stream of the first video, and determines an audio event type of each of the plurality of audio segments: the electronic device divides the image stream of the first video into a plurality of picture segments based on the scene category of each picture frame in the image stream of the first video, the scene transition location at which scene transition occurs in the image stream of the first video, and the scene transition category, and determines a segment theme of each of the plurality of picture segments: the electronic device determines a plurality of audio event image segments corresponding to the plurality of audio segments in the image stream of the first video and an audio event type corresponding to each audio event image segment based on start and end time points of the plurality of audio segments and the segment theme of each of the plurality of picture segments: the electronic device divides the image stream of the first video into a plurality of picture segments based on the scene category of each picture frame in the image stream of the first video, the scene transition location at which scene transition occurs in the image stream of the first video, the scene transition category, and audio event categories of the plurality of audio event image segments, and determines a segment theme of each of the plurality of picture segments: the electronic device mixes the image stream of the first video and the audio stream of the first video into the first video after the electronic device detects the second input for the recording end control: the electronic device extracts the first video segment and the third video segment from the first video based on locations of the plurality of highlight picture segments in the image stream of the first video; and the electronic device generates the second video based on the first video segment and the third video segment.

In this way, scene analysis, scene transition analysis, and audio event analysis may be performed on the recorded video in a process of recording the video by the user, a meaningless segment may be deleted from the recorded video, a plurality of highlight video segments may be edited from the recorded video, and the plurality of highlight video segments may be fused into one highlight video. In this way, viewing experience of the video recorded by the user can be improved.

In a possible implementation, after the electronic device generates the second video, the method further includes: The electronic device adds background music to the second video; and that the electronic device stores a second video specifically includes: The electronic device stores the second video obtained after the background music is added.

In a possible implementation, the first input includes one or more of the following: a gesture input, a tap input, a double tap input, and the like.

According to a second aspect, this application provides an electronic device, including a display, a camera, one or more processors, and one or more memories. The one or more memories are coupled to the one or more processors. The one or more memories are configured to store computer program code. The computer program code includes computer instructions. When the one or more processors execute the computer instructions, the communication apparatus is enabled to perform the video processing method in any possible implementation of any one of the foregoing aspects.

According to a third aspect, this application provides a chip system. The chip system is applied to an electronic device, and the chip system includes one or more processors. The one or more processors are configured to invoke computer instructions to enable the electronic device to perform the video processing method in any possible implementation of any one of the foregoing aspects.

According to a fourth aspect, this application provides a computer storage medium, including computer instructions. When the computer instructions are run on an electronic device, the electronic device is enabled to perform the video processing method in any possible implementation of any one of the foregoing aspects.

According to a fifth aspect, this application provides a computer program product. When the computer program product is run on a computer, the computer is enabled to perform the video processing method in any possible implementation of any one of the foregoing aspects.

DESCRIPTION OF EMBODIMENTS

The technical solutions in the embodiments of this application are clearly and completely described below with reference to the accompanying drawings. In the description of the embodiments of this application, unless otherwise specified, "/" means "or". For example, A/B may represent A or B. In the text, "and/or" is merely an association relationship for describing associated objects, and indicates that three relationships may exist. For example, A and/or B may indicate the following three cases: Only A exists, both A and B exist, and only B exists. In addition, in the description of the embodiments of this application, "a plurality of" means two or more.

The following terms "first" and "second" are merely intended for descriptive purposes, and shall not be understood as an indication or implication of relative importance or an implicit indication of a quantity of indicated technical features. Therefore, features defined with "first" and "second" may explicitly or implicitly include one or more features. In the description of the embodiments of this application, unless otherwise stated, "a plurality of" means two or more.

The term "user interface (UI)" in the following embodiments of this application is a medium interface for interaction and information exchange between an application or an operating system and a user, and implements conversion between an internal form of information and a form that can be accepted by the user. The user interface is source code written in a specific computer language such as java or an extensible markup language (XML). Interface source code is parsed and rendered on an electronic device, and is finally presented as content that can be recognized by the user. The user interface is usually in a representation form of a graphical user interface (GUI), and the graphical user interface is a user interface that is related to a computer operation and that is displayed in a graphical manner. The user interface may be a visual interface element such as a text, an icon, a button, a menu, a tab, a text box, a dialog box, a status bar, a navigation bar, or a widget displayed on a display of the electronic device.

Figure 1:
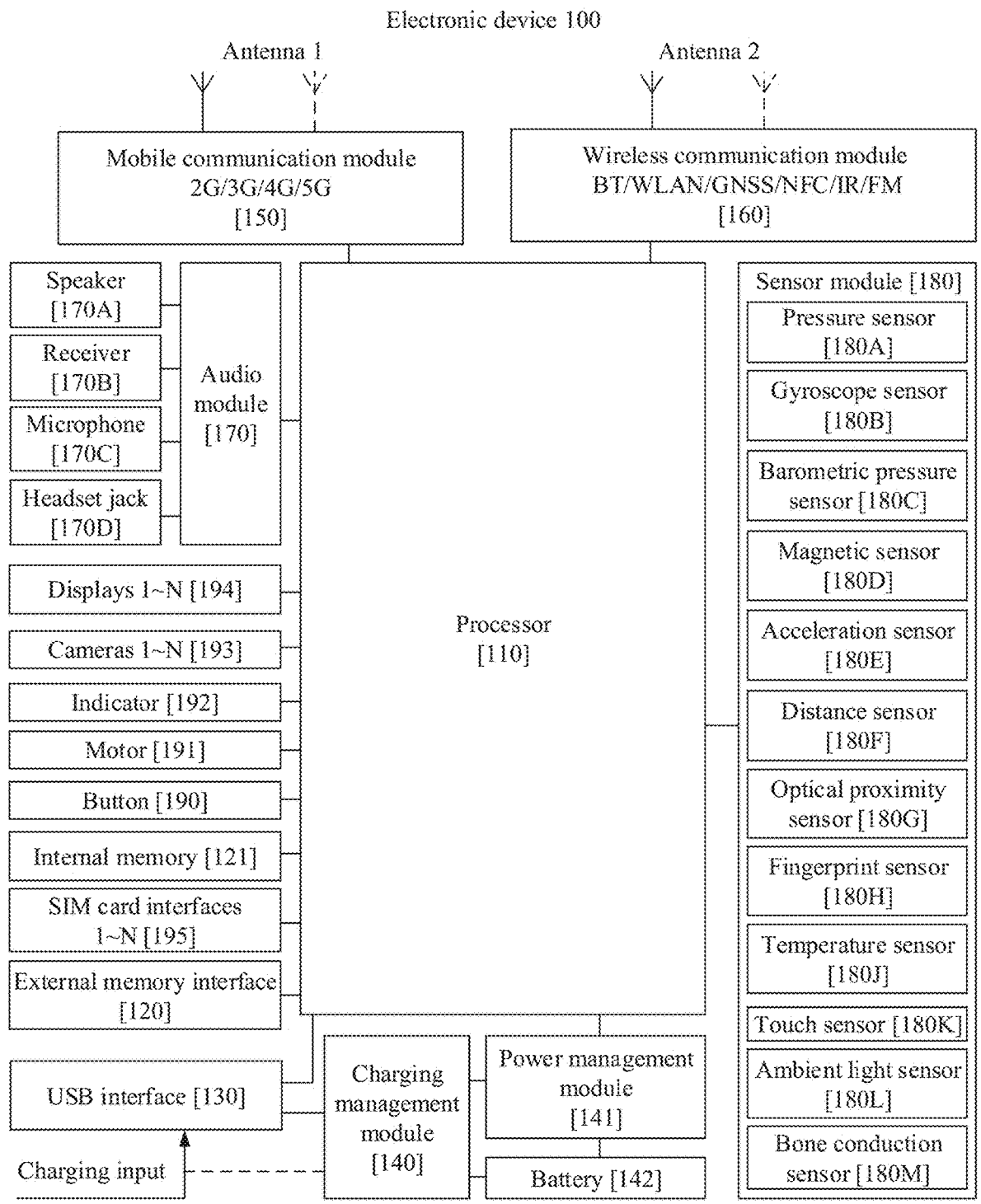
FIG. 1 is a schematic diagram of a hardware structure of an electronic device according to an embodiment of this application.

FIG. 1 is a schematic diagram of a structure of an electronic device 100.

This embodiment is described in detail below by using the electronic device 100 as an example. It should be understood that the electronic device 100 shown in FIG. 1 is merely an example, and the electronic device 100 may have more or fewer components than those shown in FIG. 1, may combine two or more components, or may have different component configurations. Various components shown in the figure may be implemented in hardware, software, or a combination of hardware and software including one or more signal processing and/or application-specific integrated circuits.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present disclosure does not constitute a specific limitation on the electronic device 100. In some other embodiments of this application, the electronic device 100 may include more or fewer components than those shown in the figure, combine some components, split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

The controller may be a nerve center and command center of the electronic device 100. The controller may generate an operation control signal based on instruction operation code and a time sequence signal, to control instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

In some embodiments, the processor 110 may include one or more interfaces. The interfaces may include an inter-integrated circuit (I2C) interface, an inter-integrated circuit sound (I2S) interface, a pulse code modulation (PCM) interface, a universal serial bus (USB) interface, and/or the like.

The electronic device 100 implements a display function by using the GPU, the display 194, the application processor, and the like. The GPU is a microprocessor for image processing, and is connected to the display 194 and the application processor. The GPU is configured to perform mathematical and geometric calculation for graphics rendering. The processor 110 may include one or more GPUs. The one or more GPUs execute program instructions to generate or change display information.

The display 194 is configured to display an image, a video, and the like. The display 194 includes a display panel. The display panel may be a liquid crystal display (LCD). Alternatively, the display panel may be manufactured by using an organic light-emitting diode (OLED), an active-matrix organic light emitting diode (AMOLED), a flexible light-emitting diode (FLED), a mini LED, a micro LED, a micro OLED, a quantum dot light emitting diode (QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise and brightness of the image. The ISP may further optimize parameters such as exposure and a color temperature of a photographing scene. In some embodiments, the ISP may be disposed in the camera 193.

The camera 193 is configured to capture a still image or a video. An optical image is generated for an object by using the lens and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more video codecs. In this way, the electronic device 100 may play or record videos in a plurality of encoding formats, for example, moving picture experts group (MPEG) 1, MPEG2, MPEG3, and MPEG4.

The NPU is a neural-network (NN) computing processor that quickly processes input information by referring to a biological neural network structure, for example, by referring to a transmission mode between human brain neurons, and may further perform self-learning continuously. Applications such as intelligent cognition of the electronic device 100 may be implemented by using the NPU, for example, image recognition, facial recognition, speech recognition, and text understanding.

The external memory interface 120 may be configured to be connected to an external storage card, for example, a micro SD card, to expand a storage capacity of the electronic device 100. The external storage card communicates with the processor 110 through the external memory interface 120, to implement a data storage function. For example, files such as music and a video are stored in the external storage card.

The internal memory 121 may be configured to store computer-executable program code, and the executable program code includes instructions. The processor 110 runs the instructions stored in the internal memory 121, to perform various function applications and data processing of the electronic device 100. The internal memory 121 may include a program storage area and a data storage area.

The electronic device 100 may implement an audio function, for example, music playing or sound recording, by using the audio module 170, the speaker 170A, the receiver 170B, the microphone 170C, the headset jack 170D, the application processor, and the like.

The audio module 170 is configured to convert digital audio information into an analog audio signal for output, and is further configured to convert an analog audio input into a digital audio signal. The audio module 170 may be further configured to encode and decode an audio signal. In some embodiments, the audio module 170 may be disposed in the processor 110, or some functional modules in the audio module 170 may be disposed in the processor 110.

The speaker 170A, also referred to as a "loudspeaker", is configured to convert an audio electrical signal into a sound signal. The electronic device 100 may listen to music or answer a call in a hands-free mode by using the speaker 170A.

The receiver 170B, also referred to as an "earpiece", is configured to convert an audio electrical signal into a sound signal. When the electronic device 100 is used to answer a call or listen to voice information, a voice may be listened to by placing the receiver 170B close to a human ear.

The microphone 170C, also referred to as a "mic" or "mike", is configured to convert a sound signal into an electrical signal. When making a call or sending voice information, a user may make a sound by approaching the mouth to the microphone 170C, to input a sound signal to the microphone 170C. The electronic device 100 may be provided with at least one microphone 170C.

The headset jack 170D is configured to be connected to a wired headset. The headset jack 170D may be the USB interface 130, or may be a 3.5 mm open mobile terminal platform (OMTP) standard interface or a cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor.

The gyroscope sensor 180B may be configured to determine a moving posture of the electronic device 100. In some embodiments, angular velocities of the electronic device 100 around three axes (namely, an x axis, a y axis, and a z axis) may be determined by using the gyroscope sensor 180B. The gyroscope sensor 180B may be configured to implement image stabilization during photographing. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may be further used in a navigation scenario and a motion sensing game scenario.

The acceleration sensor 180E may detect magnitudes of acceleration in various directions (usually on three axes) of the electronic device 100, may detect a magnitude and a direction of gravity when the electronic device 100 is still, and may be further configured to recognize a posture of the electronic device, and is applied to applications such as switching between a landscape mode and a portrait mode and a pedometer.

The distance sensor 180F is configured to measure a distance. The electronic device 100 may measure the distance in an infrared or a laser manner. In some embodiments, in a photographing scene, the electronic device 100 may measure a distance by using the distance sensor 180F, to implement fast focusing.

The fingerprint sensor 180H is configured to collect a fingerprint. The electronic device 100 may implement fingerprint unlock, application lock accessing, fingerprint-based photographing, fingerprint-based call answering, and the like by using a feature of the collected fingerprint.

The temperature sensor 180J is configured to detect a temperature. In some embodiments, the electronic device 100 executes a temperature processing policy by using the temperature detected by the temperature sensor 180J.

The touch sensor 180K is also referred to as a "touch panel". The touch sensor 180K may be disposed on the display 194. The touch sensor 180K and the display 194 form a touchscreen, which is also referred to as a "touchscreen". The touch sensor 180K is configured to detect a touch operation performed on or near the touch sensor 180K. The touch sensor may transmit the detected touch operation to the application processor, to determine a type of a touch event. A visual output related to the touch operation may be provided by using the display 194. In some other embodiments, the touch sensor 180K may alternatively be disposed on a surface of the electronic device 100, and is at a location different from that of the display 194.

Figure 2:
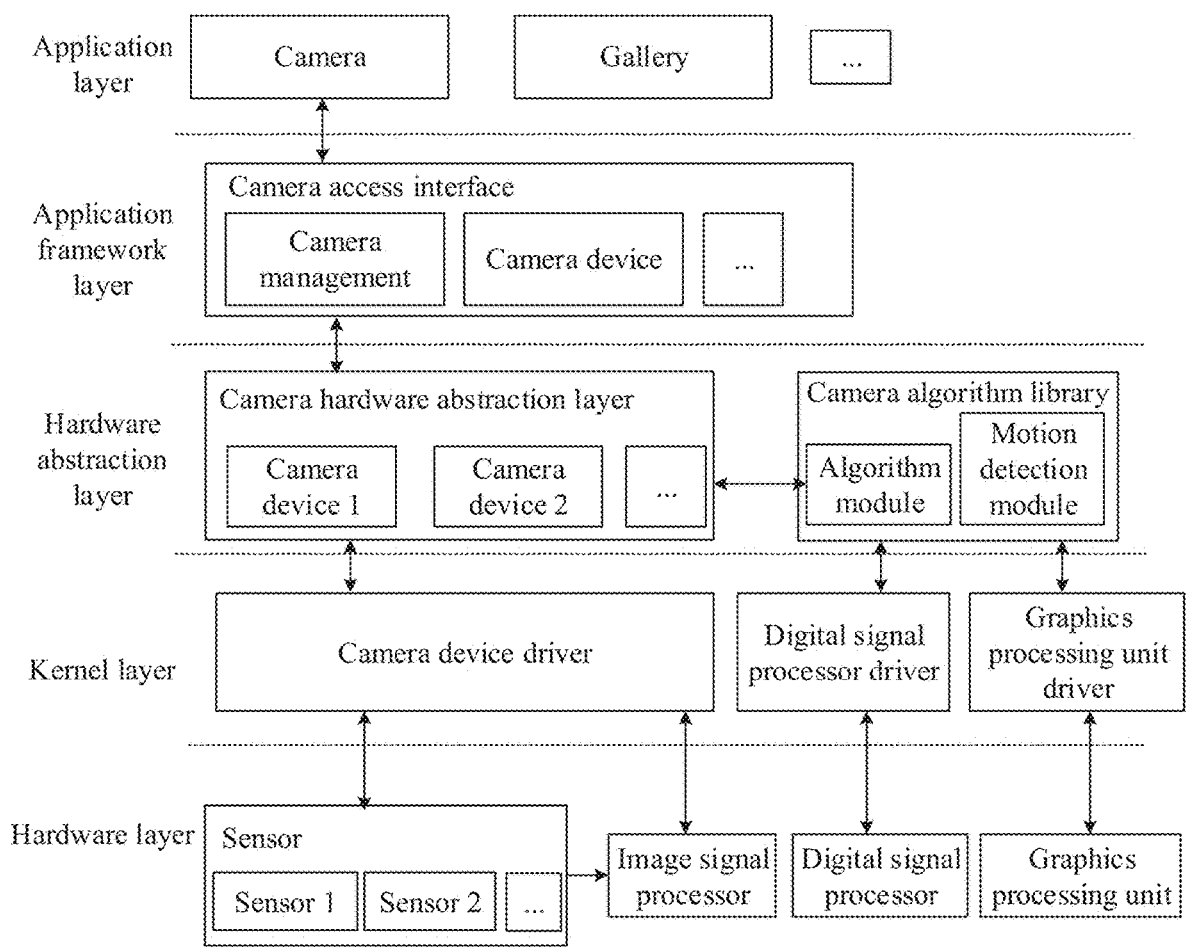
FIG. 2 is a schematic diagram of a software architecture of an electronic device according to an embodiment of this application.

FIG. 2 is an example of a schematic diagram of a software architecture of an electronic device according to an embodiment of this application.

As shown in FIG. 2, a layered architecture divides a system into several layers, and each layer has a clear function and task. The layers communicate with each other through a software interface. In some embodiments, the system is divided into five layers: an application layer, an application framework layer, a hardware abstraction layer, a kernel layer, and a hardware layer from top to bottom.

The application layer may include a series of application packages.

The application packages may include Camera, Gallery, and the like.

The application framework layer provides an application programming interface (API) and a programming framework for an application at the application layer. The application framework layer includes some predefined functions.

For example, the application framework layer may include a camera access interface. The camera access interface may include camera management and a camera device. The camera access interface is configured to provide an application programming interface and a programming framework for a camera application.

The hardware abstraction layer is an interface layer located between the application framework layer and the kernel layer, and provides a virtual hardware platform for an operating system.

In this embodiment of this application, the hardware abstraction layer may include a camera hardware abstraction layer and a camera algorithm library.

The camera hardware abstraction layer may provide virtual hardware for a camera device 1 (a first camera) and a camera device 2 (a second camera). The camera hardware abstraction layer may further obtain posture data, and transmit the posture data to the camera algorithm library. The camera hardware abstraction layer may be further configured to: calculate a quantity N of to-be-spliced images; and obtain information from the camera algorithm library.

The camera algorithm library may include an algorithm module and a running detection module.

The algorithm module includes several algorithms for image processing, and may be configured to implement splicing of the N to-be-spliced images and other processing.

The motion detection module may be configured to calculate whether a current photographing scene of the electronic device moves.

The kernel layer is a layer between hardware and software. The kernel layer includes various hardware drivers.

In some embodiments, the kernel layer may include a camera device driver, a digital signal processor driver, a graphics processing unit driver, and the like.

The camera device driver is configured to drive a sensor of a camera to capture an image, and drive an image signal processor to preprocess an image.

The digital signal processor driver is configured to drive a digital signal processor to process an image.

The graphics processing unit driver is configured to drive a graphics processing unit to process an image.

The method in the embodiments of this application is described in detail below with reference to the foregoing hardware structure and system structure.

1. An electronic device 100 enables a recording function to obtain an image stream and an audio stream.

Step 1 is continuously performed. In response to an operation (for example, a tap operation) performed by a user for a recording start control in a photographing interface, a camera application invokes a camera access interface at an application framework layer, to start the camera application, and further invokes a camera device 1 (a first camera) at a camera hardware abstraction layer to send a recording start instruction. The camera hardware abstraction layer sends the instruction to a camera device driver at a kernel layer. The camera device driver may start a sensor (a sensor 1) of a first camera in cameras, to capture an image optical signal by using the sensor 1. The image optical signal is transmitted to an image signal processor for preprocessing, to obtain the image stream (at least two original image frames constitute an image sequence), and then the original stream is transmitted to the camera hardware abstraction layer by using the camera device driver. The camera application further sends a recording start instruction through an audio input unit at an audio hardware abstraction layer. The audio hardware abstraction layer sends the instruction to an audio driver at the kernel layer. The audio driver may start a microphone to capture an audio signal, to obtain the audio stream.

2. The electronic device 100 obtains a processed stream based on the image stream.

Step 2 is continuously performed. The camera hardware abstraction layer may send the original stream to a camera algorithm library. Based on support of a digital signal processor and a graphics processing unit, the camera algorithm library may first downsample the original stream to obtain a processed low-resolution stream.

3. The electronic device 100 performs scene detection and scene transition detection on an image frame in the processed stream, to determine a highlight picture segment.

Step 3 is continuously performed. Based on support of the digital signal processor and the graphics processing unit, the camera algorithm library may invoke a scene detection algorithm, a scene transition detection algorithm, and the like to detect a scene category of each picture frame in the image stream, a scene transition location at which scene transition occurs, a scene transition category, and the like, so as to determine the highlight picture segment.

4. The electronic device 100 mixes the image stream and the audio stream into an original video.

Based on support of the digital signal processor and the graphics processing unit, the image stream and the audio stream may be mixed into the original video based on a same time track.

5. The electronic device 100 may extract a plurality of highlight video segments from the original video based on a location of the highlight picture segment, and fuse the plurality of highlight video segments into one highlight video.

The camera algorithm library may invoke an editing algorithm and a fusion algorithm to extract a plurality of highlight video segments from a video stream based on the location of the highlight picture segment, and fuse the plurality of highlight video segments into one highlight video. The highlight video segment includes a video segment that is in the original video and in which a photographing scene is a highlight scene and does not include a scene transition segment. Alternatively, the highlight video segment includes a video segment that is in the original video and in which a photographing scene is a highlight scene and does not include a scene transition segment with noise or without sound. The highlight scene includes one or more of a character, a landscape, food, Spring Festival, Christmas, a building, a beach, fireworks, a plant, a snow scene, a traveling scene, or the like.

6. The electronic device 100 may store the highlight video and the original video.

The camera algorithm library may send the highlight video to the camera hardware abstraction layer. Then, the camera hardware abstraction layer may store the highlight video.

The embodiments of this application provide a video processing method in which scene analysis may be performed on a video recorded by a user, an invalid segment (for example, scene switching, picture zooming, quick camera movement of a picture, or severe jerkiness of a picture) may be deleted from the recorded video, a plurality of highlight video segments in a specified photographing scene (for example, a character, Spring Festival, Christmas, an ancient building, a beach, fireworks, a plant, or a snow scene) may be edited from the recorded video, and the plurality of highlight video segments may be fused into one highlight video. In this way, viewing experience of the video recorded by the user can be improved.

A video processing method provided in an embodiment of this application is described below with reference to application scenarios.

In some application scenarios, a user may record a video in a normal video mode in a camera application in an electronic device 100. In a process in which the electronic device 100 records a video, the electronic device 100 may recognize and edit a plurality of highlight video segments in a highlight scene from the recorded original video, and fuse the plurality of highlight video segments into one highlight video. After ending recording of the video, the electronic device 100 may store the original video and the highlight video. In this way, viewing experience of the video recorded by the user can be improved.

Figure 3A:
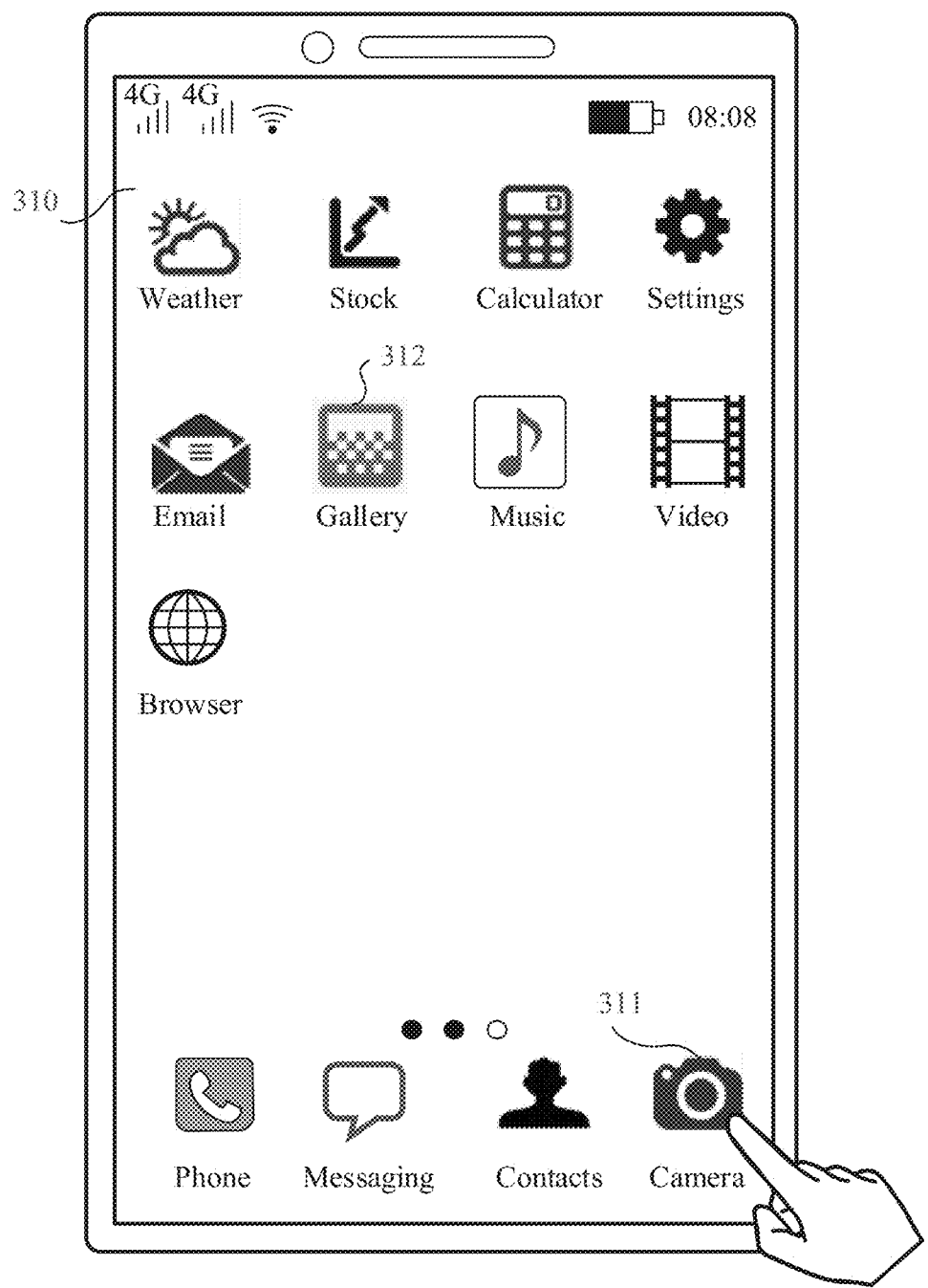
FIG. 3A-FIG. 3I are schematic diagrams of a group of recording interfaces according to an embodiment of this application.

For example, as shown in FIG. 3A, the electronic device 100 may display a home screen 310. A page on which an application icon is placed is displayed on the home screen 310. The page includes a plurality of application icons (for example, a weather application icon, a stock application icon, a calculator application icon, a settings application icon, an email application icon, a gallery application icon 312, a music application icon, a video application icon, and a browser application icon). A page indicator may be further displayed and included below the plurality of application icons, to indicate a location relationship between the currently displayed page and another page. There are a plurality of tray icons (for example, a phone application icon, a messaging application icon, a contacts application icon, and a camera application icon 311) below the page indicator, and the tray icon remains displayed during page switching. In some embodiments, the page may include a plurality of application icons and a page indicator. The page indicator may not be a part of the page, and may exist alone. The tray icon is also optional. This is not limited in this embodiment of this application.

The electronic device 100 may receive an input operation (for example, a tap) performed by the user on the camera application icon 311. In response to the input operation, the electronic device 100 may display a photographing interface 320 shown in FIG. 3B.

Figure 3B:
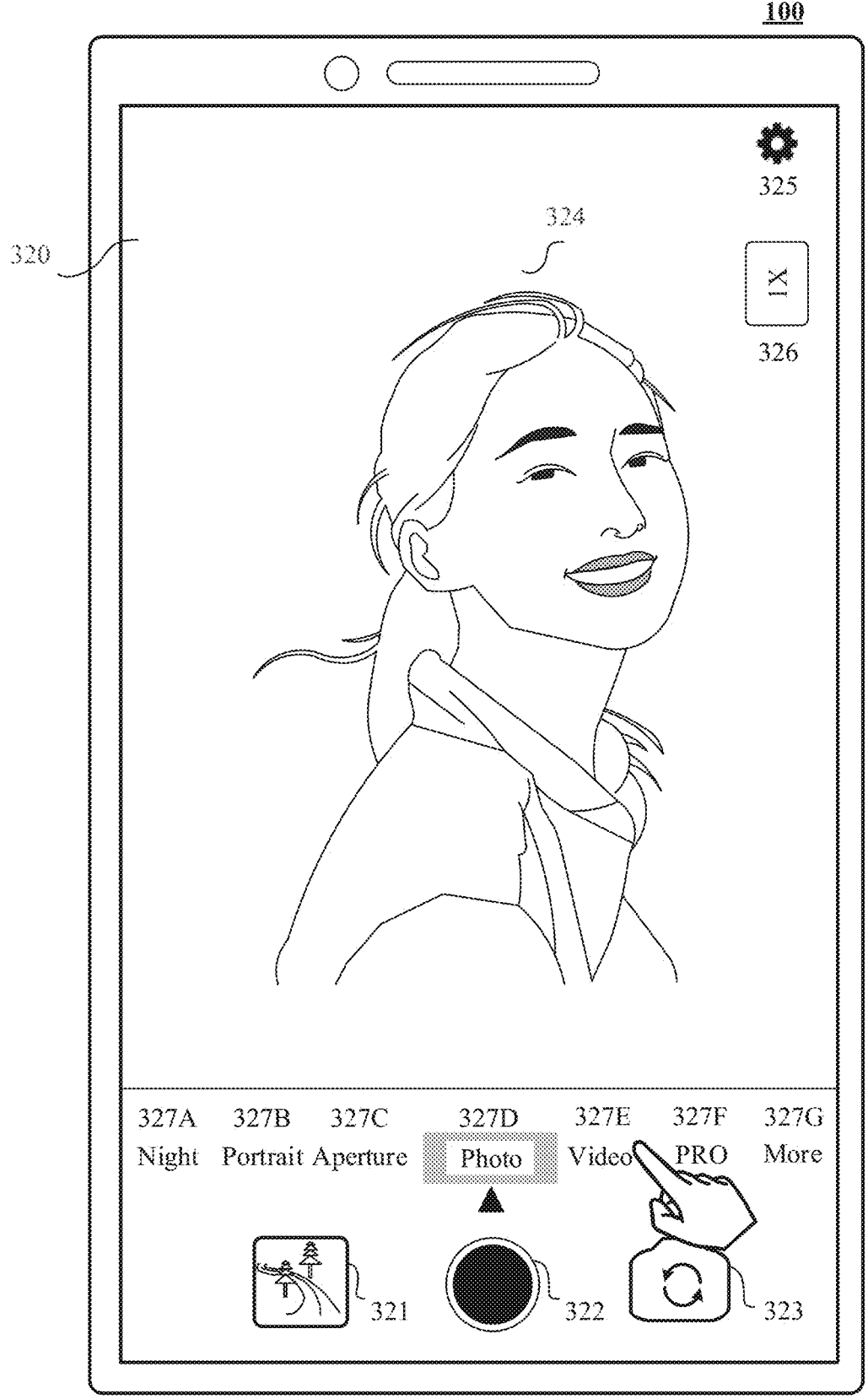

As shown in FIG. 3B, the photographing interface 320 may include an echo control 321, a photographing control 322, a camera switching control 323, a preview box, a settings control 325, a zoom ratio control 326, and one or more photographing mode controls (for example, a "night" control 327A, a "portrait" control 327B, an "aperture" control 327C, a "photo" control 327D, a "video" control 327E, a "professional" control 327F, and a "more" control 327G). A preview picture 324 is displayed in the preview box. The echo control 321 may be used to display a captured image. The photographing control 322 is used to trigger storage of an image captured by a camera. The camera switching control 323 may be used to switch a camera for photographing. The settings control 325 may be used to set a photographing function. The zoom ratio control 326 may be used to set a zoom ratio of the camera. The photographing mode control may be used to trigger start of an image processing procedure corresponding to the photographing mode. For example, the "night" control 327A may be used to trigger an increase in brightness and color richness in a captured image. The "portrait" control 327B may be used to trigger beautification of a portrait in a captured image. As shown in FIG. 3B, a photographing mode currently selected by the user is "photo".

Figure 3C:
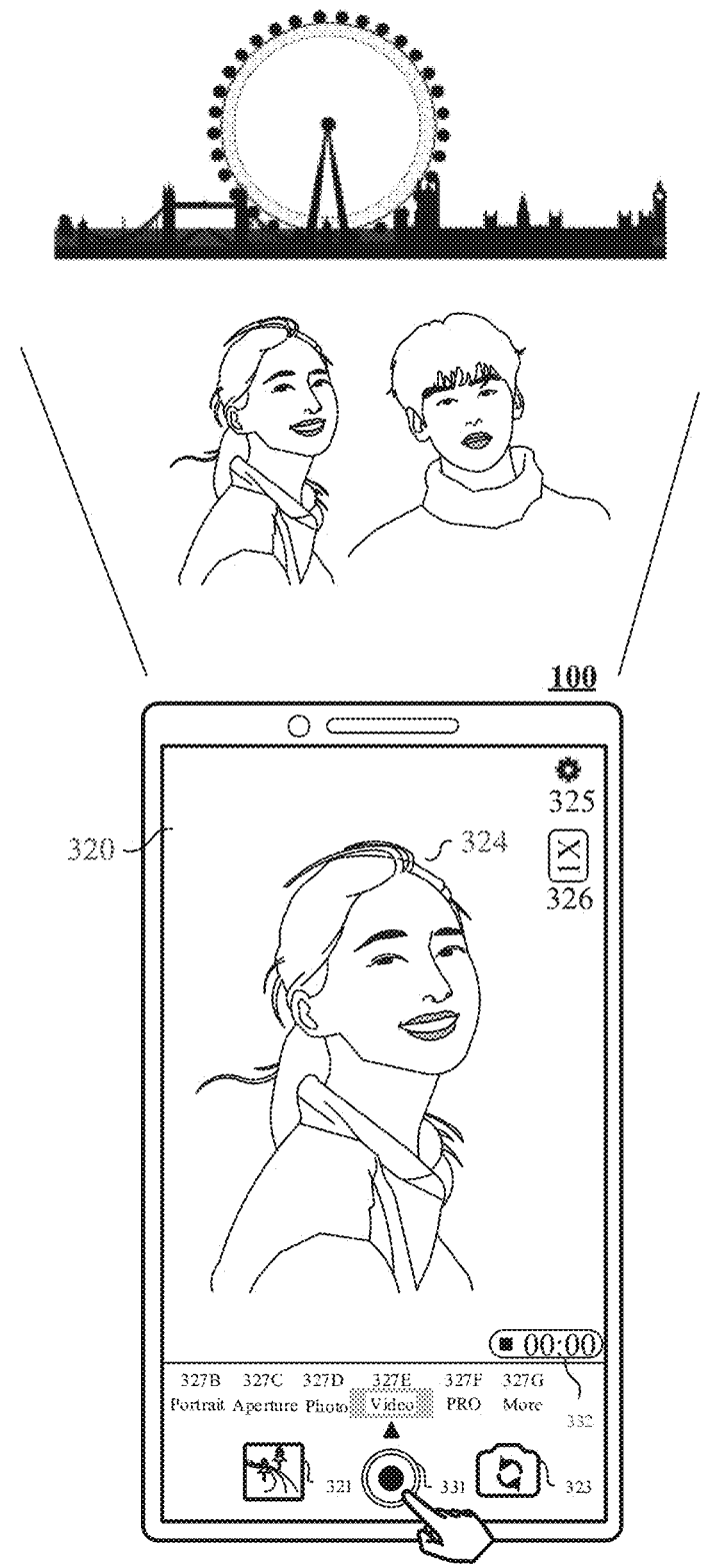

The electronic device 100 may receive an input (for example, a tap) of selecting the "video" control 327E by the user. As shown in FIG. 3C, in response to the input, the electronic device 100 may switch from "photo" to "video", and replace the photographing control 322 with the recording start control 331. The electronic device 100 may further display recording time information 332.

As shown in FIG. 3C, when the electronic device 100 performs recording, the camera of the electronic device 100 is aligned with a character A, a character B, and a Ferris wheel. The electronic device 100 may receive a first input (for example, a tap) from the user on the recording start control 331. In response to the first input, the electronic device 100 may start to record a video. For example, after starting to record a video, the user may photograph the character A within a time period from 0 s to 3 s after recording is started: perform, within a time period from 3 s to 5 s after recording is started, scene transition from the character A to photograph the character B: photograph the character B within a time period from 5 s to 7 s after recording is started: perform, within a time period from 7 s to 9 s after recording is started, scene transition from the character B to photograph the Ferris wheel: photograph the Ferris wheel within a time period from 9 s to 11 s after recording is started: perform, within a time period from 11 s to 13 s after recording is started, picture zooming to photograph details of the Ferris wheel, but obtain a blurred picture: continue to photograph the Ferris wheel within a time period from 13 s to 15 s after recording is started: perform, within a time period from 15 s to 17 s after recording is started, scene transition from the Ferris wheel to shoot a panorama that includes the character A, the character B, and the Ferris wheel; and shoot the panorama that includes the character A, the character B, and the Ferris wheel within a time period from 17 s to 20 s after recording is started.

Figure 3D:

As shown in FIG. 3D, after starting to record a video, the electronic device 100 may display a recording interface 330. The recording interface 330 includes a recording end control 333, a photographing control 334, recording time information 332, and a recording picture. The recording end control 333 may be used to trigger the electronic device 100 to end recording of the video. The photographing control 334 may be used to trigger, in response to a third input from the user, the electronic device 100 to store, as a first image, a first video picture that is of the first video and that is captured by the camera of the electronic device 100 when the third input is received.

The original video recorded by the electronic device 100 may include a plurality of highlight video segments in a highlight scene. The highlight scene may include one or more of a character, a landscape, food, Spring Festival, Christmas, a building, a beach, fireworks, a plant, a snow scene, a traveling scene, or the like.

Figure 3E:
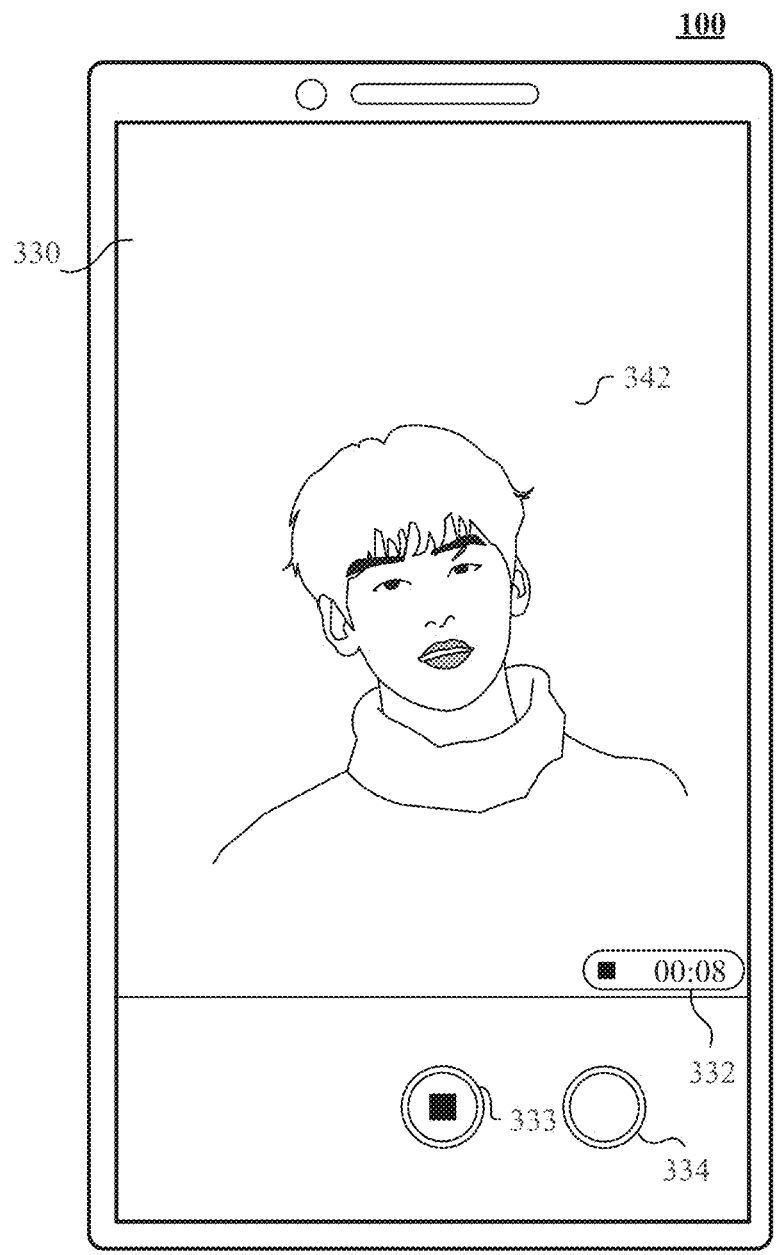
Figure 3F:
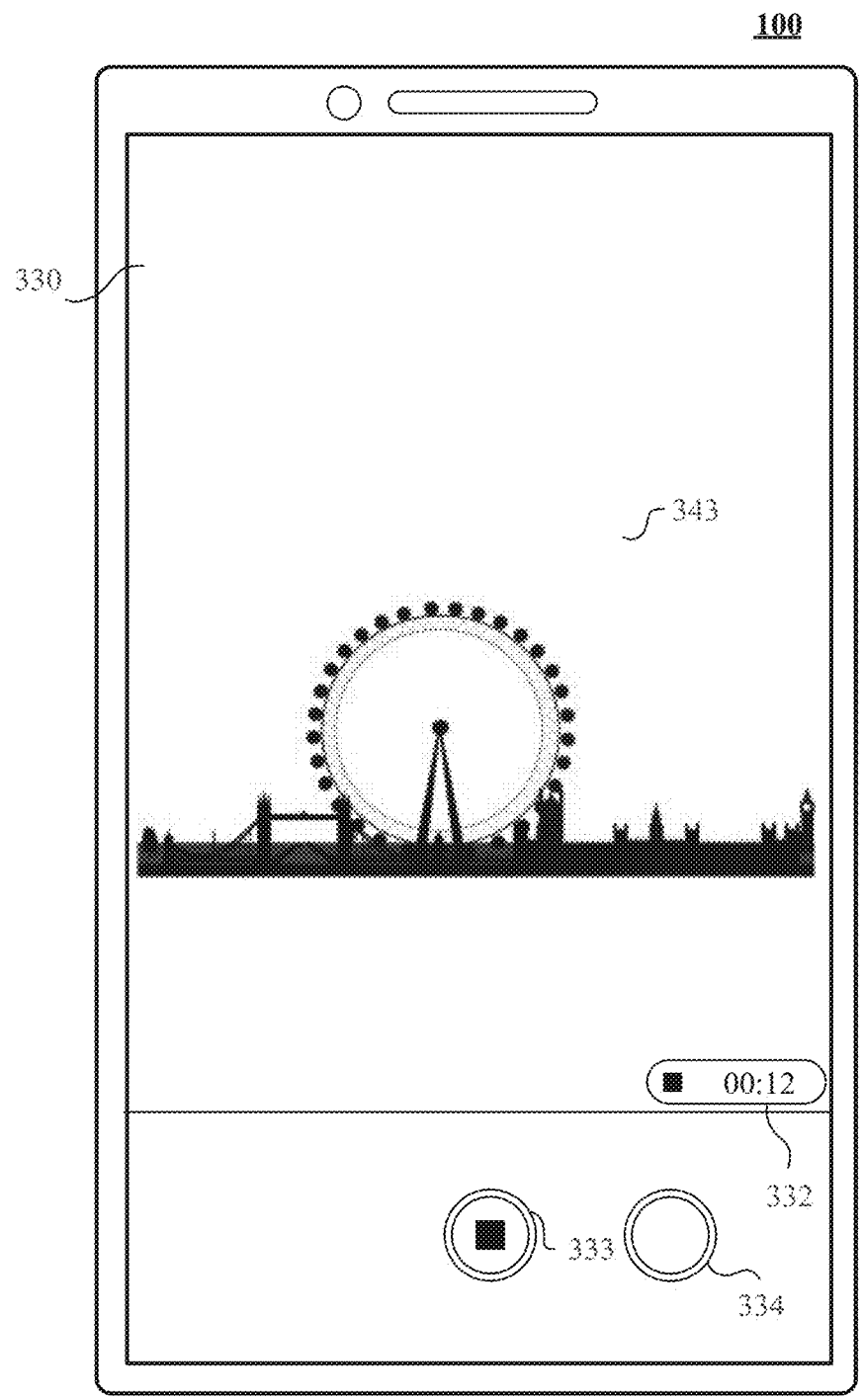
Figure 3G:
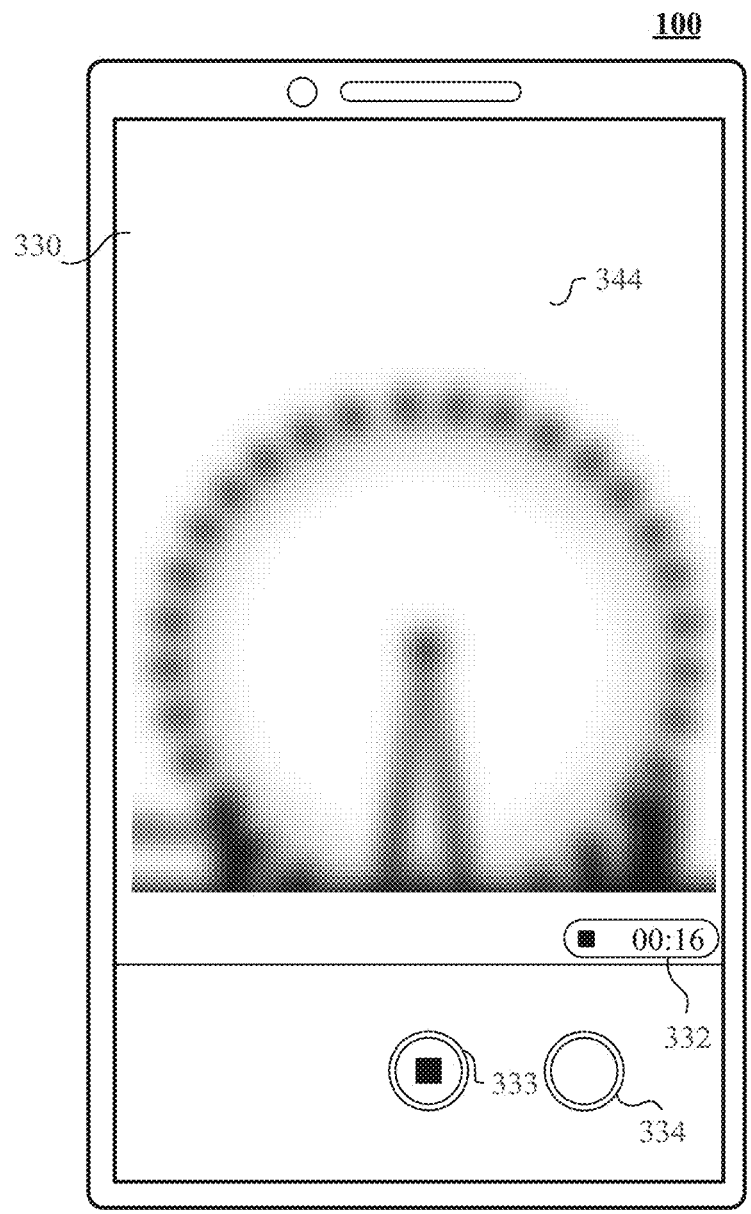
Figure 3H:

For example, as shown in FIG. 3D, a video picture 341 at about the fourth second in the original video recorded by the electronic device 100 includes the character A. The electronic device 100 may determine that a scene category of a video segment at about the fourth second in the original video is "character". As shown in FIG. 3E, a video picture 342 at about the ninth second in the original video recorded by the electronic device 100 includes the character B. The electronic device 100 may determine that a scene category of a video segment at about the ninth second in the original video is "character". As shown in FIG. 3F, a video picture 343 at about the twelfth second in the original video recorded by the electronic device 100 includes a building (for example, the Ferris wheel). The electronic device 100 may determine that a scene category of a video segment at about the twelfth second in the original video is "building". As shown in FIG. 3G, a video picture 344 at about the sixteenth second in the original video recorded by the electronic device 100 is being zoomed to increase a zoom ratio. Therefore, a building (for example, the Ferris wheel) in the video picture 344 is relatively blurred, and the electronic device 100 may determine that a video segment at about the sixteenth second in the original video is an invalid segment. As shown in FIG. 3H, a video picture 345 at about the twentieth second in the original video recorded by the electronic device 100 includes a panorama of a building, the character A, and the character B. The electronic device 100 may determine that a scene category of a video segment at about the twentieth second in the original video is "traveling". Optionally, a scene transition part between photographing scene segments may be considered as invalid. For example, a scene transition part indicating that scene transition from the character A is performed within the time period from 3 s to 5 s after recording is started, to photograph the character B, a scene transition part indicating that scene transition from the character B is performed within the time period from 7 s to 9 s after recording is started, to photograph the Ferris wheel, a scene transition part indicating that picture zooming is performed within the time period from 11 s to 13 s after recording is started, to photograph the details of the Ferris wheel (for example, the zoom ratio is increased), and a scene transition part indicating that scene transition from the Ferris wheel is performed within the time period from 15 s to 17 s after recording is started, to shoot the panorama that includes the character A, the character B, and the Ferris wheel may be considered as invalid segments.

As shown in FIG. 3H, the electronic device 100 may receive a second input from the user on the recording end control 333 (for example, the recording end control 333 is tapped at the twentieth second of starting recording). In response to the second input, the electronic device 100 may end recording, and store the recorded original video and the highlight video cut from the original video.

In a process of recording the original video, the electronic device 100 may continuously recognize and cut a plurality of highlight video segments in the specified scene from the original video. After the electronic device 100 ends recording of the original video, the electronic device 100 may fuse the plurality of highlight video segments in the original video into one highlight video. The electronic device 100 may store the original video and the highlight video.

Figure 3I:

Optionally, as shown in FIG. 3I, after ending recording, the electronic device 100 may display a photographing interface 340. For text description of the photographing interface 340, refer to the text description shown in FIG. 3C. Details are not described herein. After the electronic device 100 generates and stores the highlight video, the electronic device 100 may display prompt information 335 (which may be referred to as a first prompt in this embodiment of this application) in the photographing interface 340. The prompt information 335 is used to prompt the user that the electronic device 100 generates the highlight video from the recorded original video and stores the highlight video. The prompt information 335 may be a text prompt (for example, "A highlight video is generated for the video captured by you. Please view it in the gallery"), a pattern prompt, an animation prompt, or the like.

In a possible implementation, after ending recording of the original video, the electronic device 100 may store the original video, and then recognize and cut a plurality of highlight video segments in the specified scene from the original video. After cutting the plurality of highlight video segments, the electronic device 100 may fuse the plurality of highlight video segments into one highlight video. After generating the highlight video, the electronic device 100 may store the highlight video.

Figure 3J:
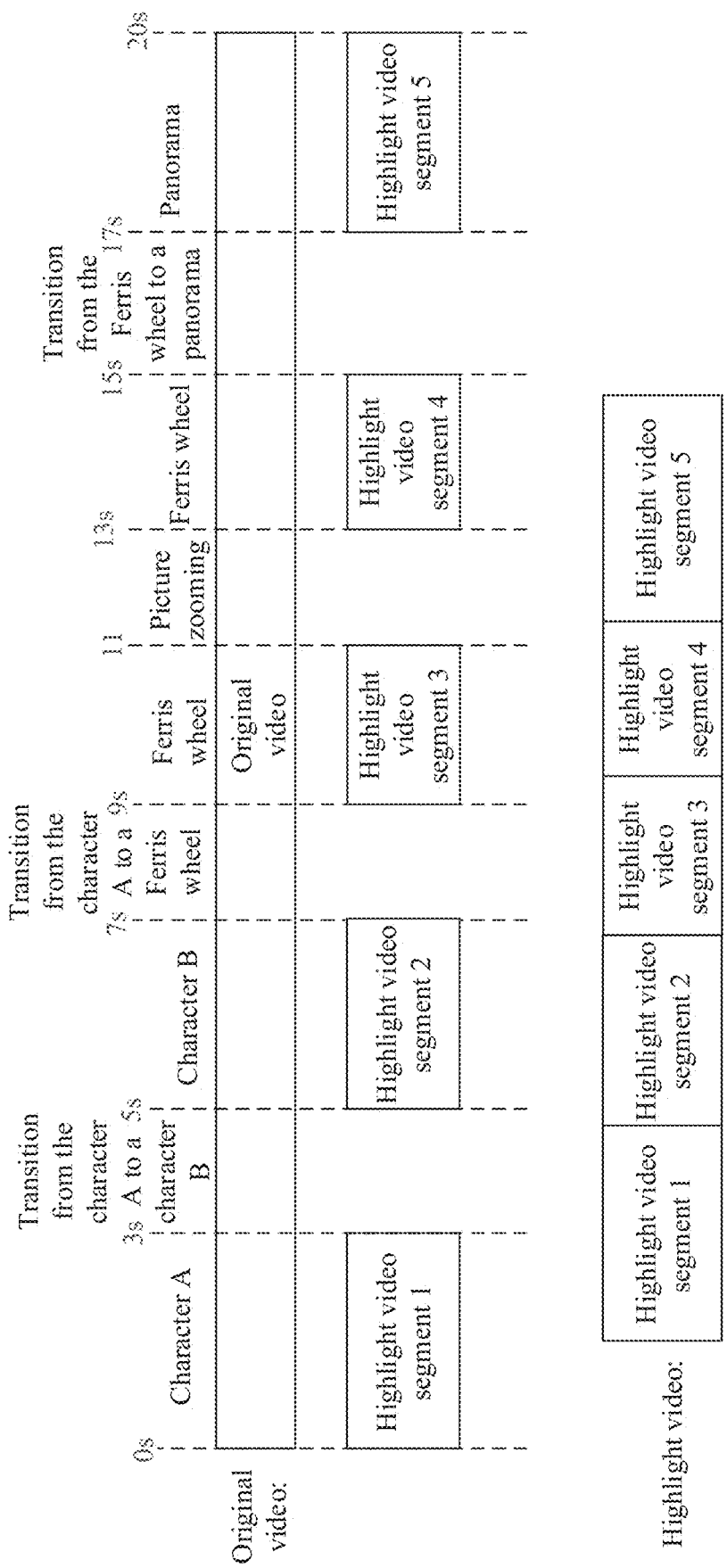
FIG. 3J is a schematic diagram of obtaining a highlight video through splicing according to an embodiment of this application.

For example, as shown in FIG. 3J, in the original video, in a segment from 0 s to 3 s, the character A is photographed: in a segment from 3 s to 5 s, scene transition from the character A is performed to photograph the character B: in a segment from 5 s to 7 s, the character B is photographed: in a segment from 7 s to 9 s, scene transition from the character B is performed to photograph the Ferris wheel: in a segment from 9 s to 11 s, the Ferris wheel is photographed; in a segment from 11 s to 13 s, picture zooming is performed to photograph the details of the Ferris wheel, but a blurred picture is obtained: in a segment from 13 s to 15 s, the Ferris wheel is photographed: in a segment from 15 s to 17 s, scene transition from the Ferris wheel is performed to shoot the panorama that includes the character A, the character B, and the Ferris wheel; and in a segment from 17 s to 20 s, the panorama that includes the character A, the character B, and the Ferris wheel is photographed. Scene transition or picture zooming is performed in the segment from 3 s to 5 s, the segment from 7 s to 9 s, the segment from 11 s to 13 s, and the segment from 15 s to 17 s. Therefore, the segments may be determined as invalid segments. The remaining segment from 0 s to 3 s, the remaining segment from 5 s to 7 s, the remaining segment from 9 s to 11 s, the remaining segment from 13 s to 15 s, and the remaining segment from 17 s to 20 s may be determined as highlight video segments. The segment from 0 s to 3 s is a highlight video segment 1, the segment from 5 s to 7 s is a highlight video segment 2, the segment from 9 s to 11 s is a highlight video segment 3, the segment from 13 s to 15 s is a highlight video segment 4, and the segment from 17 s to 20 s is a highlight video segment 5. The electronic device 100 may splice the highlight video segment 1, the highlight video segment 2, the highlight video segment 3, the highlight video segment 4, and the highlight video segment 5 in a head-to-tail manner and in a time sequence, to obtain a highlight video. For example, a tail of the highlight video segment 1 and a head of the highlight video 2 may be spliced, a tail of the highlight video segment 2 and a head of the highlight video 3 may be spliced, a tail of the highlight video segment 3 and a head of the highlight video 4 may be spliced, and a tail of the highlight video segment 4 and a head of the highlight video segment 5 may be spliced.

Optionally, if the highlight video segment 4 in FIG. 3J is an invalid segment, for example, if the highlight video segment 4 is an invalid segment due to a blurred picture, absence of a photographing object, hand shaking of the user, block by a passerby, or block by another obstacle, the highlight video is obtained by splicing the highlight video segment 1, the highlight video segment 2, the highlight video segment 3, and the highlight video segment 5. For a specific process in which the electronic device 100 recognizes and cuts the plurality of highlight video segments from the original video, and fuses the plurality of highlight video segments into one highlight video, refer to subsequent embodiments of this application. Details are not described herein.

In this embodiment of this application, the first input, the second input, and another input may include but are not limited to gesture inputs, tap operation inputs, voice inputs, and the like.

In some embodiments, after storing the original video and the highlight video generated from the original video, the electronic device 100 may simultaneously display a display area of the highlight video in a display interface of the original video. When the electronic device 100 receives an input (for example, a tap) from the user for the display area of the highlight video, the electronic device 100 may play the highlight video.

Figure 4A:
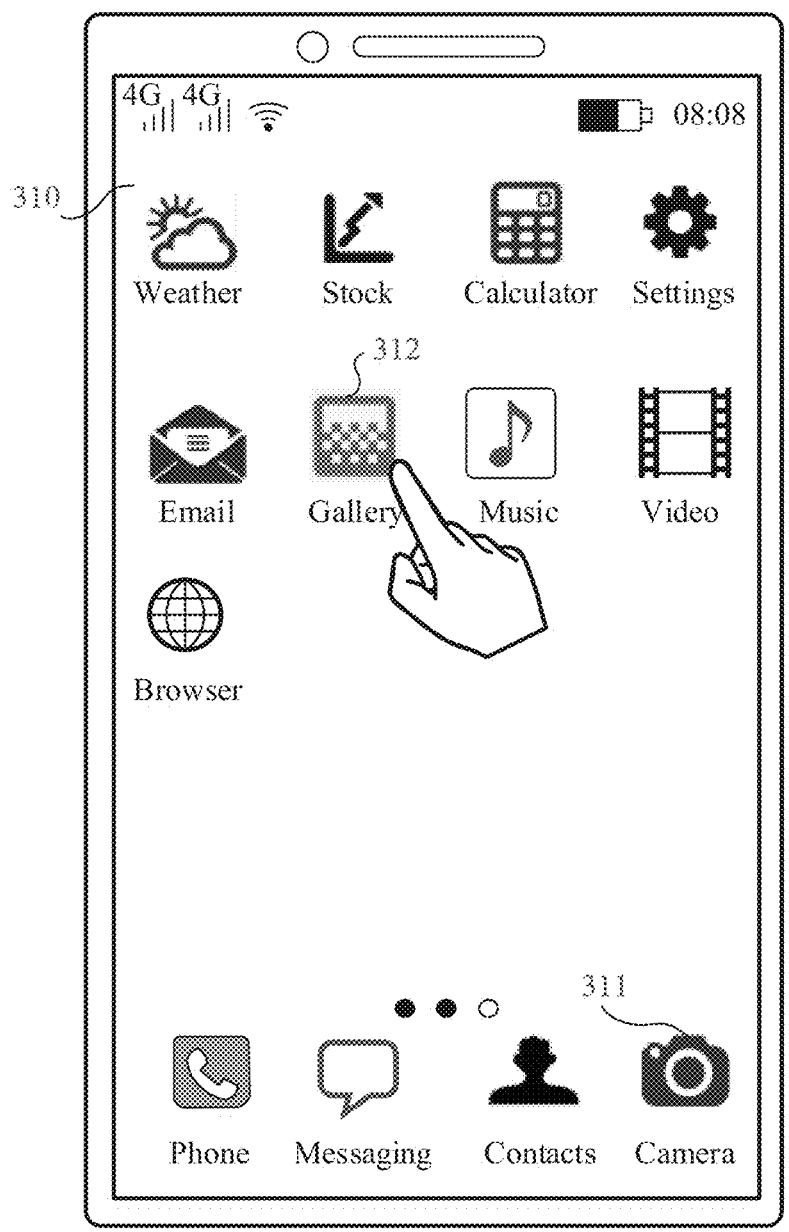
FIG. 4A-FIG. 4G are schematic diagrams of a group of highlight video display interfaces according to an embodiment of this application.

For example, as shown in FIG. 4A, the electronic device 100 may display a home screen 310. For text description of the home screen 310, refer to the embodiment shown in FIG. 3A. Details are not described herein.

The electronic device 100 may receive an input (for example, a tap) from the user on the gallery application icon 312. In response to the input, the electronic device 100 may display a gallery application interface 410 shown in FIG. 4B.

Figure 4B:
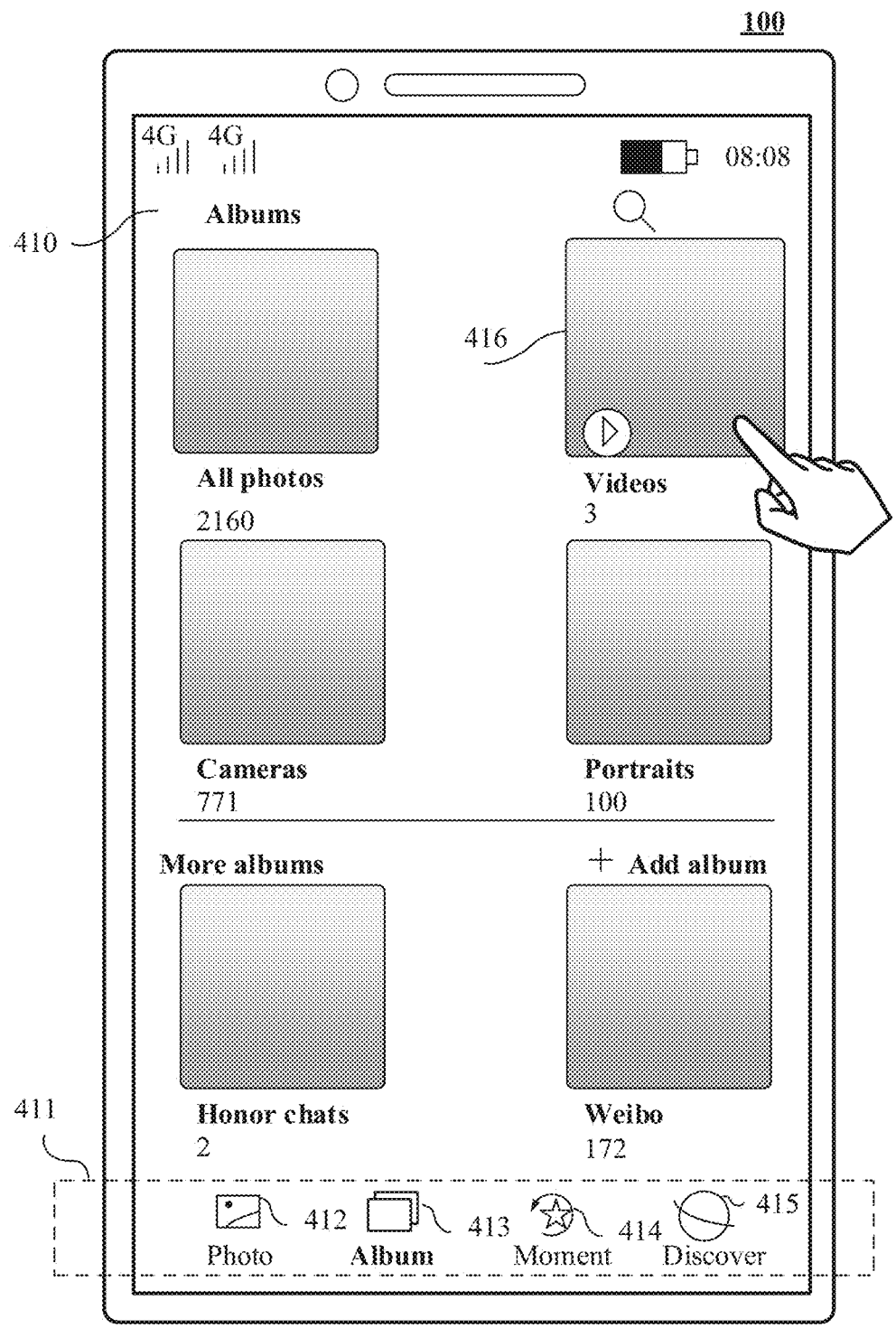

As shown in FIG. 4B, the gallery application interface 410 may display one or more albums (for example, an "all photos" album, a video album 416, a camera album, a portrait album, a WeChat album, and a Weibo album). The electronic device 100 may display a gallery menu 411 below the gallery application interface 410. The gallery menu 411 includes a photo control 412, an album control 413, a moment control 414, and a discover control 415. The photo control 412 is used to trigger the electronic device 100 to display all local photos in a form of a photo thumbnail. The album control 413 is used to trigger the electronic device 100 to display an album to which the local photo belongs. As shown in FIG. 4B, the current album control 413 is in a selected state, and the electronic device 100 displays the gallery application interface 410. The moment control 414 may be used to trigger the electronic device 100 to display a locally stored selected photo. The discover control 415 may be used to trigger the electronic device 100 to display a classified album of photos.

The electronic device 100 may receive an input (for example, a tap) from the user for the video album 416. In response to the input, the electronic device 100 may display a video album interface 420) shown in FIG. 4C.

Figure 4C:
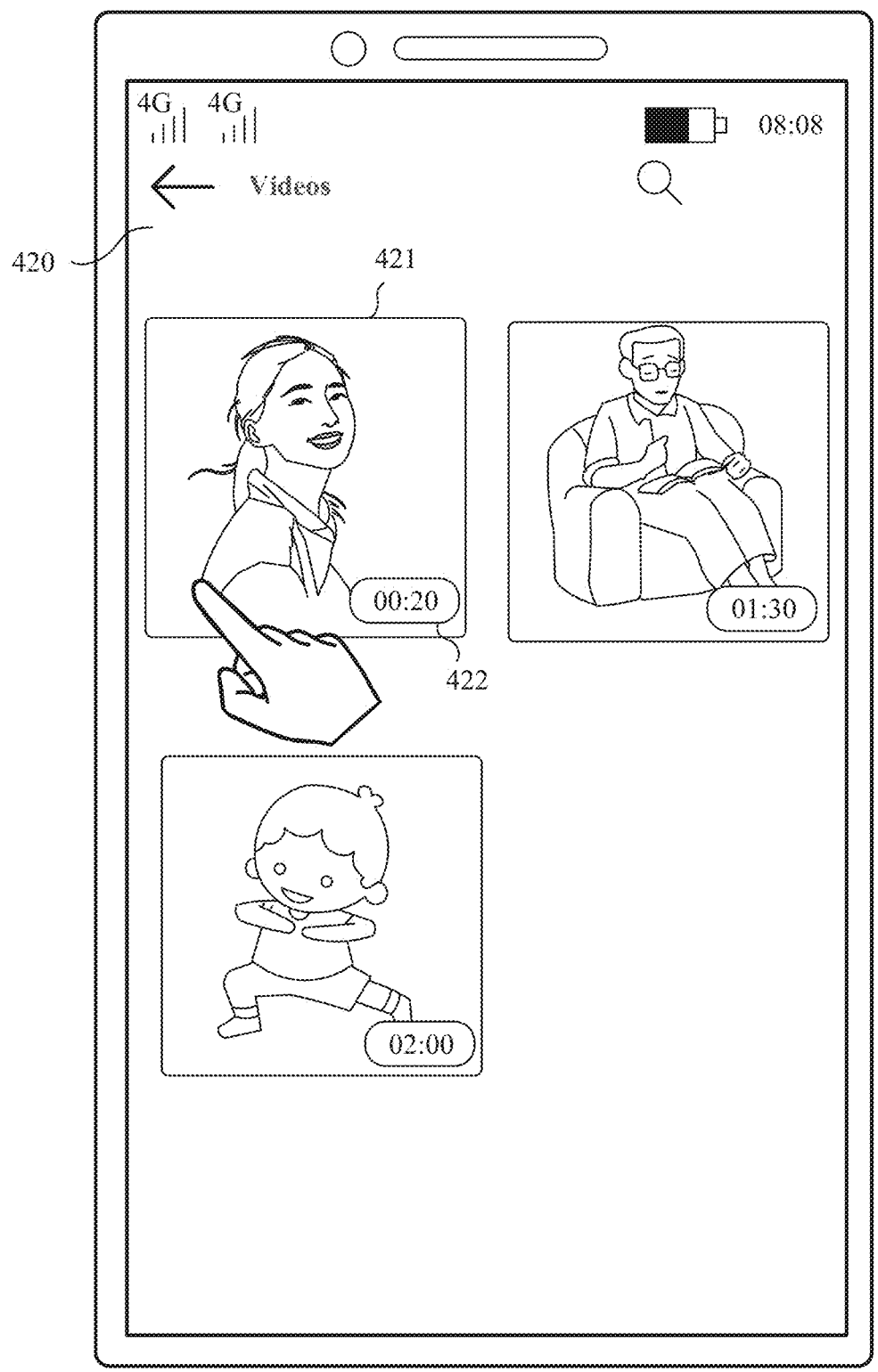

As shown in FIG. 4C, the video album interface 420 may include options of one or more video files, for example, an option 421 (which may be referred to as a first option in this embodiment of this application) corresponding to the original video recorded by the user in the foregoing embodiment. A thumbnail and video time length information of a specified picture frame in the video file may be displayed in the option of the video file. For example, a thumbnail and video time length information (for example, 20 seconds) of a first picture frame in the original video recorded by the user may be displayed in the option 421.

The electronic device 100 may receive a fourth input (for example, a tap) from the user on the option 421. In response to the fourth input, the electronic device 100 may display a video display interface 430 shown in FIG. 4D.

Figure 4D:
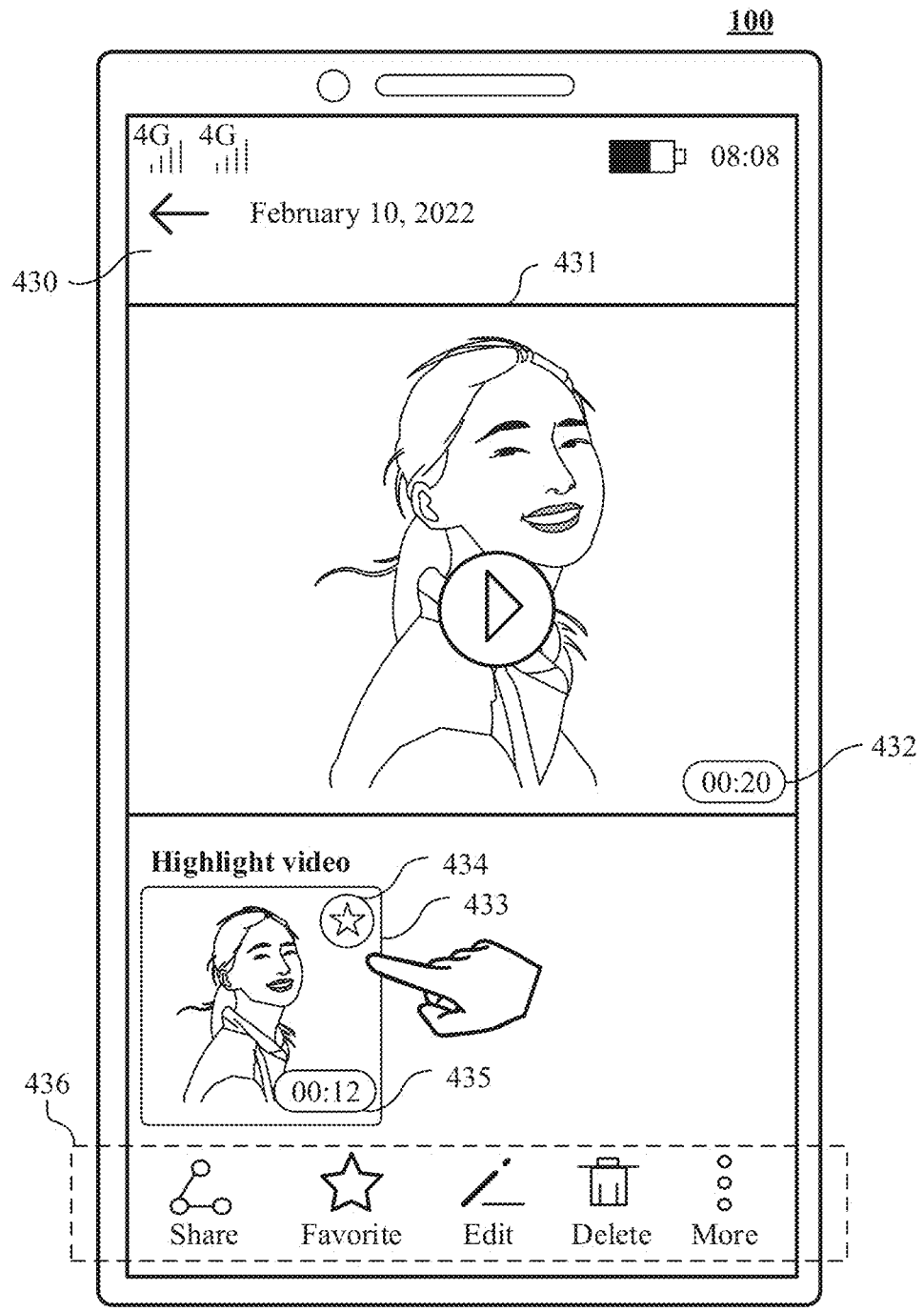

In a possible implementation, the electronic device 100 may further receive and respond to an input (for example, a tap) from the user for the echo control 321 shown in FIG. 3I, and display the video display interface 430 (which may be referred to as a first video display interface in this embodiment of this application shown in FIG. 4D.

As shown in FIG. 4D, the video display interface 430 may include a display area 431 (which may be referred to as a first display area in this embodiment of this application) of the original video, a display area 433 (which may be referred to as a second display area in this embodiment of this application) of the highlight video generated from the original video, a menu 436, and the like. A picture frame and time information 432 (for example, a time length of 20 seconds) in the original video may be displayed in the display area 431 of the original video. When the display area 431 of the original video receives an input (for example, a tap) from the user, the electronic device 100 may play or pause the original video. A picture frame in the highlight video and time information 435 (for example, a time length of 12 seconds) of the highlight video may be displayed in the display area 433 of the highlight video. Optionally, a highlight mark 434 may be displayed in the display area 433 of the highlight video, and the highlight mark 434 may be used to prompt the user that the highlight video generated from the original video is displayed in the display area 433. The menu 436 may include a share button, a favorite button, an edit button, a delete button, and a "more" button. The share button may be used to trigger sharing of the original video and/or the highlight video. The favorite button may be used to trigger collection of the original video and/or the highlight video to a favorite folder. The edit button may be used to trigger editing functions such as rotation, clipping, filter addition, and blurring of the original video and/or the highlight video. The delete button may be used to trigger deletion of the original video and/or the highlight video. The "more" button may be used to trigger opening of more functions related to the original video and/or the highlight video.

Figure 4E:
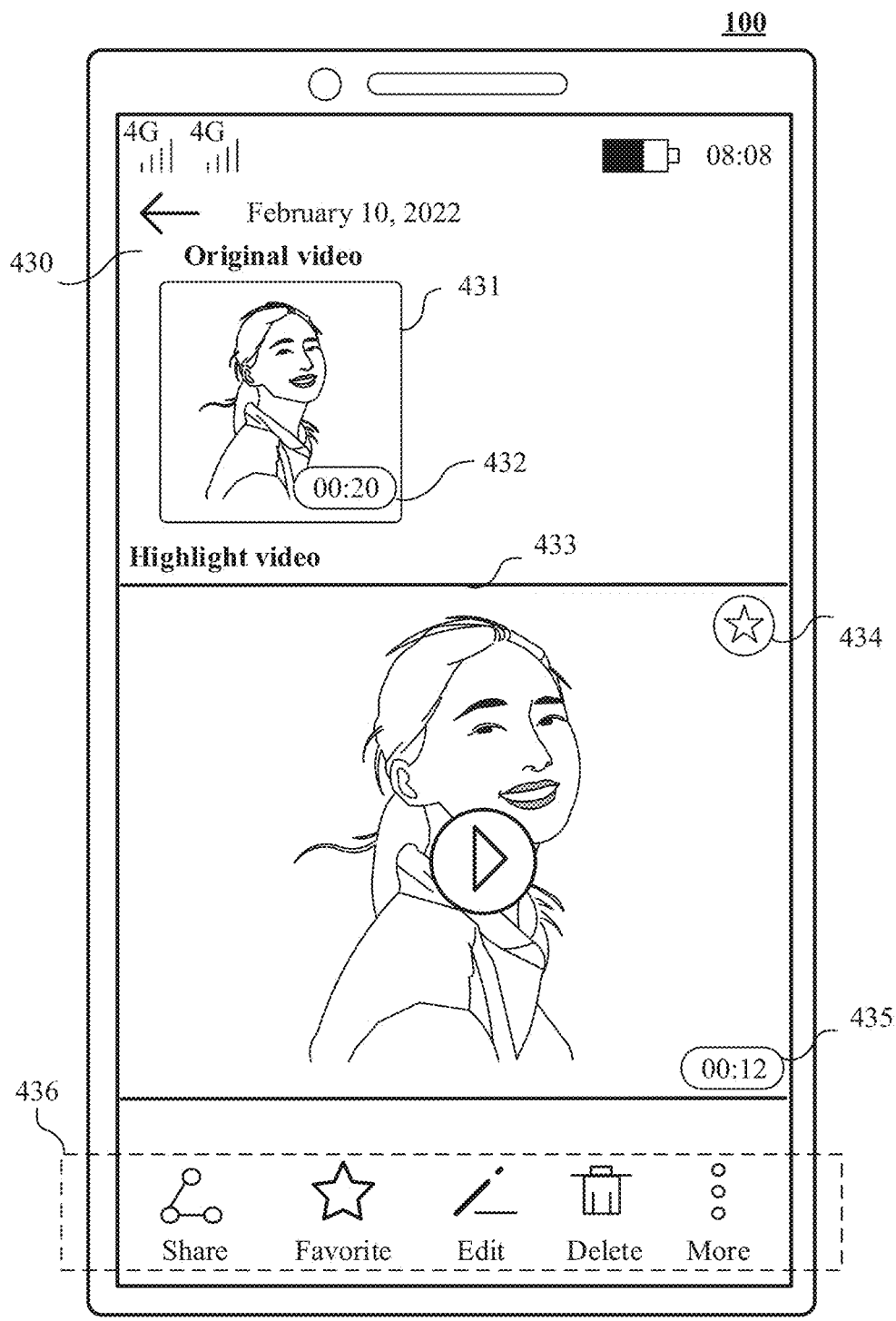

The electronic device 100 may receive an input (for example, a tap) from the user for the display area 433 of the highlight video. In response to the input, in the video display interface 430, the electronic device 100 may zoom out and display the display area 431 of the original video, and zoom in and display the display area 433 of the highlight video, as shown in FIG. 4E. After zooming in and displaying the display area 433 of the highlight video, the electronic device 100 may receive and respond to an input (for example, a tap) from the user for the display area 433 of the highlight video. In response to the input, the electronic device 100 may play the highlight video.

In some embodiments, after storing the original video and the highlight video generated from the original video, the electronic device 100 may display an option of the original video and an option of the highlight video side by side in the video album. When the electronic device 100 receives an input from the user for the option of the original video, the electronic device 100 may display a display interface of the original video. When the electronic device 100 receives an input from the user for the option of the highlight video, the electronic device 100 may display a display interface of the highlight video.

Figure 4F:
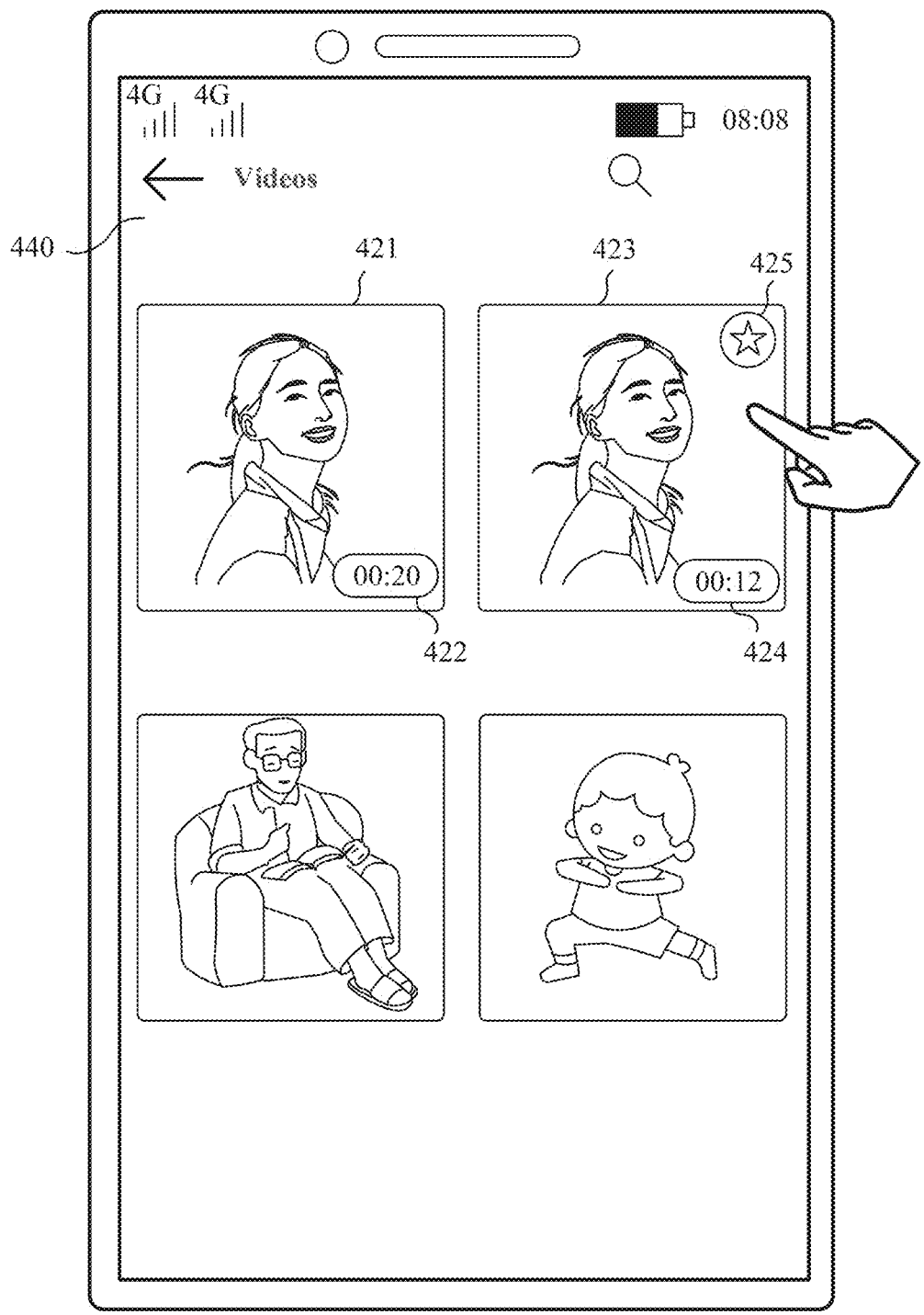

For example, after the electronic device 100 may receive an input (for example, a tap) from the user for the video album 416 shown in FIG. 4B, the electronic device 100 may display a video album interface 440 shown in FIG. 4F.

As shown in FIG. 4F, the video album interface 440 may include options of a plurality of video files. The options of the plurality of video files include an option 421 (which may be referred to as a first option in this embodiment of this application) of the original video and an option 423 (which may be referred to as a second option in this embodiment of this application) of the highlight video generated based on the original video. A thumbnail and video time length information (for example, 20 seconds) of a specified picture frame in the original video recorded by the user may be displayed in the option 421. A thumbnail and video time length information (for example, 12 seconds) of a specified picture frame in the highlight video and a highlight mark 425 may be displayed in the option 423. The highlight mark 425 may be used to prompt the user that a video file corresponding to the option 423 is the highlight video generated from the original video.

The electronic device 100 may receive a fifth input (for example, a tap) from the user for the option 423 of the highlight video. In response to the fifth input, the electronic device 100 may display a video display interface 450 (which may be referred to as a second video display interface in this embodiment of this application) shown in FIG. 4G.

Figure 4G:
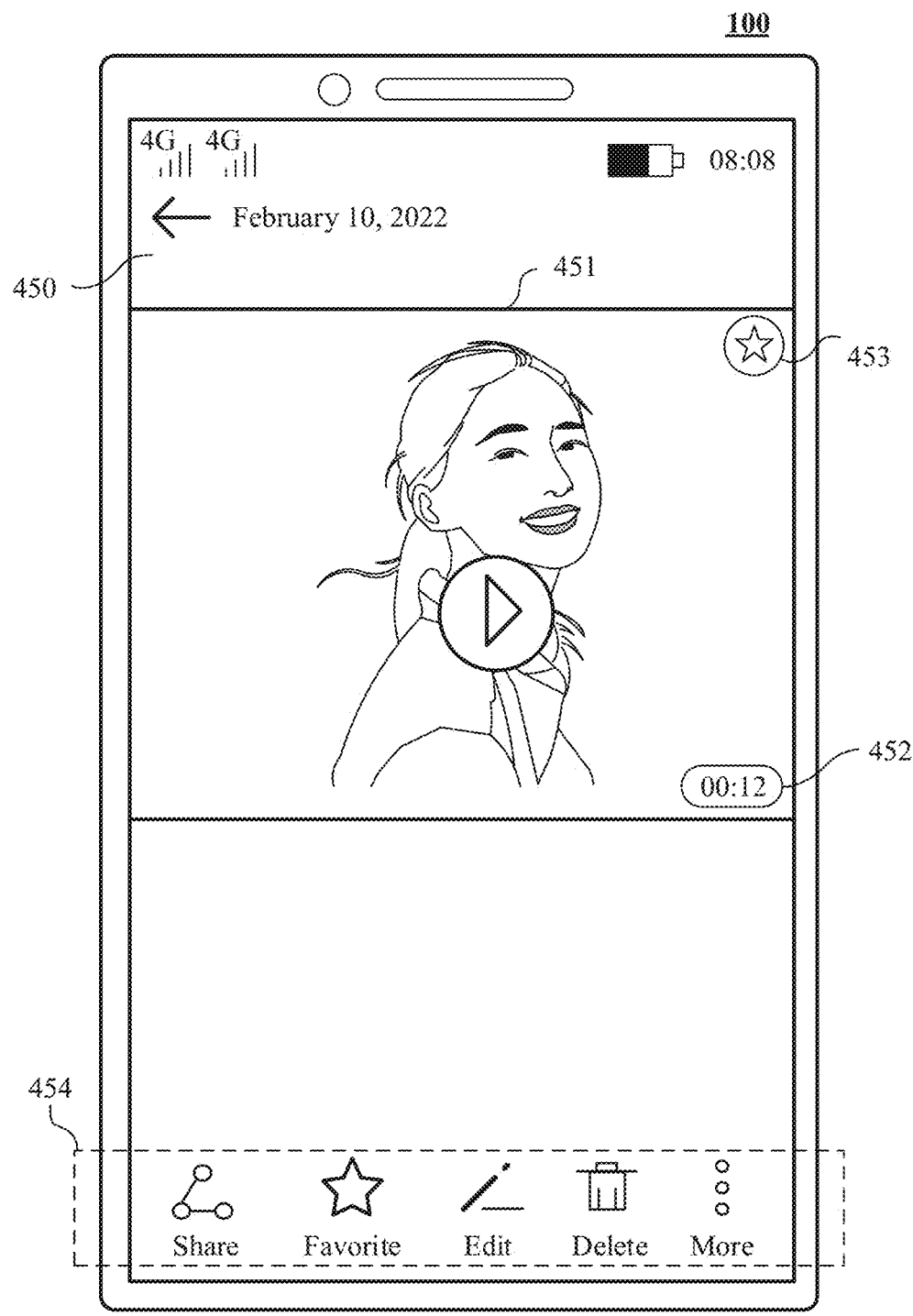

As shown in FIG. 4G, the video display interface 450 may include a display area 451 of the highlight video. A picture frame and time information 452 (for example, a time length of 12 seconds) in the highlight video, and a menu 454 may be displayed in the display area 451. Optionally, a highlight mark 453 may be displayed in the display area 451 of the highlight video, and the highlight mark 453 may be used to prompt the user that the highlight video generated from the original video is displayed in the display area 451. The menu 454 may include a share button, a favorite button, an edit button, a delete button, and a "more" button. The share button may be used to trigger sharing of the highlight video. The favorite button may be used to trigger collection of the highlight video to a favorite folder. The edit button may be used to trigger editing functions such as rotation, clipping, filter addition, and blurring of the highlight video. The delete button may be used to trigger deletion of the highlight video. The "more" button may be used to trigger opening of more functions related to the highlight video. When the display area 451 of the highlight video receives an input (for example, a tap) from the user, the electronic device 100 may play or pause the highlight video.

In some application scenarios, a user may record a video in a special video mode (for example, a highlight video) in a camera application in an electronic device 100. In a process in which the electronic device 100 records a video, the electronic device 100 may recognize and edit a plurality of highlight video segments in a specified photographing scene from the recorded original video, and fuse the plurality of highlight video segments into one highlight video. After ending recording of the video, the electronic device 100 may store the highlight video. Optionally, the electronic device 100 may further store the original video. In this way, viewing experience of the video recorded by the user can be improved.

Figure 5A:
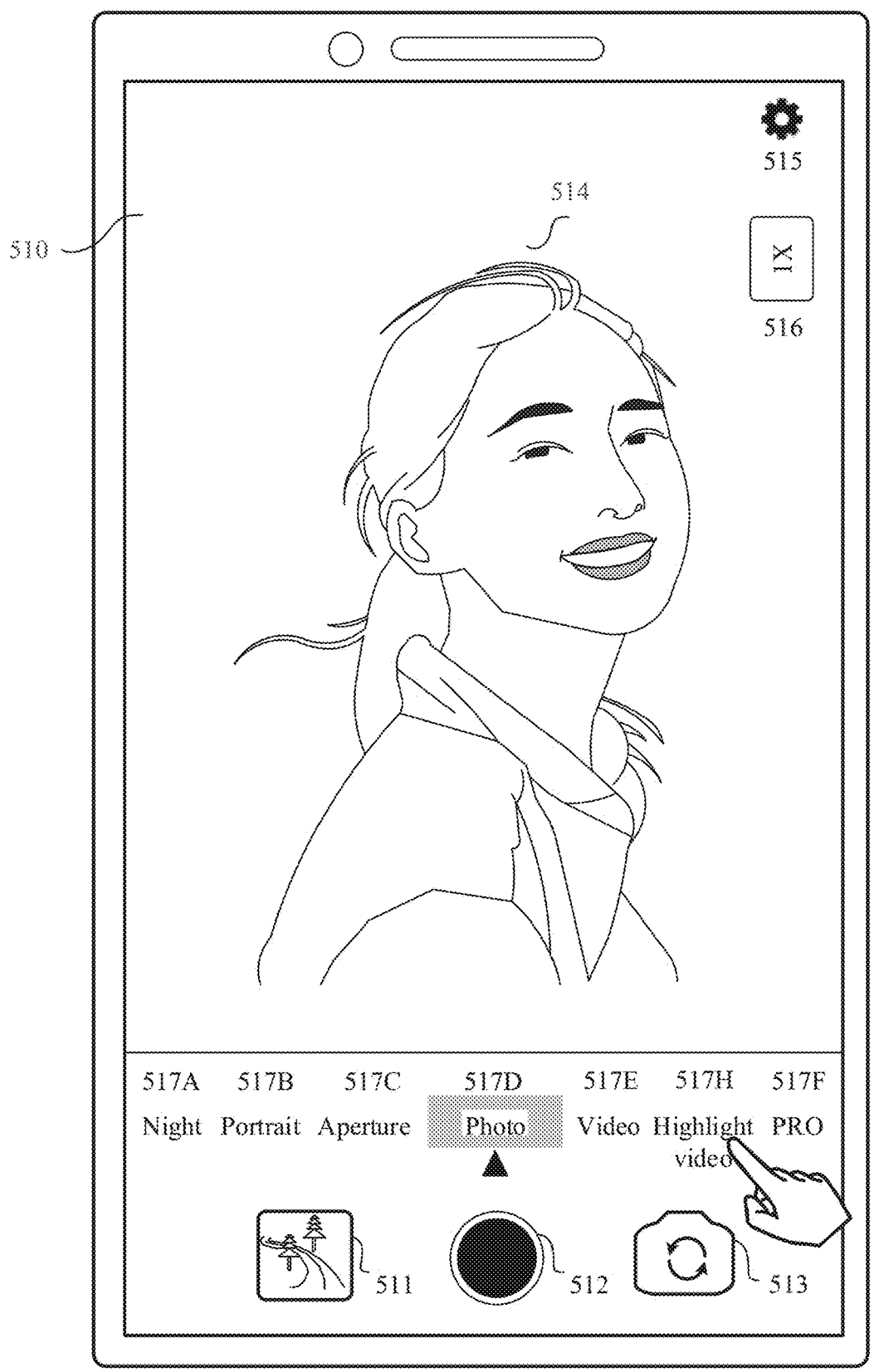
FIG. 5A-FIG. 5E are schematic diagrams of a group of highlight video setting interfaces according to an embodiment of this application.

For example, as shown in FIG. 5A, the electronic device 100 may display the photographing interface 510. The photographing interface 510) may include an echo control 511, a photographing control 512, a camera switching control 513, a preview box, a settings control 515, a zoom ratio control 516, and one or more photographing mode controls (for example, a "night" control 517A, a "portrait" control 517B, an "aperture" control 517C, a "photo" control 517D, a "video" control 517E, a "highlight video" control 517H, a "professional" control 517F, and a "more" control). The electronic device 100 may receive an input (for example, a tap) of selecting the "highlight video" control 517H by the user. In response to the input, the electronic device 100 may switch from "photo" to "highlight video". For text description of the control in the photographing interface 510, refer to the photographing interface 320 shown in FIG. 3B. Details are not described herein.

Figure 5B:
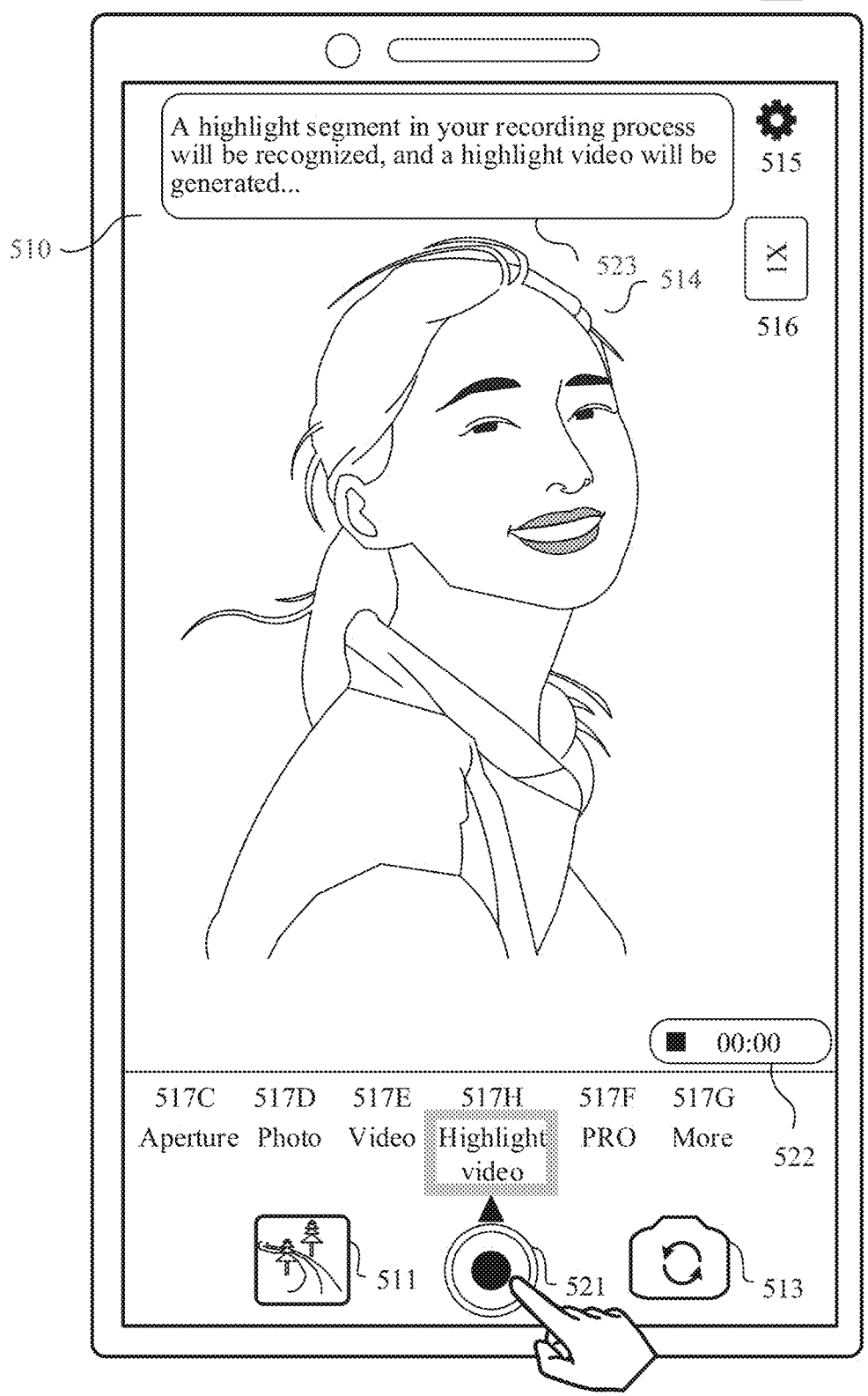

As shown in FIG. 5B, after switching to "highlight video", the electronic device 100 may replace the photographing control 322 with a recording start control 521. The electronic device 100 may further display recording time information 522.

The electronic device 100 may receive an input (for example, a tap) from the user on the recording start control 521. In response to the input, the electronic device 100 may start to record a video. In the highlight video mode, in a process of recording the original video, the electronic device 100 may continuously recognize and cut a plurality of highlight video segments in the specified scene from the original video. After the electronic device 100 ends recording of the original video, the electronic device 100 may fuse the plurality of highlight video segments in the original video into one highlight video. The electronic device 100 may store the highlight video. Optionally, the electronic device 100 may further store the original video.

Figure 5C:
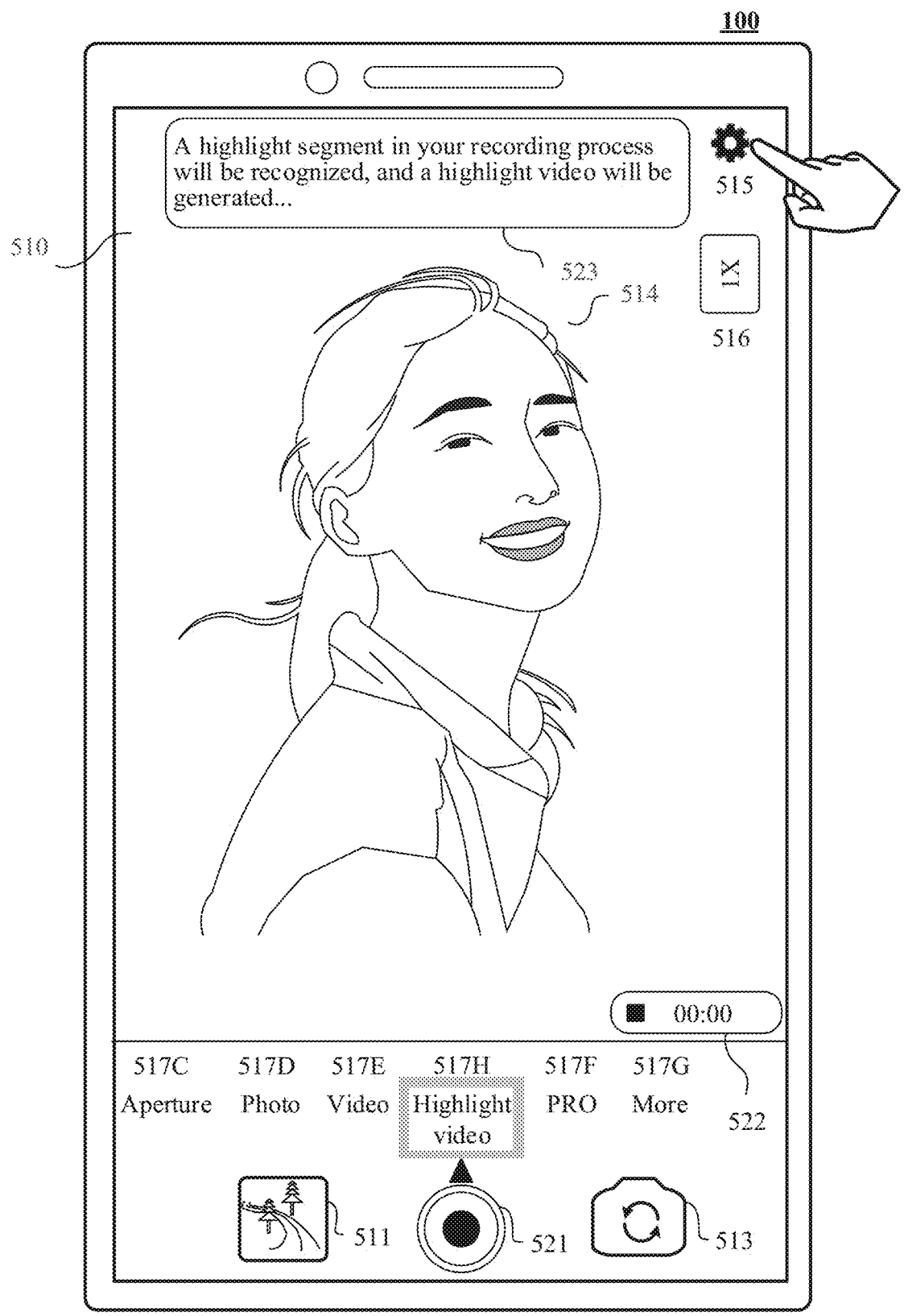

In a possible implementation, as shown in FIG. 5C, when switching to the highlight video mode, the electronic device 100 may display prompt information 523 in the photographing interface. The prompt information 523 may be used to prompt the user with mode introduction of the highlight video mode (for example, a highlight video segment in your recording process will be recognized, and a highlight video will be generated).

In a possible implementation, the electronic device 100 may preset a highlight scene required by the user in a recording process. After the user sets the highlight scene, in a recording process of the electronic device 100, the electronic device 100 may recognize, from the original video, a plurality of highlight video segments corresponding to the highlight scene set by the user, and fuse the plurality of highlight video segments into one highlight video.

For example, as shown in FIG. 5C, the electronic device 100 may receive an input (for example, a tap) from the user for the settings control 515. In response to the input, the electronic device 100 may display a settings window 530 shown in FIG. 5D in the photographing interface 510.

Figure 5D:
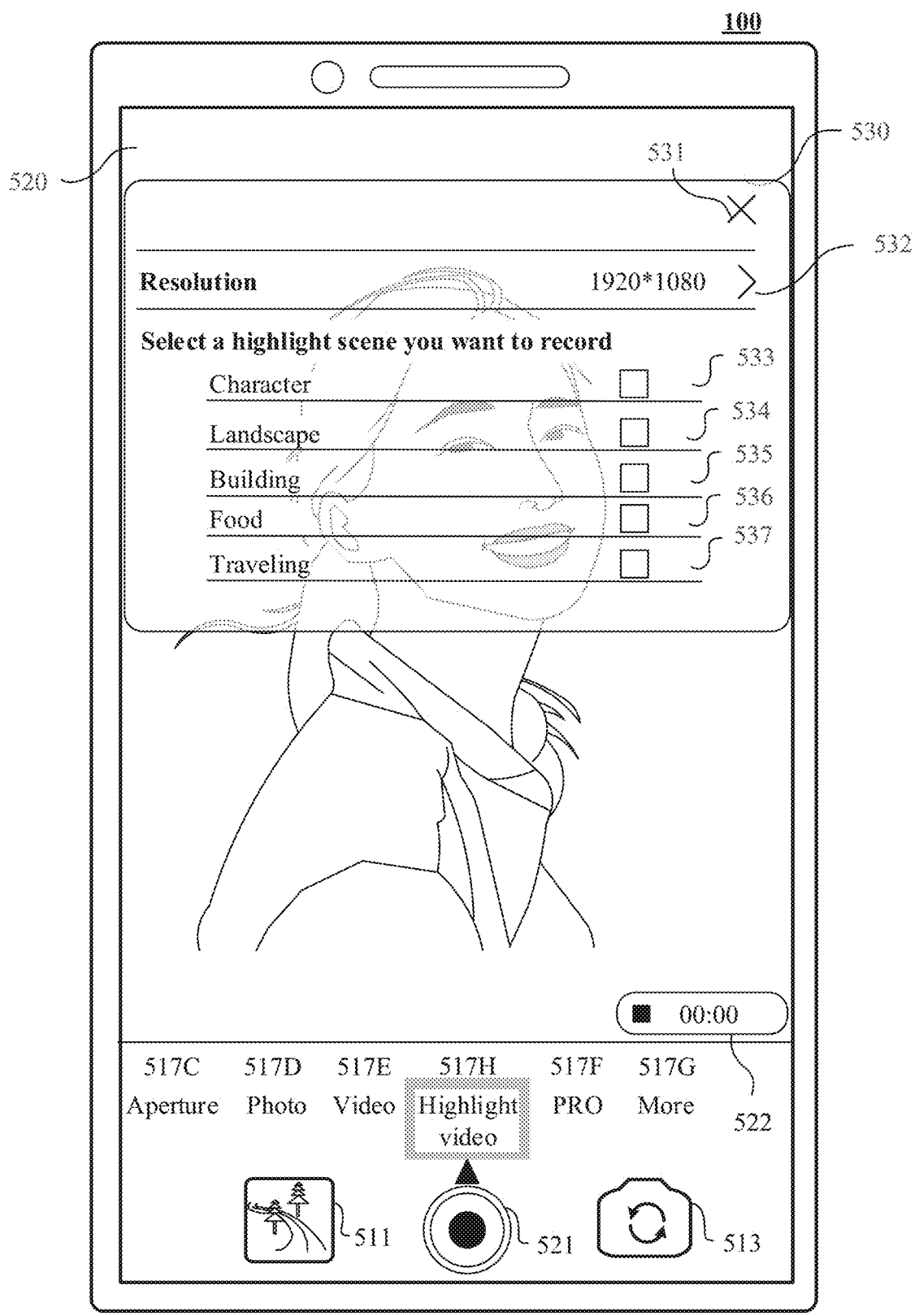

As shown in FIG. 5D, a window closing control 531 and one or more settings items, for example, a resolution settings bar 532 and a highlight scene settings bar, may be displayed and included in the settings window 530. The highlight scene settings bar may include one or more highlight scene settings items, for example, a "character scene" settings item 533, a "landscape scene" settings item 534, a "building scene" settings item 535, a "food scene" settings item 536, and a "traveling scene" settings item 537.

Figure 5E:
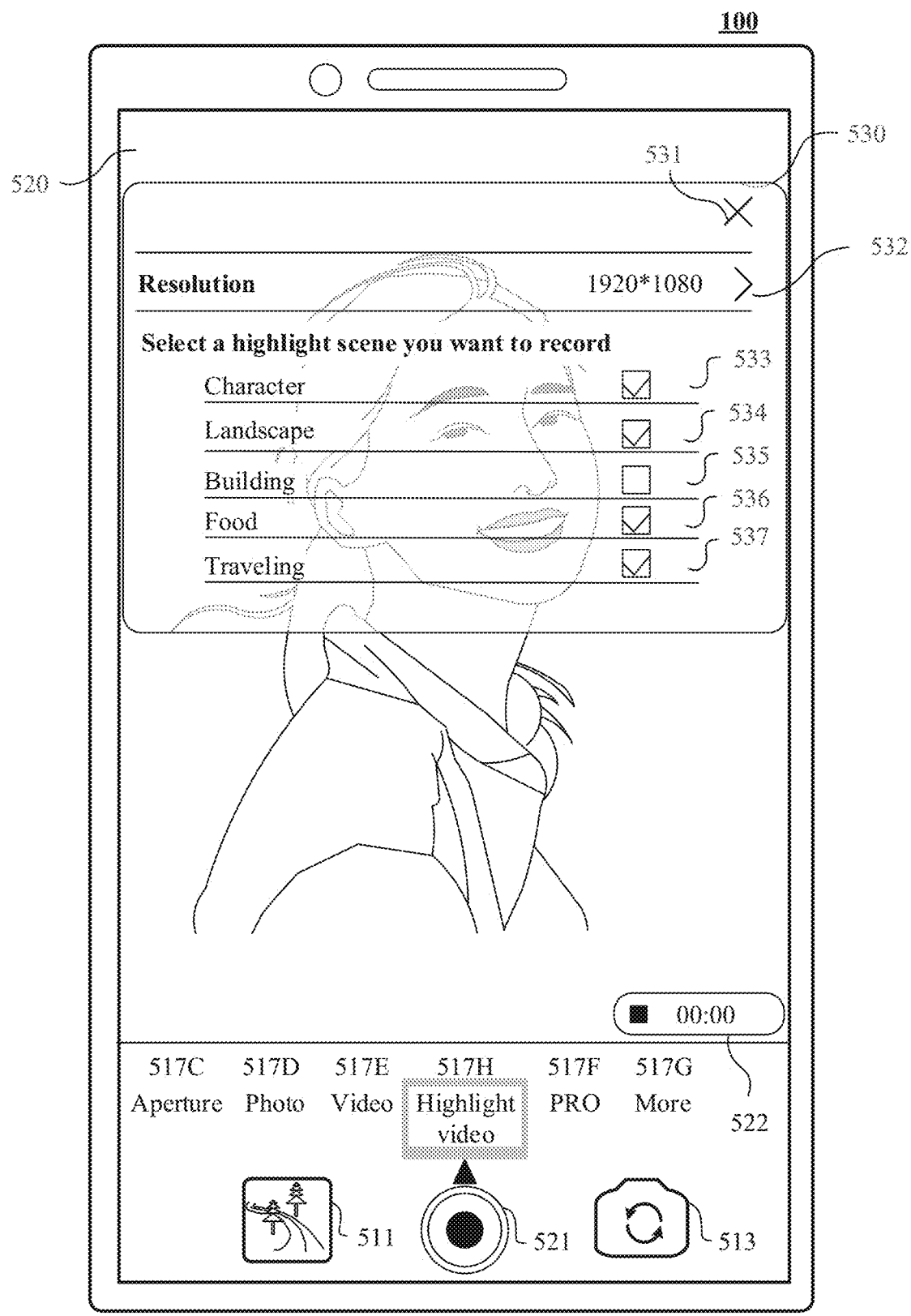

As shown in FIG. 5E, the electronic device 100 may receive an input from the user for the highlight scene settings bar, and select a character scene, a landscape scene, a food scene, a traveling scene, and the like as highlight scenes for generating a highlight video. After the user sets the highlight scene, in a recording process of the electronic device 100, the electronic device 100 may recognize, from the original video, a plurality of highlight video segments corresponding to the highlight scene set by the user, and fuse the plurality of highlight video segments into one highlight video.

In some application scenarios, after the electronic device 100 completes recording of the original video, and stores the original video in a video album, the user may trigger generation of a highlight video from the original video in a display interface of the original video in the video album. After the user triggers generation of a highlight video from the original video, the electronic device 100 may recognize and edit a plurality of highlight video segments in a highlight scene from the original video, and fuse the plurality of highlight video segments into one highlight video. After ending recording of the video, the electronic device 100 may store the highlight video. In this way, viewing experience of the video recorded by the user can be improved.

Figure 6A:
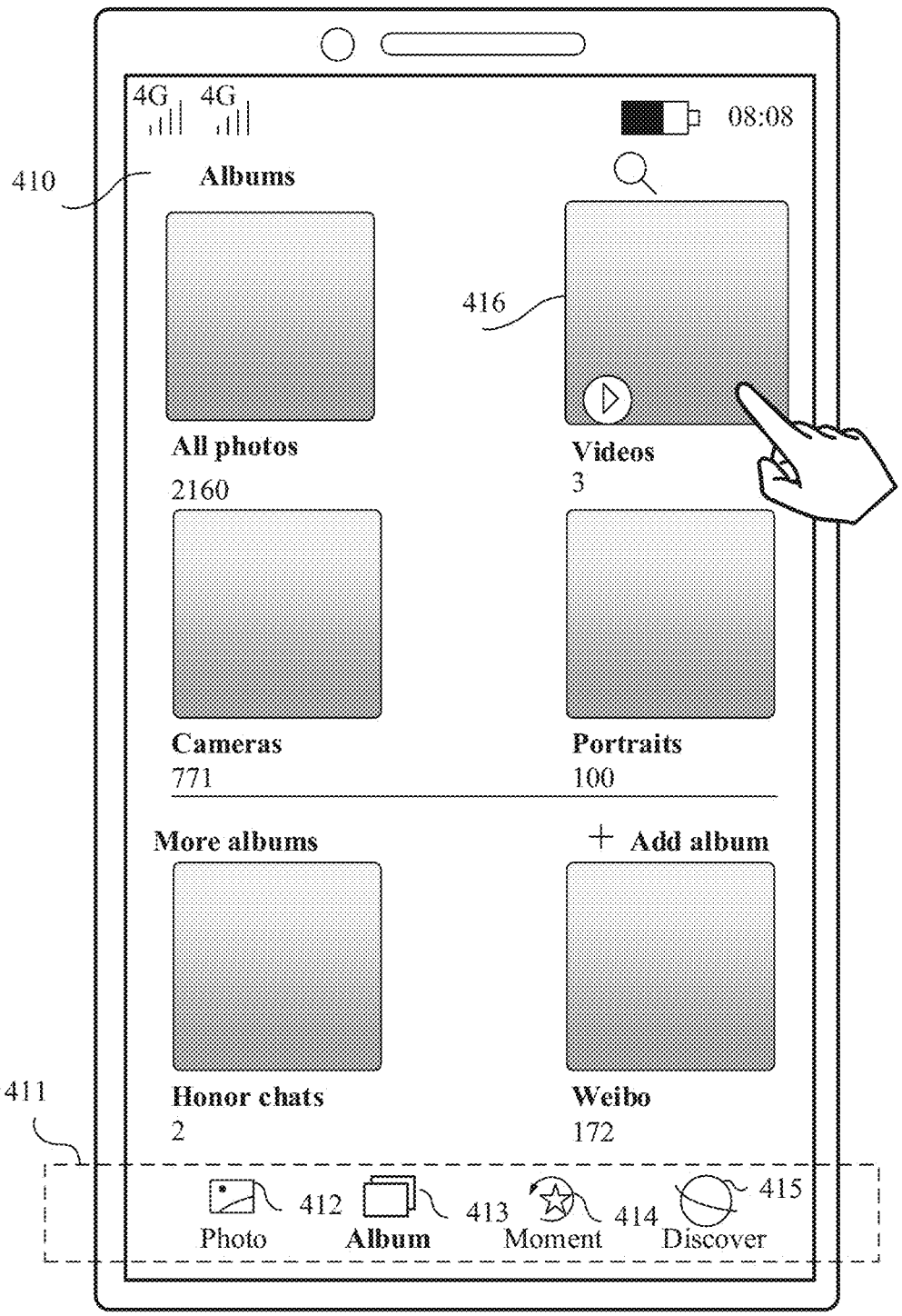
FIG. 6A-FIG. 6F are schematic diagrams of a group of interfaces for generating a highlight video according to an embodiment of this application.

For example, as shown in FIG. 6A, the electronic device 100 may display a gallery application interface 410. For text description of the gallery application interface 410, refer to the text part in the embodiment shown in FIG. 4B. Details are not described herein.

The electronic device 100 may receive an input (for example, a tap) from the user for the video album 416. In response to the input, the electronic device 100 may display a video album interface 420 shown in FIG. 6B.

Figure 6B:
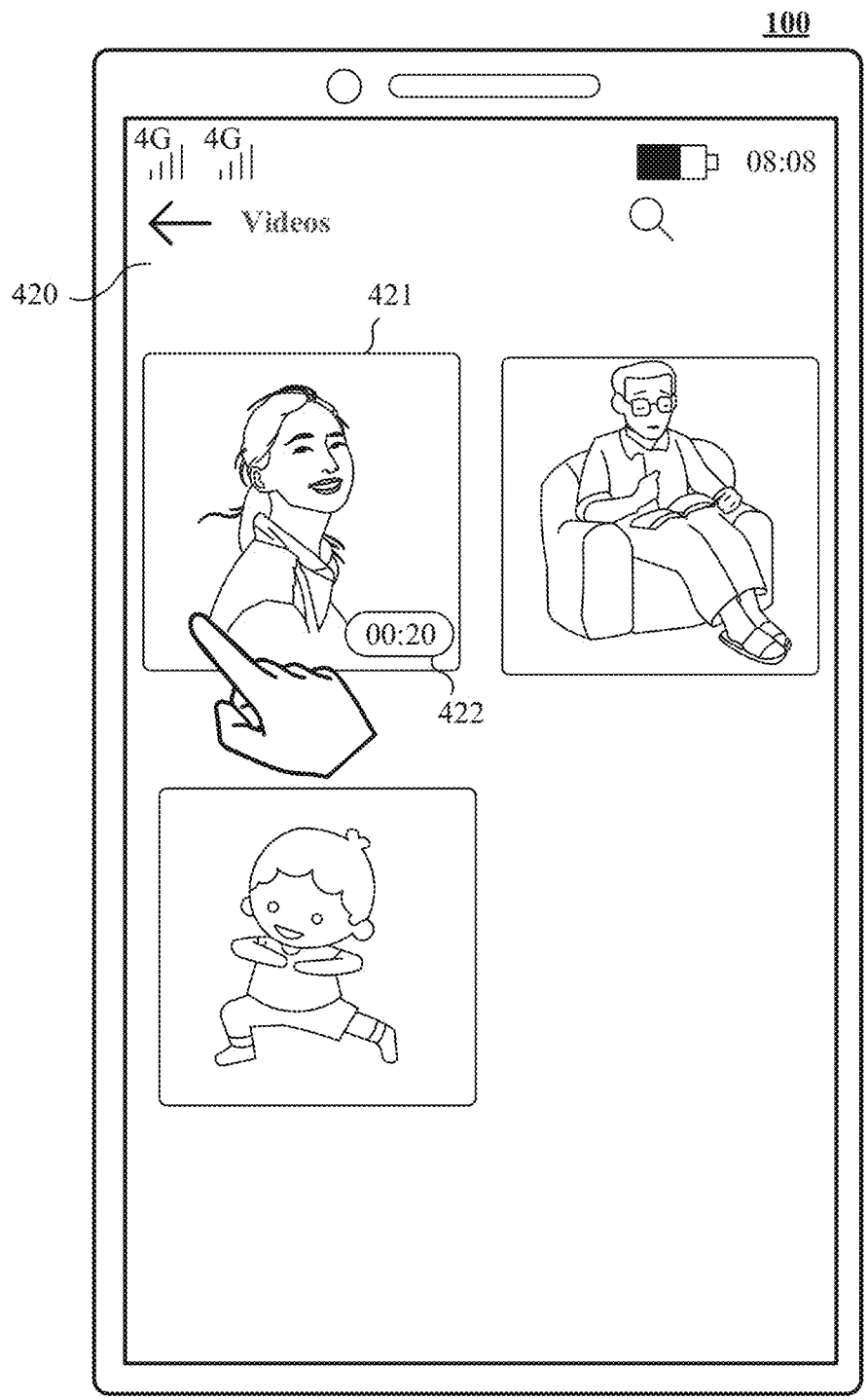

As shown in FIG. 6B, the video album interface 420 may include options of one or more video files, for example, an option 421 corresponding to the original video recorded by the user in the foregoing embodiment. For detailed text description of the video album interface 420, refer to the text part in the embodiment shown in FIG. 4C. Details are not described herein.

The electronic device 100 may receive an input (for example, a tap) from the user on the option 421 of the original video. In response to the input, the electronic device 100 may display a video display interface 610 shown in FIG. 6C.

Figure 6C:
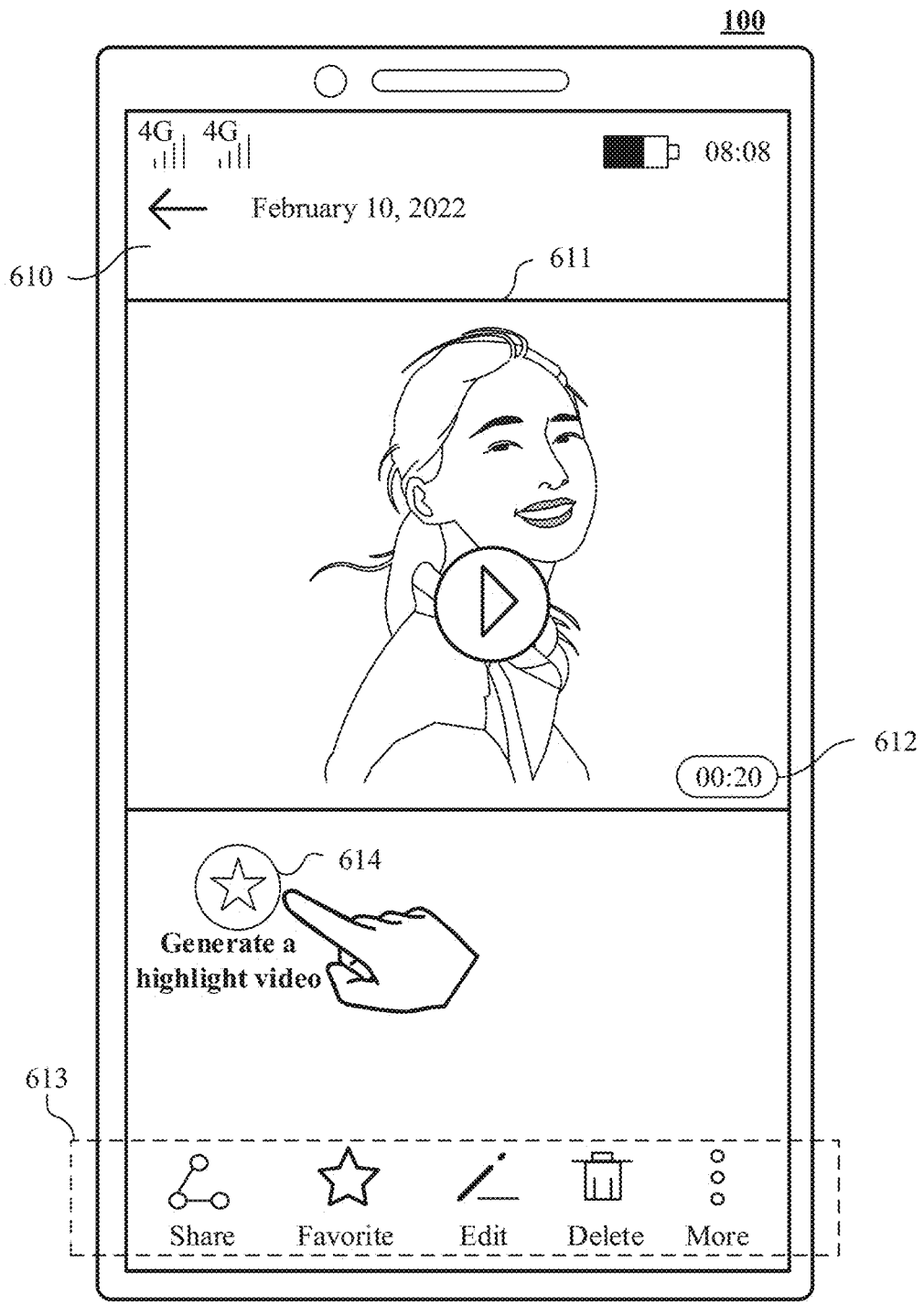

As shown in FIG. 6C, the video display interface 610 may include a display area 611 of the original video, a menu 613, a highlight video generation control 614, and the like. A picture frame and time information 612 (for example, a time length of 20 seconds) in the original video may be displayed in the display area 611 of the original video. When the display area 611 of the original video receives an input (for example, a tap) from the user, the electronic device 100 may play or pause the original video. The highlight video generation control 614 may be used to trigger the electronic device 100 to generate the highlight video from the original video displayed in the display area 611. The menu 613 may include a share button, a favorite button, an edit button, a delete button, and a "more" button. The share button may be used to trigger sharing of the original video. The favorite button may be used to trigger collection of the original video to a favorite folder. The edit button may be used to trigger editing functions such as rotation, clipping, filter addition, and blurring of the original video. The delete button may be used to trigger deletion of the original video. The "more" button may be used to trigger opening of more functions related to the original video.

The electronic device 100 may receive an input (for example, a tap) from the user for the highlight video generation control 614. In response to the input, the electronic device 100 may recognize and cut a plurality of highlight video segments in a highlight scene from the original video, and fuse the plurality of highlight video segments into one highlight video.

Figure 6D:
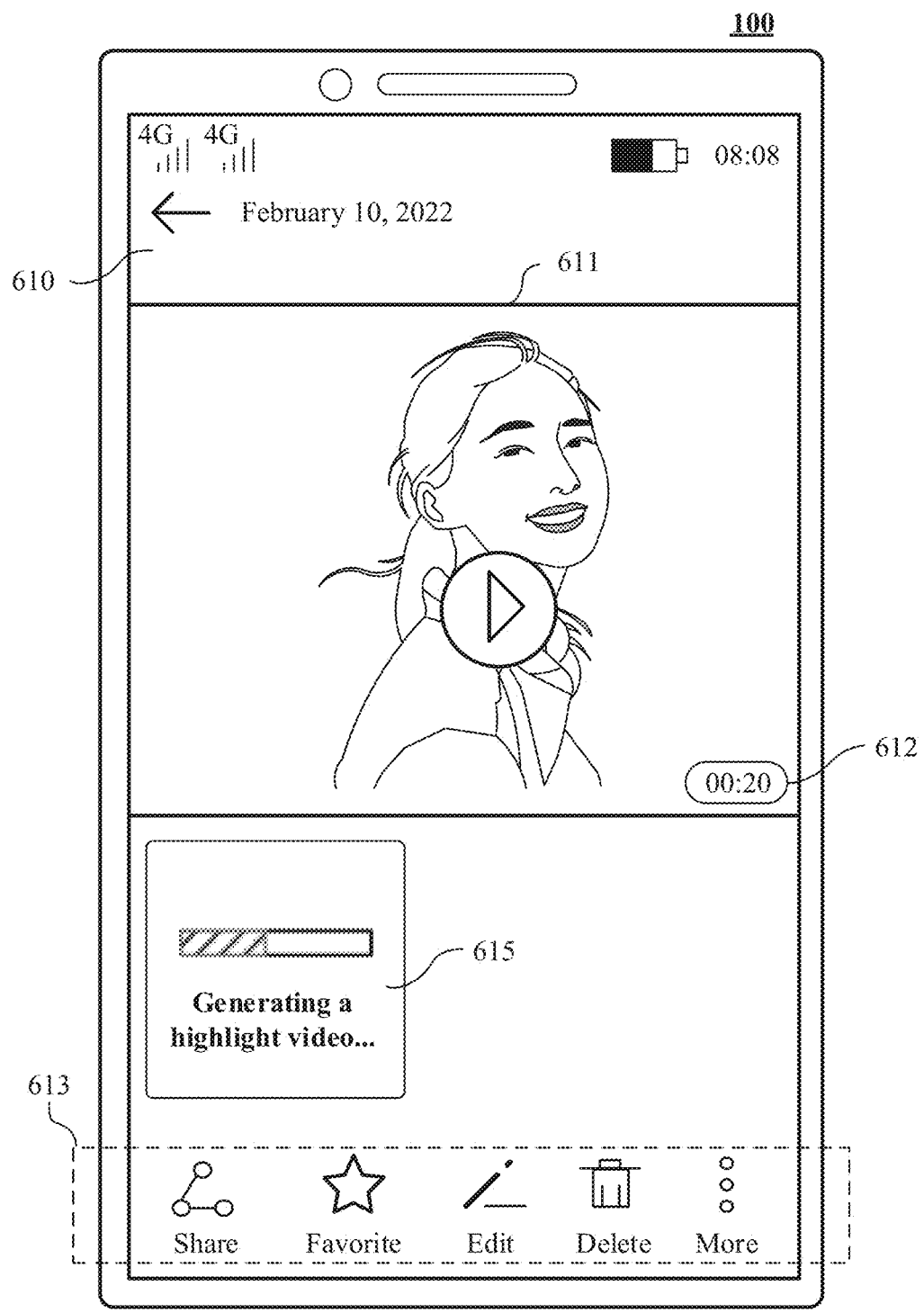

Optionally, as shown in FIG. 6D, in a process in which the electronic device 100 generates the highlight video, the electronic device 100 may display generation progress 615 of the highlight video in the video display interface 610 of the original video. For a specific process in which the electronic device 100 recognizes and cuts the plurality of highlight video segments from the original video, and fuses the plurality of highlight video segments into one highlight video, refer to subsequent embodiments of this application. Details are not described herein.

Figure 6E:
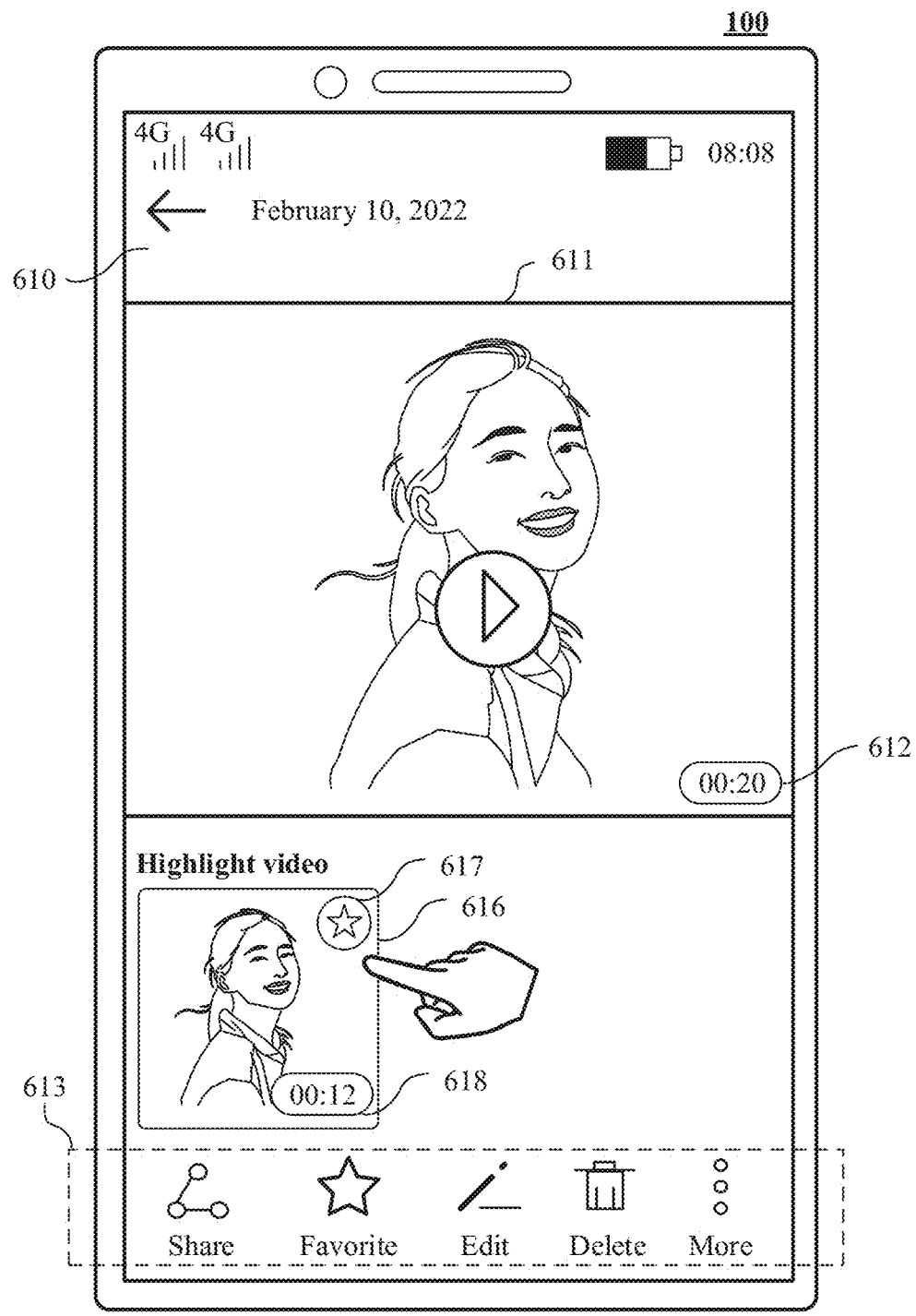
Figure 6F:
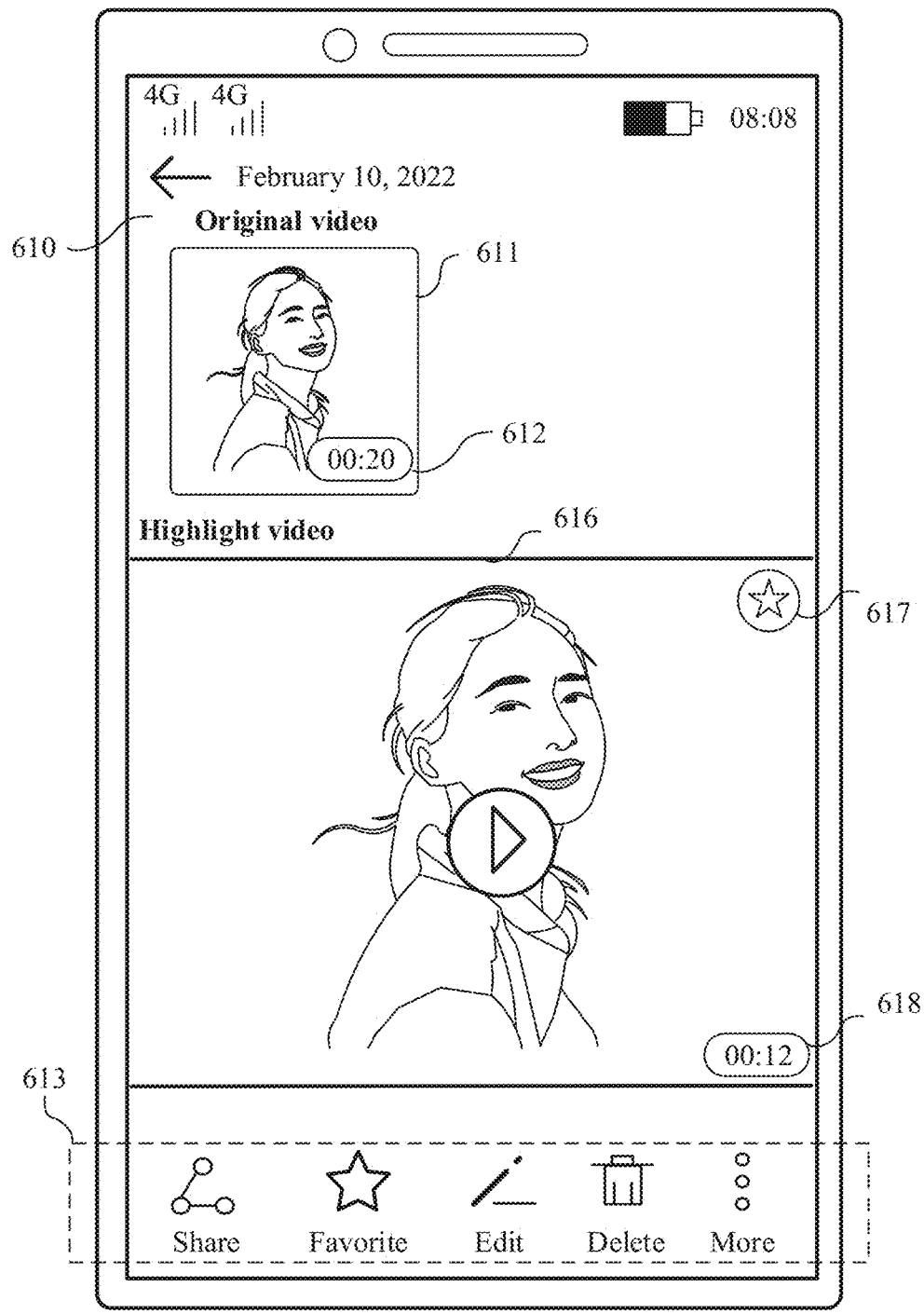

As shown in FIG. 6E, after the electronic device 100 generates the highlight video, the electronic device 100 may display, in the video display interface 610 of the original video, a display area 616 corresponding to the highlight video generated from the original video. A picture frame in the highlight video and time information 618 (for example, a time length of 12 seconds) of the highlight video may be displayed in the display area 616 of the highlight video. Optionally, a highlight mark 617 may be displayed in the display area 616 of the highlight video, and the highlight mark 617 may be used to prompt the user that the highlight video generated from the original video is displayed in the display area 616.

The electronic device 100 may receive an input (for example, a tap) from the user for the display area 616 of the highlight video. In response to the input, in the video display interface 610, the electronic device 100 may zoom out and display the display area 611 of the original video, and zoom in and display the display area 616 of the highlight video, as shown in FIG. 6E. After zooming in and displaying the display area 616 of the highlight video, the electronic device 100 may receive and respond to an input (for example, a tap) from the user for the display area 616 of the highlight video. In response to the input, the electronic device 100 may play the highlight video.

In a possible implementation, when the user determines, in the display interface of the original video displayed on the electronic device 100, to generate the highlight video from the original video, the electronic device 100 may receive the highlight scenario set by the user. The electronic device 100 may recognize and edit a plurality of highlight video segments in the highlight scene set by the user from the original video based on the highlight scene, and fuse the plurality of highlight video segments into one highlight video. For a same original video, when the user selects different highlight scenes, the electronic device 100 may generate different highlight videos.

Figure 7A:
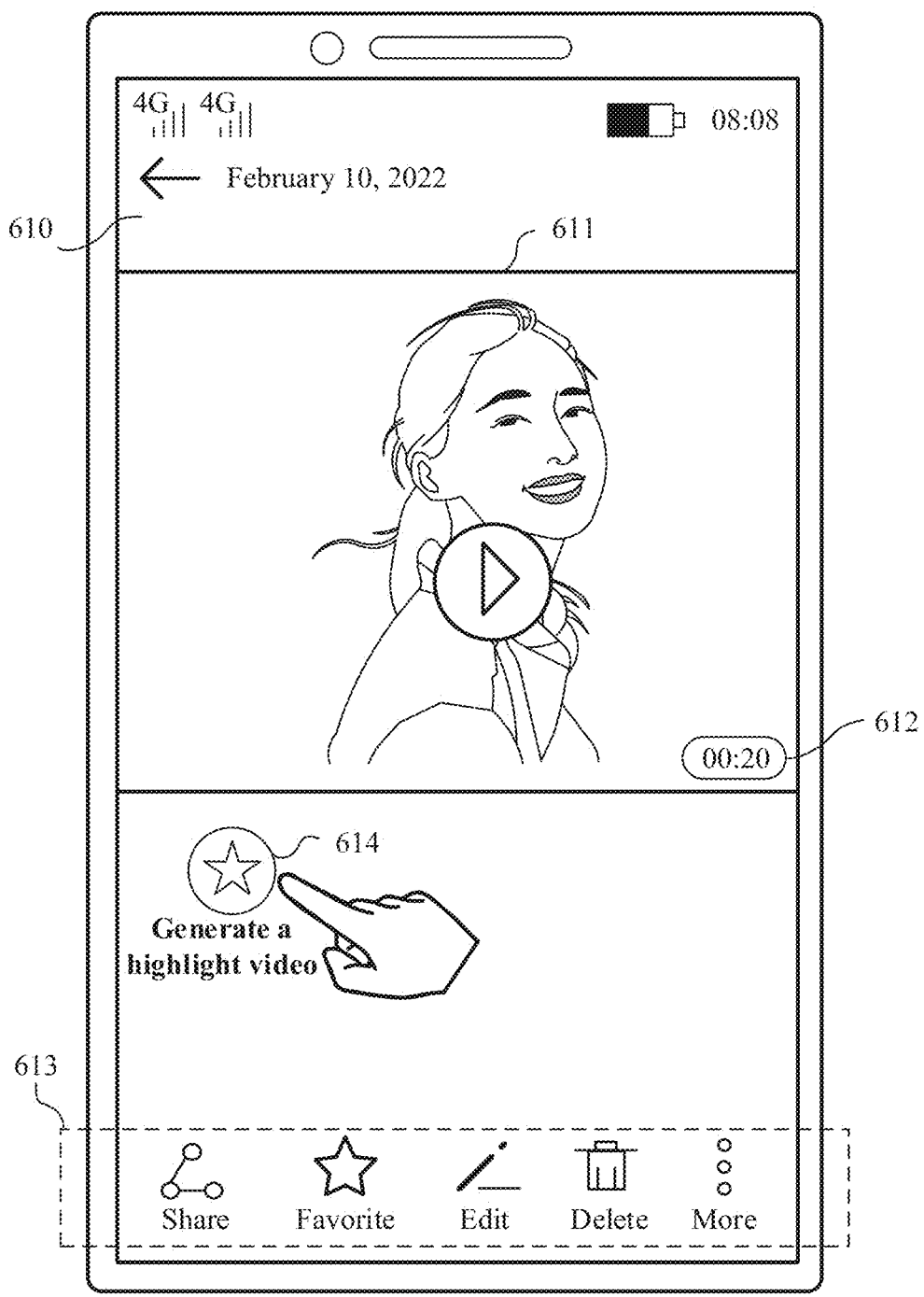
FIG. 7A-FIG. 7H are schematic diagrams of another group of interfaces for generating a highlight video according to an embodiment of this application.

For example, as shown in FIG. 7A, the electronic device 100 may display a video display interface 610. For text description of the video display interface 610, refer to the embodiment shown in FIG. 6C. Details are not described herein.

The electronic device 100 may receive an input (for example, a tap) from the user for the highlight video generation control 614. In response to the input, the electronic device 100 may display a scene settings window 710 shown in FIG. 7B.

Figure 7B:
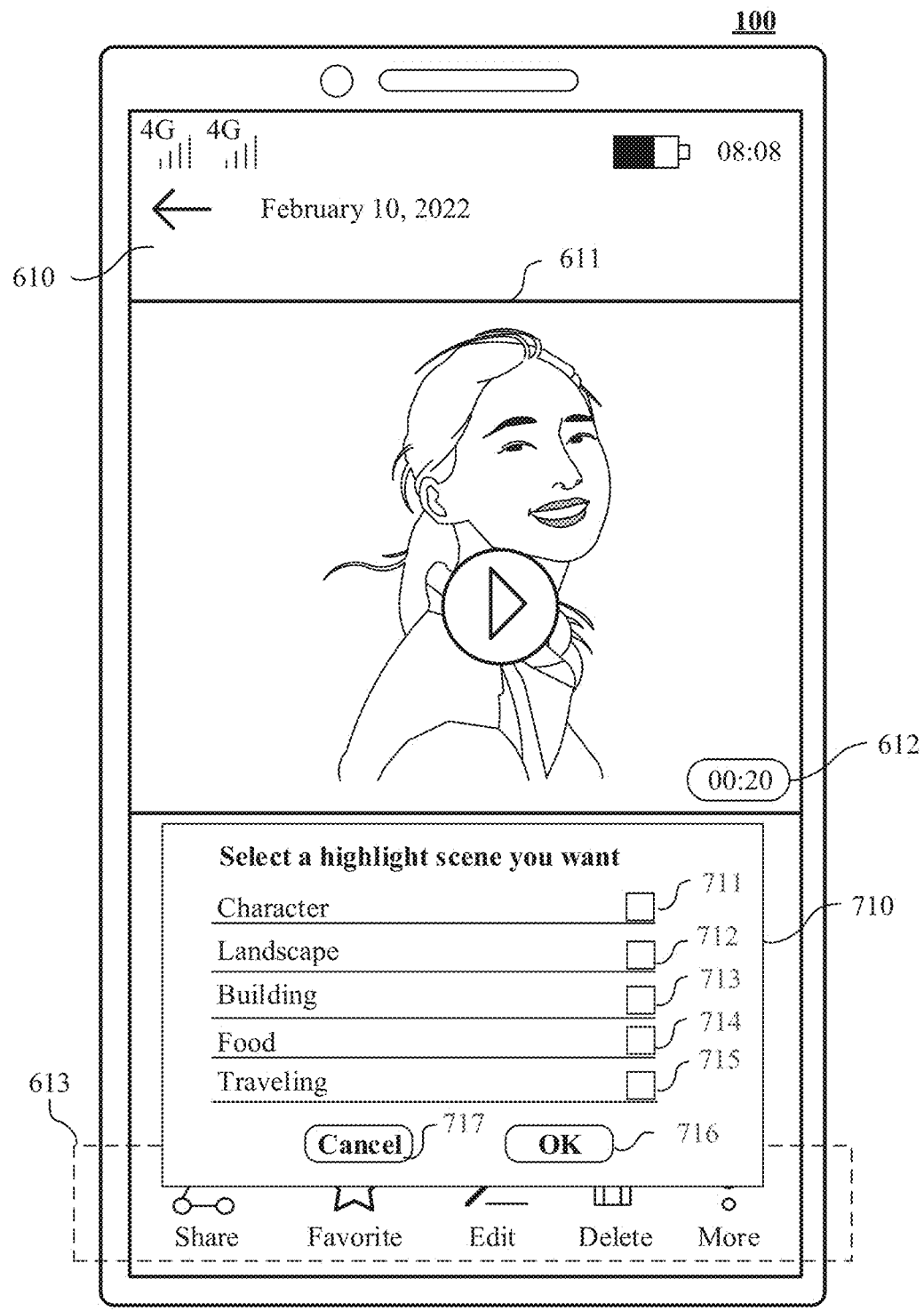

As shown in FIG. 7B, an OK control 716, a cancel control 717, and one or more highlight scene settings items, for example, a "character scene" settings item 711, a "landscape scene" settings item 712, a "building scene" settings item 713, a "food scene" settings item 714, and a "traveling scene" settings item 715, may be displayed and included in the scene settings window 710.

Figure 7C:
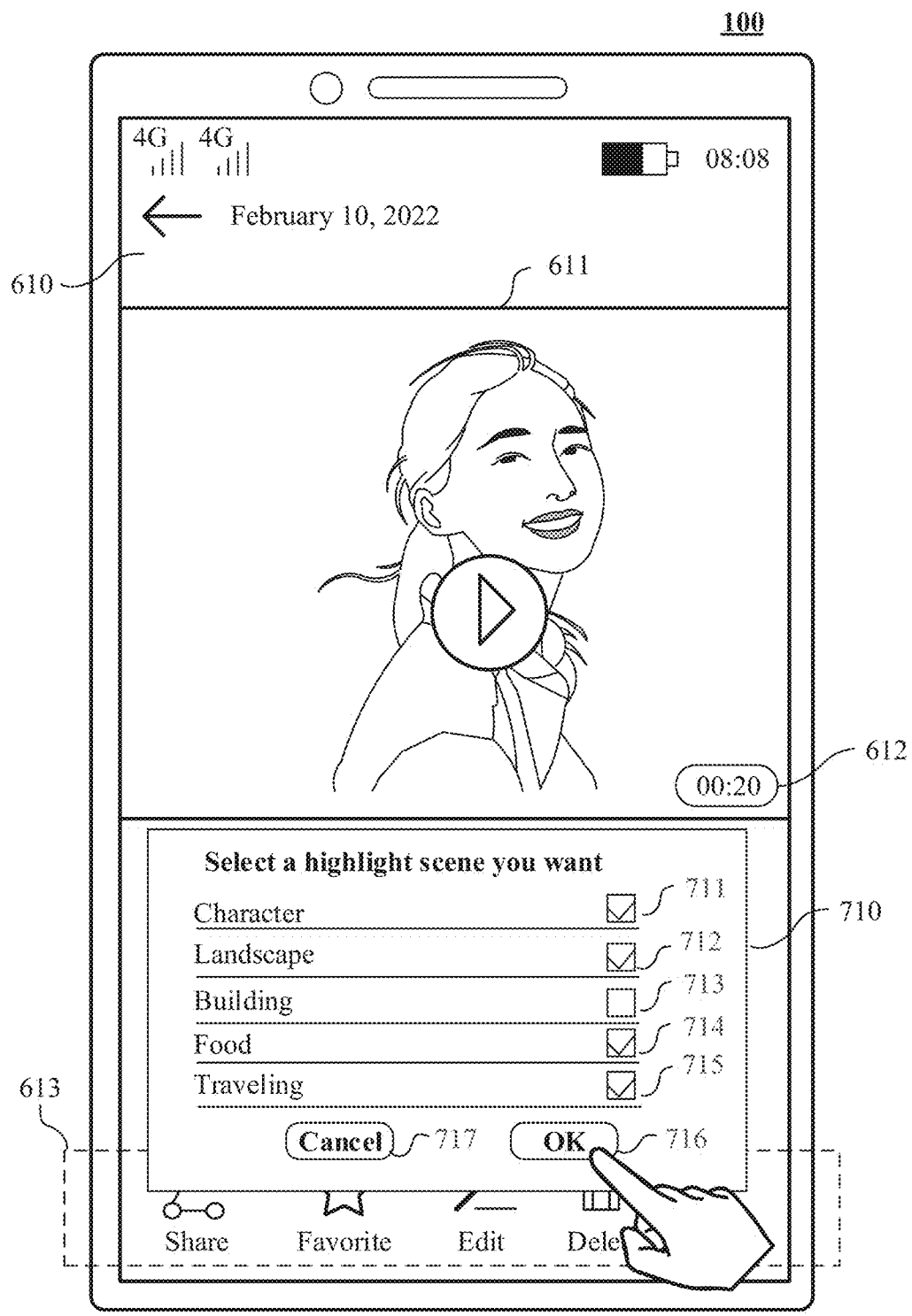

As shown in FIG. 7C, the electronic device 100 may receive an input from the user for the highlight scene settings item, and select a character scene, a landscape scene, a food scene, a traveling scene, and the like as highlight scenes for generating a highlight video. After the user sets the highlight scene, the electronic device 100 may receive an input (for example, a tap) from the user for the OK control 716. In response to the input, the electronic device 100 may recognize, from the original video, a plurality of highlight video segments corresponding to a highlight scene type set a set by the user, and fuse the plurality of highlight video segments into one highlight video (for example, a highlight video a).

Figure 7D:
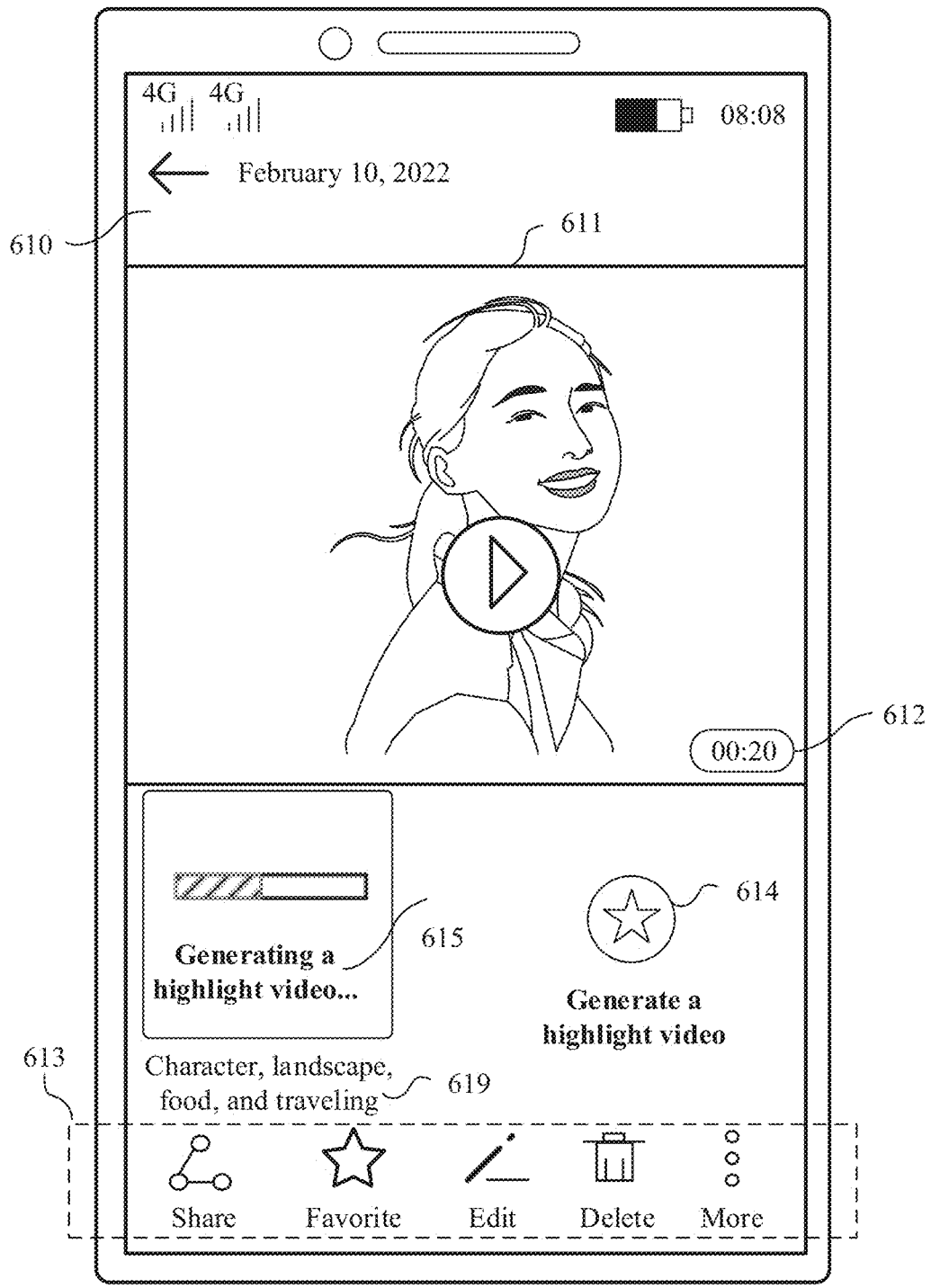

Optionally, as shown in FIG. 7D, in a process in which the electronic device 100 generates the highlight video, the electronic device 100 may display generation progress 615 of the highlight video a and a scene type of the highlight video a in the video display interface 610 of the original video. For a specific process in which the electronic device 100 recognizes and cuts the plurality of highlight video segments from the original video, and fuses the plurality of highlight video segments into one highlight video, refer to subsequent embodiments of this application. Details are not described herein.

Figure 7E:
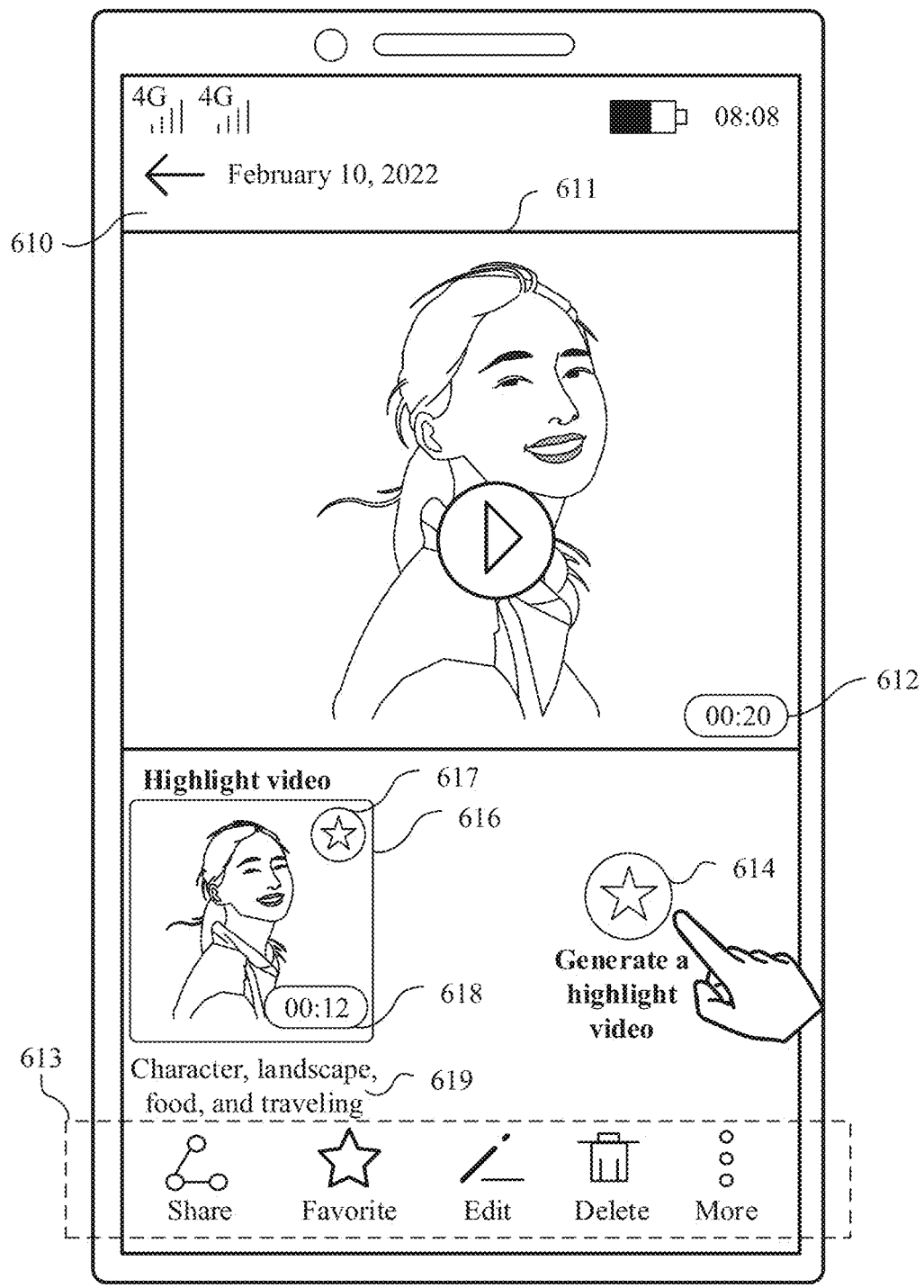

As shown in FIG. 7E, after the electronic device 100 generates the highlight video a, the electronic device 100 may display, in the video display interface 610 of the original video, a display area 616 corresponding to the highlight video a generated from the original video. A picture frame in the highlight video a, time information 618 (for example, a time length of 12 seconds) of the highlight video a, and scene information 619 (for example, a character, a landscape, food, and a traveling scene) of the highlight video a may be displayed in the display area 616 of the highlight video a. Optionally, a highlight mark 617 may be displayed in the display area 616 of the highlight video, and the highlight mark 617 may be used to prompt the user that the highlight video a generated from the original video is displayed in the display area 616.

For a same original video, when the user selects different highlight scenes, the electronic device 100 may generate different highlight videos. Therefore, when and after the electronic device 100 generates the highlight video a from the original video, the electronic device 100 may further continue to display the highlight video generation control 614 in the video display interface 610.

After generating the highlight video a from the original video, the electronic device 100 may continue to receive an input (for example, a tap) from the user for the highlight video generation control 614. In response to the input, the electronic device 100 may display a scene settings window 710 shown in FIG. 7F. For text description of the scene settings window 710, refer to the text part in the embodiment shown in FIG. 7B. Details are not described herein.

Figure 7F:
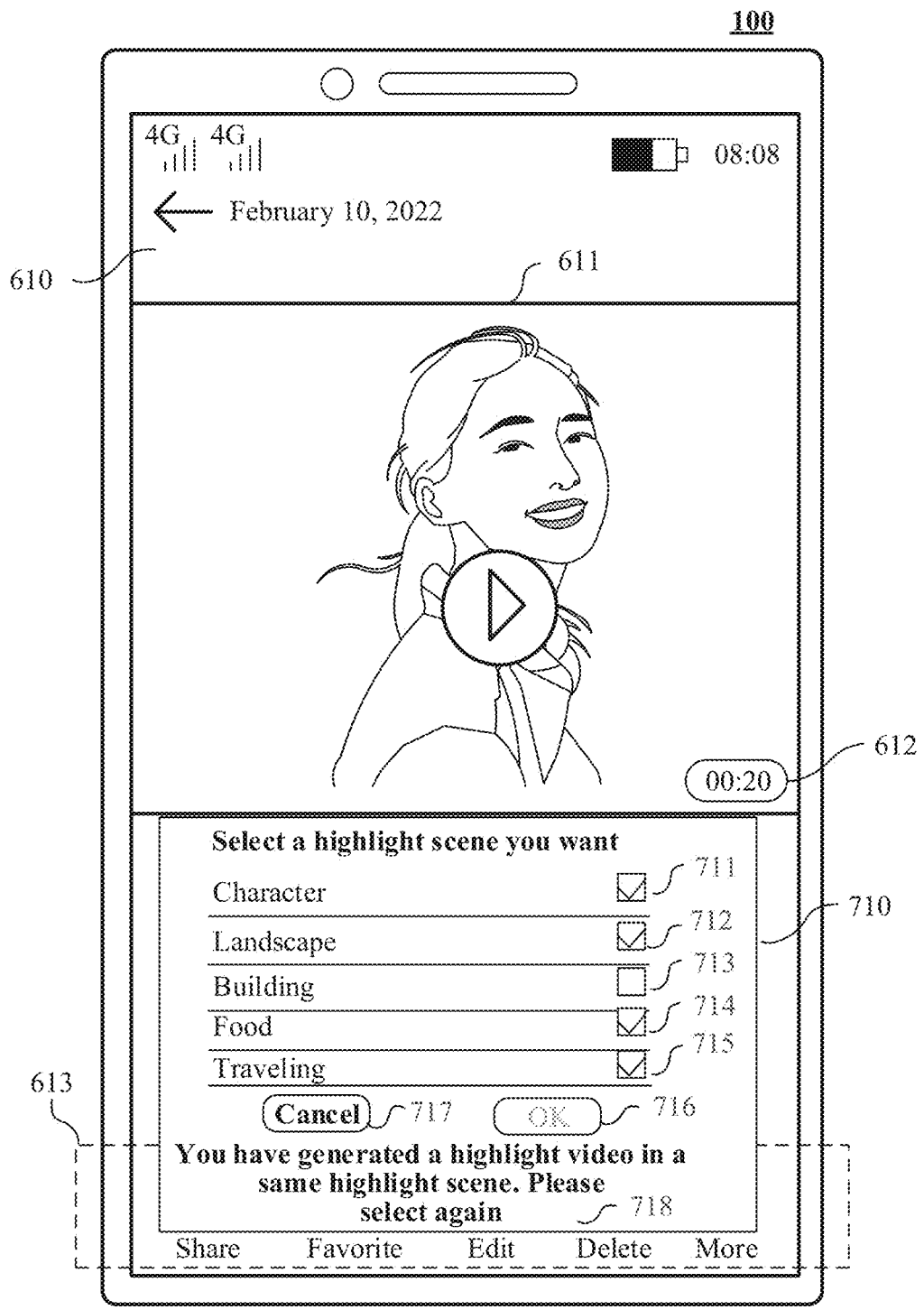

As shown in FIG. 7F, when a highlight scene type set b selected by the user in the scene settings window 710 is the same as the highlight scene type set a by using which the highlight video a is generated, the electronic device 100 may output a prompt 718 and disable the OK control 716. After the OK control 716 is disabled, it is determined that the control 716 cannot respond to an input from the user to perform a corresponding highlight video generation function. The prompt 718 may be used to prompt the user that the highlight scene type selected by the user is the same as the highlight scene by using which the highlight video a is generated. For example, the prompt 718 may be a text prompt "You have generated a highlight video in the same highlight scene. Please select again".

Figure 7G:
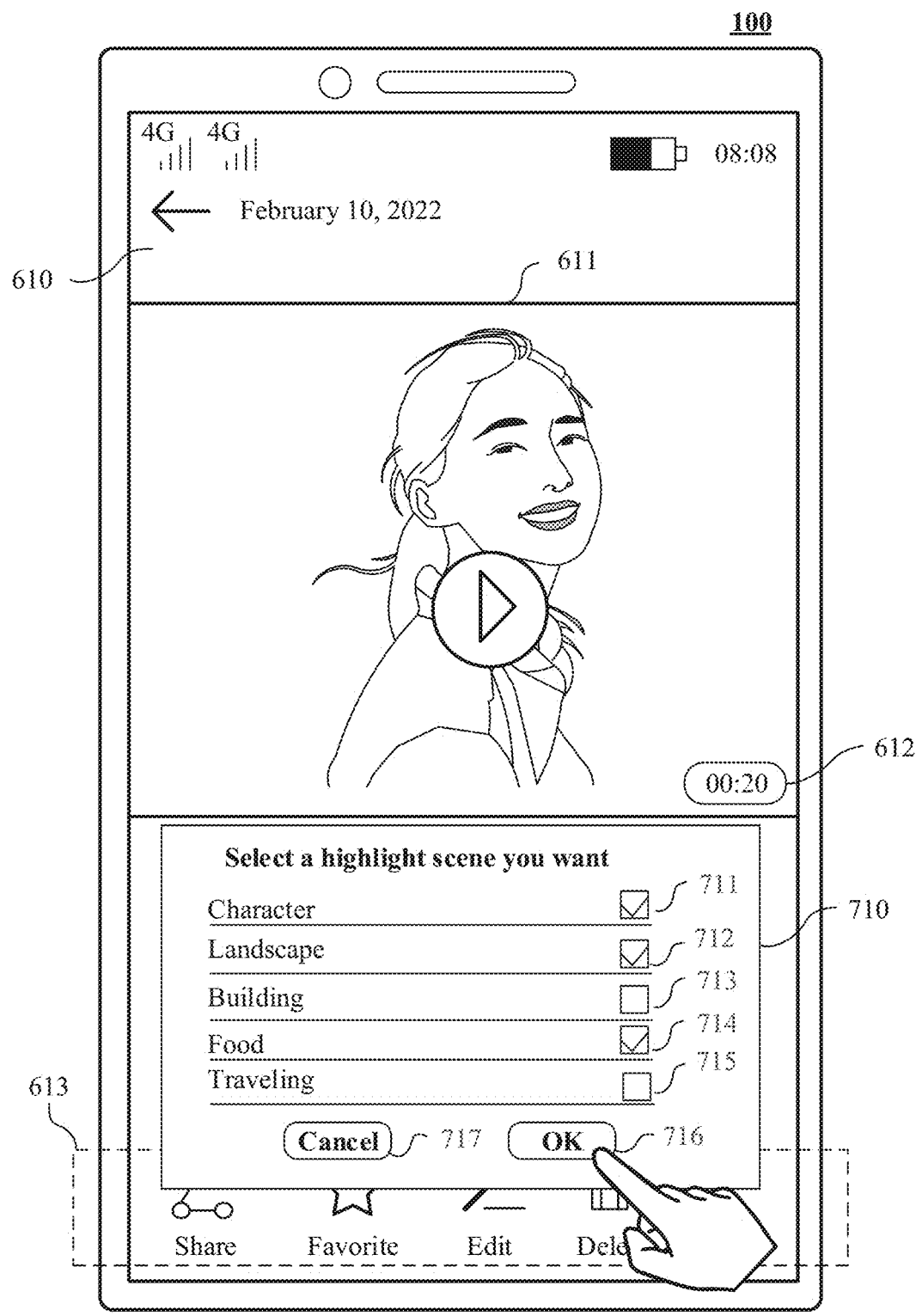

As shown in FIG. 7G, when a highlight scene type set b selected by the user in the scene settings window 710 is different from the highlight scene type set a by using which the highlight video a is generated, the electronic device 100 may enable the OK control 716.

The electronic device 100 may receive an input (for example, a tap) from the user for the OK control 716. In response to the input, the electronic device 100 may recognize, from the original video, a plurality of highlight video segments corresponding to the highlight scene set b set by the user, and fuse the plurality of highlight video segments into one highlight video (for example, a highlight video b).

Figure 7H:
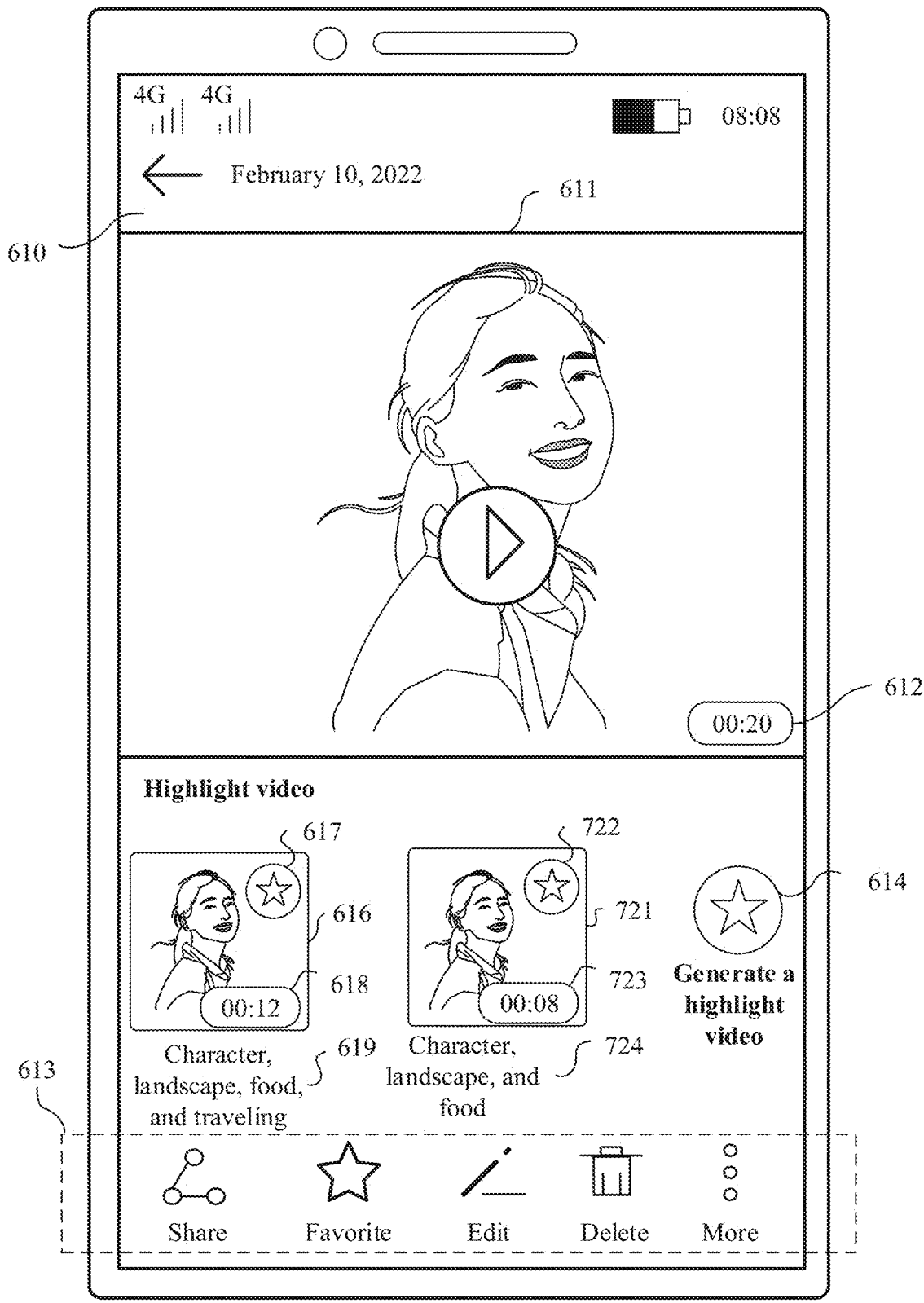

As shown in FIG. 7H, after the electronic device 100 generates the highlight video b, the electronic device 100 may display, in the video display interface 610 of the original video, a display area 721 corresponding to the highlight video b generated from the original video. A picture frame in the highlight video b, time information 723 (for example, a time length of 8 seconds) of the highlight video b, and scene information 724 (for example, a character, a landscape, food, and a traveling scene) of the highlight video b may be displayed in the display area 721 of the highlight video b. Optionally, a highlight mark 722 may be displayed in the display area 721 of the highlight video, and the highlight mark 722 may be used to prompt the user that the highlight video b generated from the original video is displayed in the display area 721.

In some application scenarios, in a video call process, the electronic device 100 may recognize and cut a plurality of highlight video segments in a highlight scene in a video stream in the video call process, and fuse the plurality of highlight video segments into one highlight video. After the video call ends, the electronic device 100 may store the highlight video. Optionally, the electronic device 100 may share the generated highlight video with the other party on the video call. In this way, in the video call process, the plurality of highlight video segments in the video stream may be fused into one highlight video, to help the user review content of the video call.

Figure 8A:
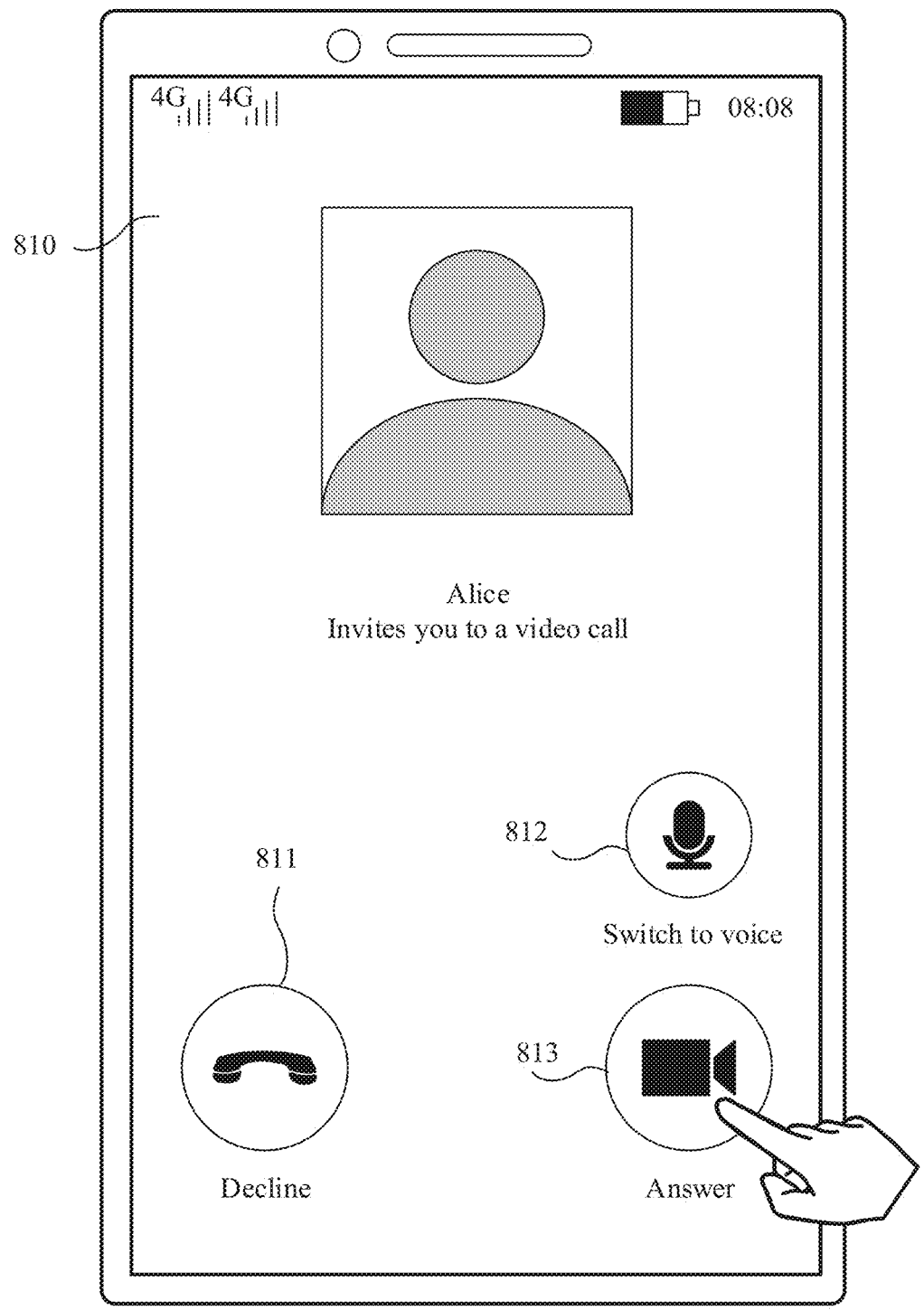
FIG. 8A-FIG. 8C are schematic diagrams of a group of interfaces for generating a highlight video in a video call scenario according to an embodiment of this application.

For example, as shown in FIG. 8A, the electronic device 100 may display a video call answer interface 810. The video call answer interface 810 may include a decline control 811, a video to voice control 812, and an answer control 813.

The electronic device 100 may receive an input (for example, a tap) from the user for the answer control 813. In response to the input, the electronic device 100 may display a video call interface 820 shown in FIG. 8B, receive a video stream sent by the other call party, and simultaneously capture a video stream in real time by using a camera and a microphone.

Figure 8B:
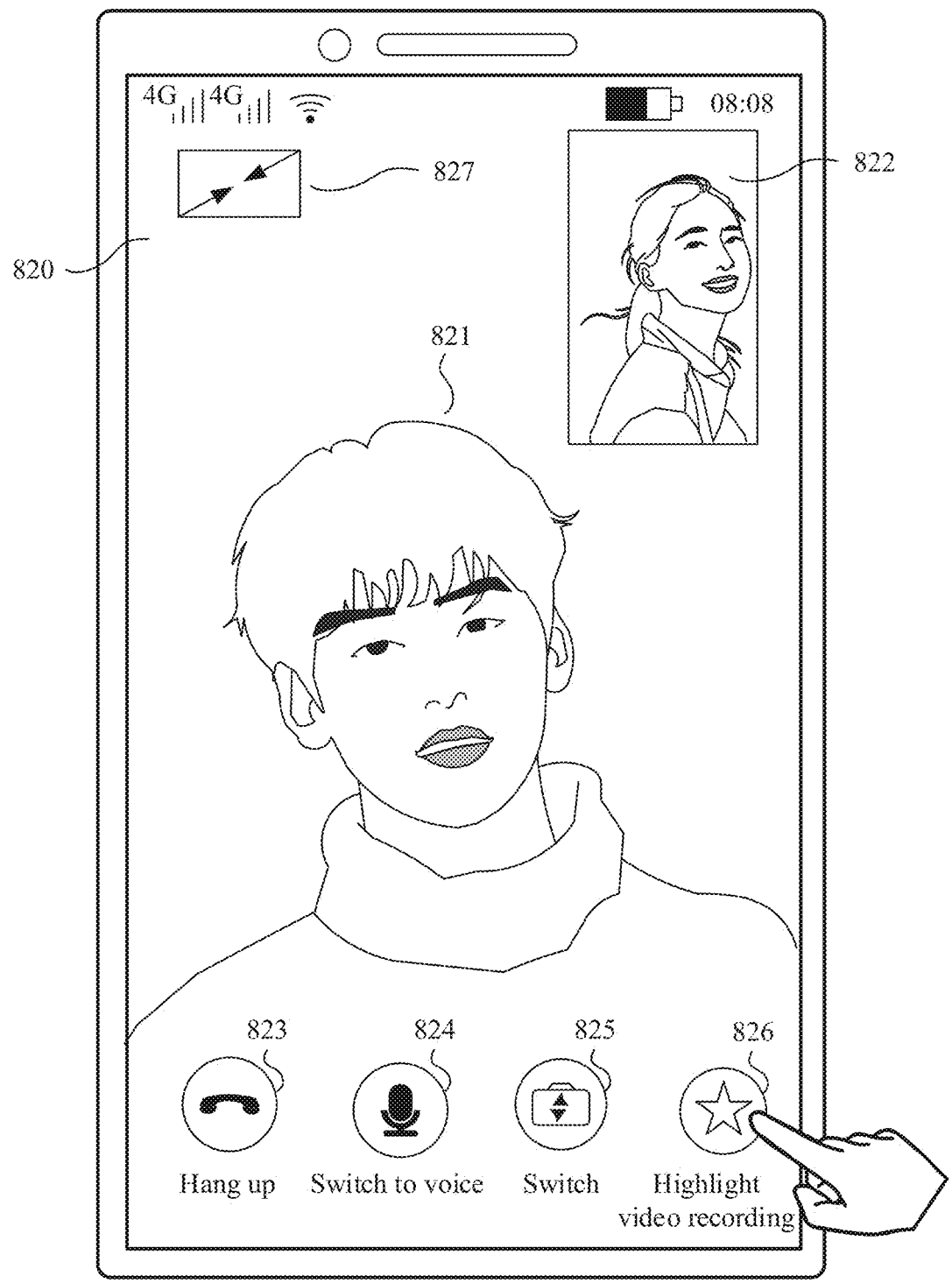

As shown in FIG. 8B, the video call interface 820 may include a picture 821 in the video stream captured by the electronic device 100 in real time by using the camera and the microphone, a picture 822 in the video stream sent by the other call party, a hang-up control 823, a video to voice control 824, a camera switching control 825, a highlight video recording control 826, and a picture switching control 827. The hang-up control 823 may be used to trigger the electronic device 100 to hang up a video call with the other party. The video to voice control 824 may be used to trigger the electronic device 100 to switch a video call to a voice call. The camera switching control 825 may be used to trigger the electronic device 100 to switch a camera for capturing a video picture in real time (for example, switch a front-facing camera to a rear-facing camera or switch a rear-facing camera to a front-facing camera). The highlight video recording control 826 may be used to trigger the electronic device 100 to generate a highlight video based on a call video stream. The picture switching control 827 may be used to trigger the electronic device 100 to switch display locations of the picture 821 and the picture 822.

The electronic device 100 may receive an input (for example, a tap) from the user for the highlight video recording control 826. In response to the input, the electronic device 100 may recognize a plurality of highlight video segments in a highlight scene in the video stream captured by the electronic device 100 in real time by using the camera and the microphone and/or the video stream sent by the other call party, and fuse the plurality of highlight video segments into one highlight video. After recording ends or the video call ends, the electronic device 100 may store the highlight video.

Figure 8C:
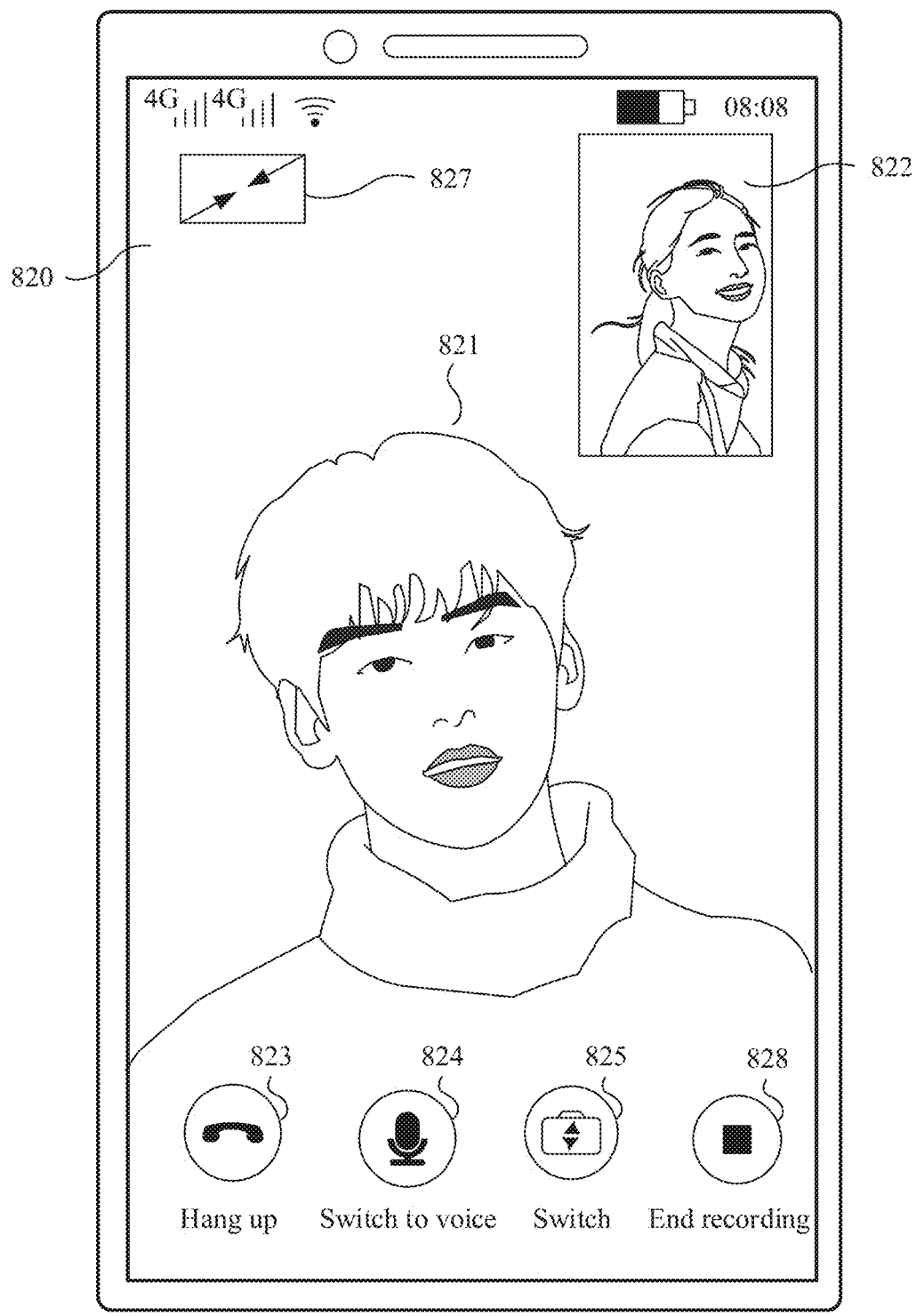

As shown in FIG. 8C, after the electronic device 100 starts highlight video recording, the electronic device 100 may replace the highlight video recording control 826 with an end recording control 828. The end recording control 828 may be used to trigger the electronic device 100 to end recording of the highlight video.

In some application scenarios, in a live streaming process, the electronic device 100 may recognize and cut a plurality of highlight video segments in a highlight scene in a video stream in the live streaming process, and fuse the plurality of highlight video segments into one highlight video. After live streaming ends, the electronic device 100 may store the highlight video. Optionally, the electronic device 100 may synchronize the generated highlight video to a server of a live streaming application to bind the generated highlight video to a live streaming account, and share the generated highlight video in a public viewing area for viewing by another account that follows the live streaming account. In this way, in the live streaming process, the plurality of highlight video segments in the live streaming may be fused into one highlight video, to help the user and the another user who follows the live streaming account review content of a video call.

In a possible implementation, in the live streaming process, the live server may obtain a video stream that is live streamed by the electronic device 100, and the live server may recognize a plurality of highlight video segments from the video stream that is live streamed by the electronic device 100, fuse the plurality of highlight video segments into one highlight video, and store the highlight video in storage space associated with a live streaming account that is logged in to on the electronic device 100. The user may further use the electronic device 100 to share the highlight video with another user through the live server for viewing, to help the user and the another user who follows the live streaming account review content of a video call.

In this embodiment of this application, the original video may be referred to as a first video, and the highlight video may be referred to as a second video. The second video may include some video segments in the first video. For example, the first video includes a first video segment, a second video segment (a highlight video segment), a second video segment (an invalid video segment), and a third video segment (a highlight video segment). An end moment of the first video segment is earlier than or equal to a start moment of the second video segment, and an end moment of the second video segment is earlier than or equal to a start moment of the third video segment. The second video segment is an invalid segment, and therefore the second video includes the first video segment and the third video segment, and does not include the second video segment.

The first video further includes a fourth video segment, and if the fourth video segment is a highlight video segment, the second video includes the fourth video segment: or if the fourth video segment is an invalid video segment, the second video does not include the fourth video segment.

Duration of the first video is greater than duration of the second video, duration of the first video is less than duration of the second video, or duration of the second video is equal to duration of the second video.

The highlight video segment includes a video segment that is in the first video and in which a photographing scene is a highlight scene and does not include a scene transition segment. Alternatively, the highlight video segment includes a video segment that is in the first video and in which a photographing scene is a highlight scene and does not include a scene transition segment with noise or without sound. The highlight scene includes one or more of a character, a landscape, food, Spring Festival, Christmas, a building, a beach, fireworks, a plant, a snow scene, a traveling scene, or the like.

A video processing method provided in an embodiment of this application is described below with reference to a flowchart and a functional module diagram.

Figure 9:
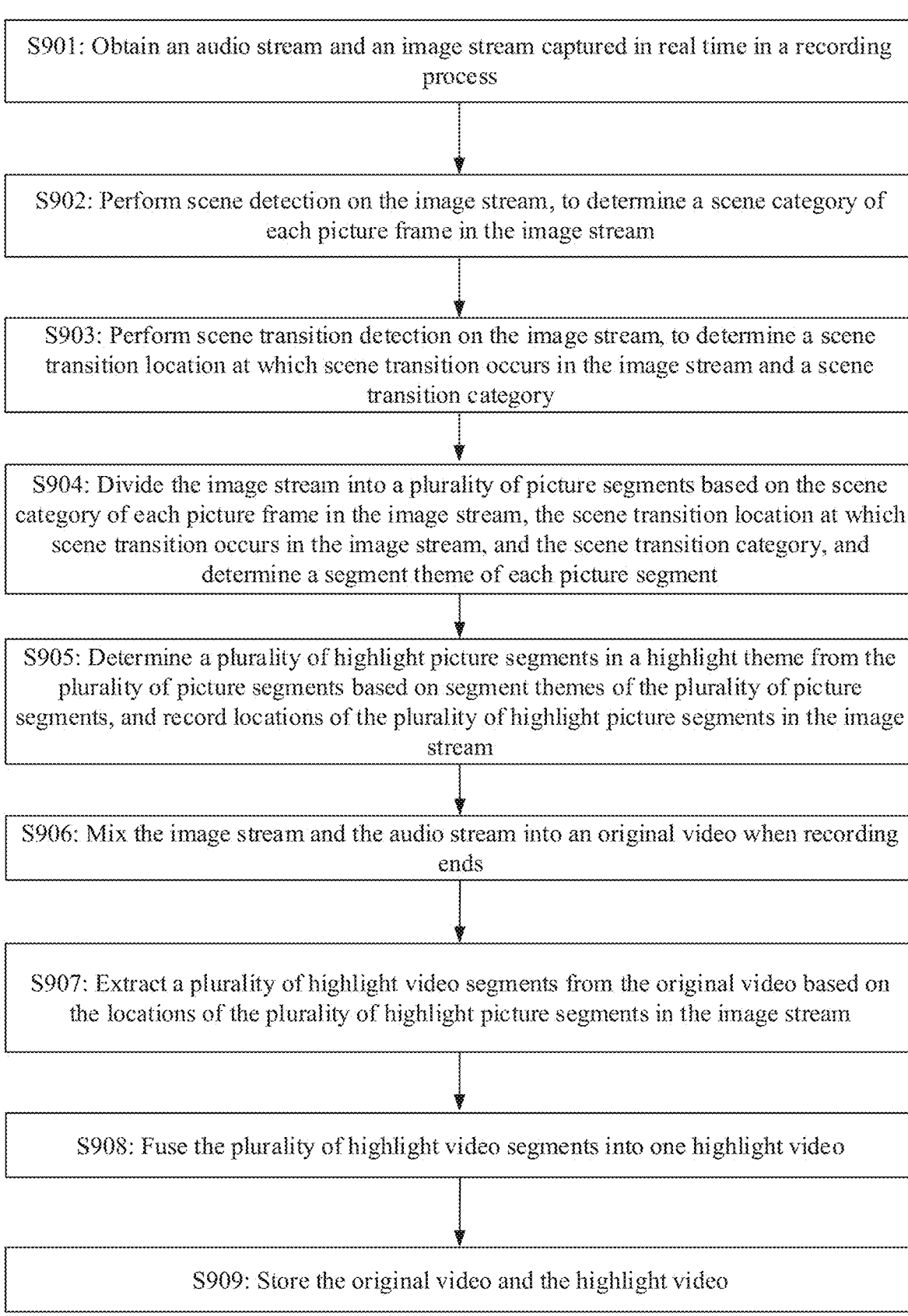
FIG. 9 is a schematic flowchart of a video processing method according to an embodiment of this application.

FIG. 9 is a schematic flowchart of a video processing method according to an embodiment of this application.

As shown in FIG. 9, the method may include the following steps.

S901: An electronic device 100 obtains an audio stream and an image stream captured in real time in a recording process.

In the recording process, the electronic device 100 may capture the image stream in real time by using a camera, and capture the audio stream in real time by using a microphone and an audio circuit. A timestamp of the audio stream captured in real time is the same as a timestamp of the image stream captured in real time.

For an interface in the recording process, refer to the embodiment shown in FIG. 3A-FIG. 3I or the embodiment shown in FIG. 5A-FIG. 5e. Details are not described herein.

S902: The electronic device 100 performs scene detection on the image stream, to determine a scene category of each picture frame in the image stream.

The scene category may include a character, Spring Festival, Christmas, an ancient building, a beach, fireworks, a plant, a snow scene, food, a traveling scene, and the like.

The electronic device 100 may recognize the scene category of each picture frame in the image stream by using a trained scene classification model. For training of the scene classification model, a data set may be established in advance by using a large amount of image data for which a scene category is marked. Then, the data set is input to the classification model to train the neural network classification model. A neural network used for the scene classification model is not limited, for example, may be a convolution neural network, a fully convolutional neural network, a deep neural network, or a BP neural network.

In a possible implementation, to increase a speed of recognizing the scene category of the picture frame in the image stream, before inputting the image stream to the scene classification model, the electronic device 100 may first perform interval sampling (for example, select one frame from every three frames) on the image stream captured in real time, to obtain a sampled image stream, record a picture frame number of a sampled image frame in the sampled image stream in the real-time image stream, input the sampled image stream to the neural network classification model, and recognize a scene category of each sampled image frame in the sampled image stream. After recognizing the scene category of each sampled image frame in the sampled image stream, the electronic device 100 may mark, based on the scene category and the picture frame number of the sampled image frame, a plurality of picture frames that are in the image stream and whose picture frame numbers are the same as the picture frame number of the sampled image frame or that are adjacent to the sampled image frame with the scene category corresponding to the sampled image frame. For example, the electronic device 100 may select one picture frame from every three picture frames in the image stream as a sampled picture frame. A 77th picture frame in the image stream is a sampled image frame, and a scene category of the sampled image frame whose frame number is 77 is "character". In this case, the electronic device 100 may mark scene categories of all of the 77th picture frame, a 76th picture frame, and a 78th picture frame in the image stream with "character".

In a possible implementation, to increase a speed of recognizing the scene category of the picture frame in the image stream, resolution of the image stream may be reduced (for example, reduced from 4K to resolution of 640*480), and then the image stream may be input to the scene classification model.

In a possible implementation, to increase a speed of recognizing the scene category of the picture frame in the image stream, resolution of the image stream may be reduced (for example, reduced from 4K to resolution of 640*480), interval sampling may be performed, and then the image stream may be input to the scene classification model.

S903: The electronic device 100 performs scene transition detection on the image stream, to determine a scene transition location at which scene transition occurs in the image stream and a scene transition category.

Transition categories of the scene transition may include video subject transition (for example, which may be specifically classified into the following: For a video subject, there is transition from a landscape to a character, transition from a character to a landscape, transition from a character to food, transition from food to a character, transition from a character to an ancient building, and transition from an ancient building to a landscape), picture zooming, quick camera movement, and the like.

The electronic device 100 may recognize the scene transition location at which scene transition occurs in the image stream and the scene transition category by using a trained scene transition recognition model. For training of the scene transition recognition model, a data set may be established in advance by using a large quantity of image streams for which a scene transition location and a scene transition category are marked. Then, the data set is input to the scene transition recognition model to train the scene transition recognition model. A neural network used for the scene transition recognition model is not limited, for example, may be a 3D convolutional neural network.

In a possible implementation, to increase a speed of recognizing the scene transition location at which scene transition occurs in the image stream and the scene transition category, before inputting the image stream to the scene transition recognition model, the electronic device 100 may first perform resolution reduction processing on the image stream captured in real time (for example, reduce resolution from 4K to resolution of 640*480), to obtain a low-resolution image stream, then input the low-resolution image stream to the scene transition recognition model, and perform scene transition detection, to recognize a scene transition location in the low-resolution image stream and a scene transition category. The electronic device 100 may determine the corresponding scene transition location in the image stream obtained in real time and the corresponding scene transition category based on the scene transition location in the low-resolution image stream and the scene transition category.

In this embodiment of this application, an execution sequence of step S902 and step S903 is not limited. Step S902 may be performed first, step S903 may be performed first, or step S902 and step S903 may be performed in parallel.

S904: The electronic device 100 divides the image stream into a plurality of picture segments based on the scene category of each picture frame in the image stream, the scene transition location at which scene transition occurs in the image stream, and the scene transition category, and determines a segment theme of each picture segment.

S905: The electronic device 100 determines a plurality of highlight picture segments in a highlight theme from the plurality of picture segments based on segment themes of the plurality of picture segments, and records locations of the plurality of highlight picture segments in the image stream.

Figure 10:
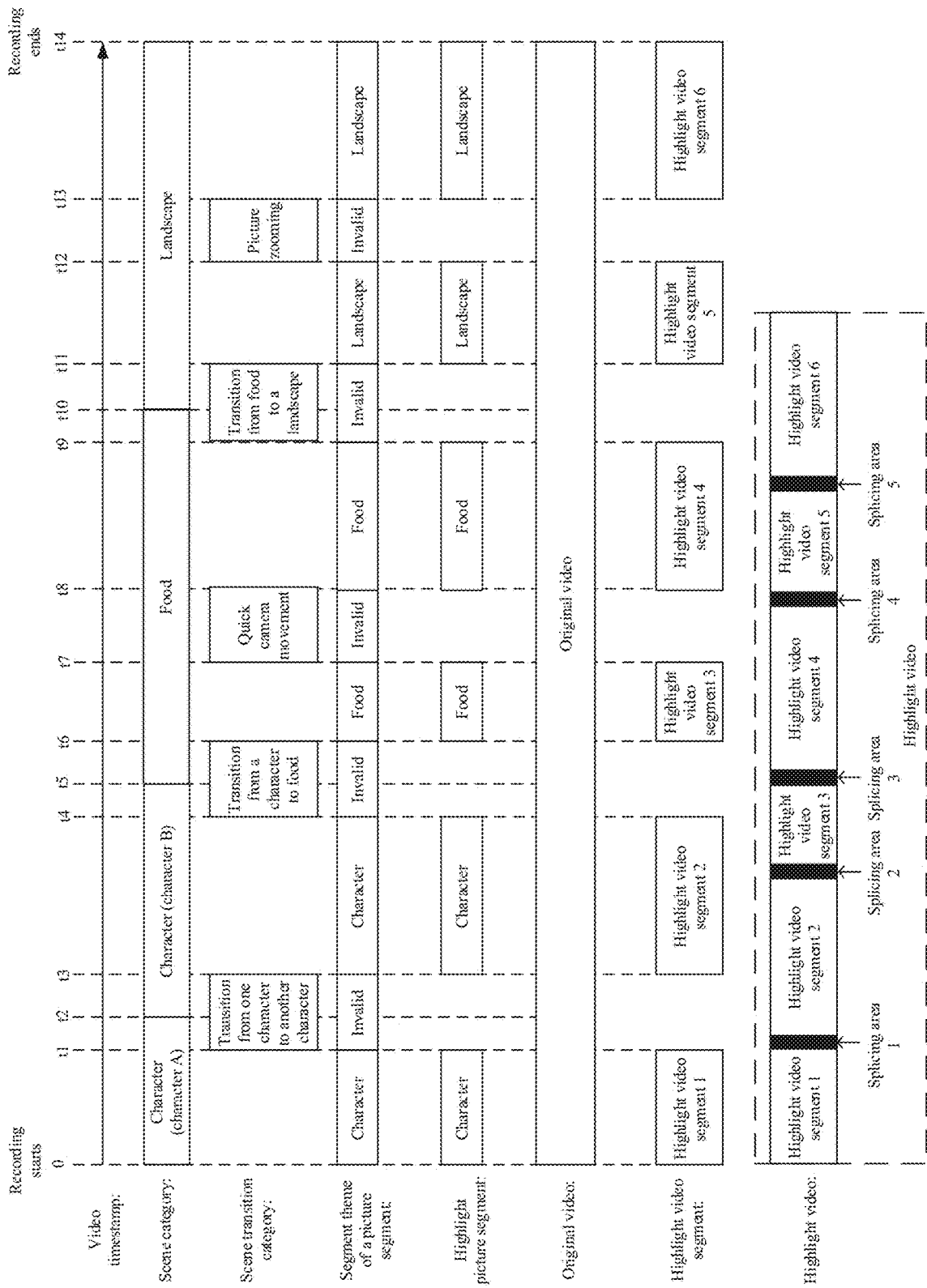
FIG. 10 is a schematic diagram of a time sequence for generating a highlight video according to an embodiment of this application.

For example, as shown in FIG. 10, a time length of the image stream may be 0~t14. A result of recognizing the scene category in the image stream may be as follows: A scene category of a segment from 0 to t2 in the image stream is "character (character A)", a scene category of a segment from t2 to t5 in the image stream is "character (character B)", a scene category of a segment from t5 to t10 in the image stream is "food", and a scene category of a segment from t10 to t14 in the image stream is "landscape".

A result of recognizing scene transition in the image stream may be as follows: A scene transition category of a segment from t1 to t3 in the image stream is "transition from a character to a character", a scene transition category of a segment from t4 to t6 in the image stream is "transition from a character to food", a scene transition category of a segment from t7 to t8 in the image stream is "quick camera movement", and a scene transition category of a segment from t9 to t11 in the image stream is "picture zooming".

Division of the image stream into picture segments and the segment theme may be as follows: The image stream may be divided into a picture segment from t0 to t1, a picture segment from t1 to t3, a picture segment from t3 to t4, a picture segment from t4 to t6, a picture segment from t6 to t7, a picture segment from t7 to t8, a picture segment from t8 to t9, a picture segment from 19 to t11, a picture segment from t11 to t12, a picture segment from t12 to t13, and a picture segment from t13 to t14. A segment theme of the picture segment from t0 to t1 is "character", a segment theme of the picture segment from t1 to t3 is "invalid", a segment theme of the picture segment from t3 to t4 is "character", a segment theme of the picture segment from t4 to t6 is "invalid", a segment theme of the picture segment from t6 to t7 is "food", a segment theme of the picture segment from t7 to t8 is "invalid", a segment theme of the picture segment from t8 to t9 is "food", a segment theme of the picture segment from 19 to t11 is "invalid", a segment theme of the picture segment from t11 to t12 is "landscape", a segment theme of the picture segment from t12 to t13 is "invalid", and a segment theme of the picture segment from t13 to t14 is "landscape".

The electronic device 100 may remove segments themed "invalid" from the plurality of picture segments, and retain the remaining highlight picture segments. For example, as shown in FIG. 10, the remaining highlight picture segments may include the picture segment from t0 to t1, the picture segment from t3 to t4, the picture segment from t6 to t7, the picture segment from t8 to t9, the picture segment from t11 to t12, and the picture segment from t13 to t14.

S906: The electronic device 100 mixes the image stream and the audio stream into an original video when recording ends.

When recording ends, the electronic device 100 may mix the image stream and the audio stream into the original video based on a timeline of the image stream and a timeline of the audio stream. The electronic device 100 may receive an input from a user to trigger end of video recording, or the electronic device 100 may automatically end recording when recording is performed for specified duration.

S907: The electronic device 100 extracts a plurality of highlight video segments from the original video based on the locations of the plurality of highlight picture segments in the image stream.

For example, the plurality of highlight picture segments may include the picture segment from t0 to t1, the picture segment from t3 to t4, the picture segment from t6 to 17, the picture segment from 18 to t9, the picture segment from t11 to t12, and the picture segment from t13 to t14. In the original video, the electronic device 100 may extract a video segment whose timeline is t0~t1 as a highlight video segment 1, extract a video segment whose timeline is t3~14 as a highlight video segment 2, extract a video segment whose timeline is t6~17 as a highlight video segment 3, extract a video segment whose timeline is t8~19 as a highlight video segment 4, extract a video segment whose timeline is t11~t12 as a highlight video segment 5, and extract a video segment whose timeline is t13~t14 as a highlight video segment 6.

S908: The electronic device 100 fuses the plurality of highlight video segments into one highlight video.

The electronic device 100 may directly splice the plurality of highlight video segments into one highlight video in a time sequence. For example, when the original video includes a first video segment, a second video segment, and a third video segment, and the highlight video segments include the first video segment and the third video segment, the electronic device may splice an end location of the first video segment and a start location of the third video segment, to obtain the highlight video.

In a possible implementation, in a splicing process, the electronic device 100 may add a video special effect to a splicing area of the highlight video segments, to implement video transition. The video special effect may include a picture special effect. Optionally, the video special effect may further include an audio special effect. For example, when the original video includes a first video segment, a second video segment, and a third video segment, and the highlight video segments include the first video segment and the third video segment, the electronic device may splice an end location of the first video segment and a start location of a first special effect segment, and splice an end location of the first special effect segment and a start location of the third video segment, to obtain the second video.

In the splicing area, a time area may be added between an end location of a former highlight video segment and a start location of a latter highlight video segment in the two highlight video segments. For example, as shown in FIG. 10, there may be a splicing area 1 between an end location of the highlight video segment 1 and a start position of the highlight video segment 2, there may be a splicing area 2 between an end location of the highlight video segment 2 and a start position of the highlight video segment 3, there may be a splicing area 3 between an end location of the highlight video segment 3 and a start position of the highlight video segment 4, there may be a splicing area 4 between an end location of the highlight video segment 5 and a start position of the highlight video segment 6, and there may be a splicing area 5 between an end location of the highlight video segment 5 and a start position of the highlight video segment 6.

Figure 11:
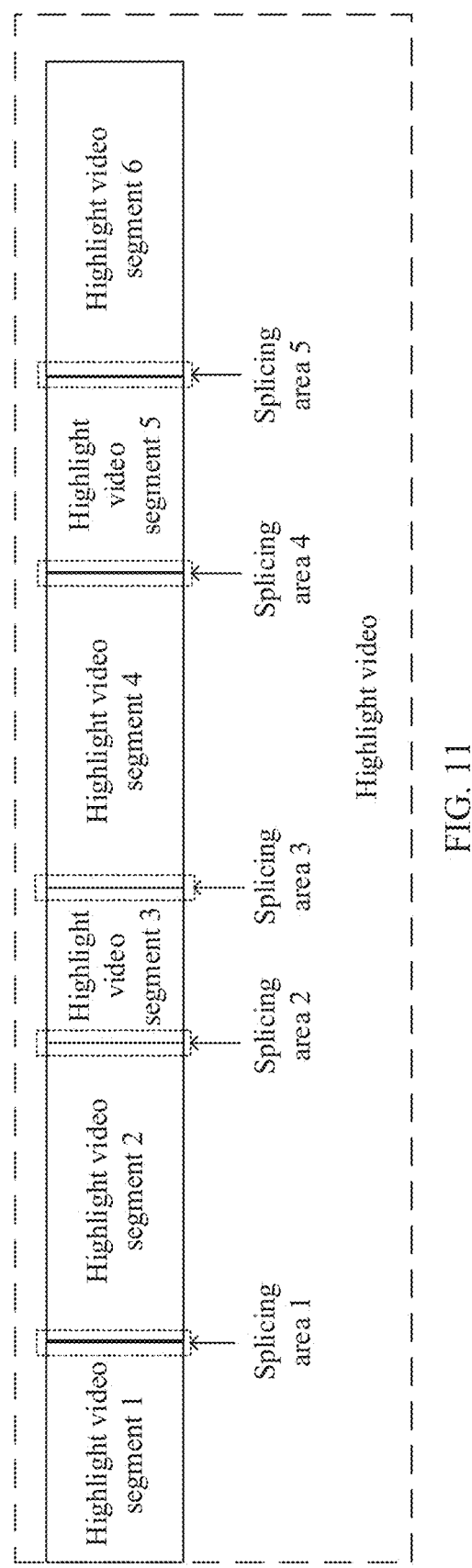
FIG. 11 is a schematic diagram of obtaining a highlight video through splicing according to an embodiment of this application.

In a possible implementation, the splicing area may be an area including an end part area (for example, an end 500-ms part) of the former highlight video segment and a start part area (for example, a start 500-ms part) of the latter highlight video segment in the two highlight video segments. For example, as shown in FIG. 11, an end part area of the highlight video segment 1 and a start part area of the highlight video segment 2 may constitute the splicing area 1, an end part area of the highlight video segment 2 and a start part area of the highlight video segment 3 may constitute the splicing area 2, an end part area of the highlight video segment 3 and a start part area of the highlight video segment 4 may constitute the splicing area 3, an end part area of the highlight video segment 4 and a start part area of the highlight video segment 5 may constitute the splicing area 4, and an end part area of the highlight video segment 5 and a start part area of the highlight video segment 6 may constitute the splicing area 5.

The picture special effect in the splicing area may include fly-in, fly-out, picture fusion of two adjacent highlight video segments, or the like. For example, in a splicing area of two highlight video segments, a picture of a former highlight video segment may gradually fly out of a video display window from a left side, and a picture of a latter highlight video segment may gradually fly into the video display window from a right side.

The audio special effect in the splicing area may include absolute music, a song, or the like. In a possible implementation, when the splicing area may be an area including an end part area of the former highlight video segment and a start part area (for example, a start 500-ms part) of the latter highlight video segment in the two highlight video segments, the electronic device 100 may gradually decrease audio volume of the former highlight video segment, and gradually increase audio volume of the latter highlight video segment in the splicing area.

In a possible implementation, the electronic device 100 may select, based on segment themes corresponding to the two highlight video segments before and after the splicing area, a video special effect to be used in the splicing area. For example, a segment theme corresponding to the highlight video segment 1 before the splicing area 1 is "character", and a segment theme corresponding to the highlight video segment 2 after the splicing area 1 is "character", and therefore a video special effect 1 may be used in the splicing area 1: a segment theme corresponding to the highlight video segment 2 before the splicing area 2 is "character", and a segment theme corresponding to the highlight video segment 3 after the splicing area 2 is "food", and therefore a video special effect 2 may be used in the splicing area 2: a segment theme corresponding to the highlight video segment 3 before the splicing area 3 is "food", and a segment theme corresponding to the highlight video segment 4 after the splicing area 3 is "food", and therefore a video special effect 3 may be used in the splicing area 1: a segment theme corresponding to the highlight video segment 4 before the splicing area 4 is "food", and a segment theme corresponding to the highlight video segment 5 after the splicing area 4 is "landscape", and therefore a video special effect 4 may be used in the splicing area 4; and a segment theme corresponding to the highlight video segment 5 before the splicing area 5 is "landscape", and a segment theme corresponding to the highlight video segment 6, after the splicing area 5 is "landscape", and therefore a video special effect 5 may be used in the splicing area 5.

In a possible implementation, after splicing the plurality of highlight video segments into one highlight video in a time sequence, the electronic device 100 may add background music to the highlight video. Optionally, the electronic device 100 may select the background music based on segment themes of the plurality of highlight video segments. For example, the electronic device 100 may select a segment theme that appears for a longest time from the segment themes of the plurality of highlight video segments as a theme of the highlight video, select music corresponding to the theme of the highlight video as the background music based on the theme of the highlight video, and add the background music to the highlight video.

In a possible implementation, the electronic device 100 may separately add music to the plurality of highlight video segments based on segment themes of the plurality of highlight video segments, and then splice, in a time sequence, the plurality of highlight video segments obtained after the music is added into one highlight video. For example, the segment theme corresponding to the highlight video segment 1 is "character", and therefore music 1 may be used for the segment theme of the highlight video segment 1; the segment theme corresponding to the highlight video segment 2 is "character", and therefore the music 1 may be used for the segment theme of the highlight video segment 1; the segment theme corresponding to the highlight video segment 3 is "food", and therefore music 2 may be used for the segment theme of the highlight video segment 1; the segment theme corresponding to the highlight video segment 4 is "food", and therefore the music 2 may be used for the segment theme of the highlight video segment 1; the segment theme corresponding to the highlight video segment 5 is "landscape", and therefore music 3 may be used for the segment theme of the highlight video segment 1; and the segment theme corresponding to the highlight video segment 6 is "landscape", and therefore the music 3 may be used for the segment theme of the highlight video segment 1.

S909: The electronic device 100 stores the original video and the highlight video.

For a schematic diagram of an interface for displaying the stored original video and the stored highlight video after the electronic device 100 stores the original video and the highlight video, refer to the embodiment shown in FIG. 4A-FIG. 4G. Details are not described herein.

In some embodiments, the electronic device 100 may generate a highlight video for a captured original video in a gallery application. In this case, the electronic device 100 may first split the original video to obtain an image stream and an audio stream, and then perform step 902 to step 905, step 907, and step 908 based on the image stream, to generate the highlight video.

In a possible implementation, the electronic device 100 may store a third video. The original video may include a fifth video segment and a sixth video segment. An end moment of the fifth video segment is earlier than or equal to a start moment of the sixth video segment. The third video includes the fifth video segment and the sixth video segment. Both the fifth video segment and the sixth video segment include a same photographing subject. For example, both the fifth video segment and the sixth video segment include a photographing subject of character. In this way, segments of a same photographing subject may be extracted from the original video to generate a highlight video, to improve viewing experience of the video recorded by the user.

According to the video processing method provided in this embodiment of this application, scene analysis and scene transition analysis may be performed on a video recorded by the user, an invalid segment (for example, scene switching, picture zooming, quick camera movement of a picture, or severe jerkiness of a picture) may be deleted from the recorded video, a plurality of highlight video segments may be edited from the recorded video, and the plurality of highlight video segments may be fused into one highlight video. In this way, viewing experience of the video recorded by the user can be improved.

Figure 12:
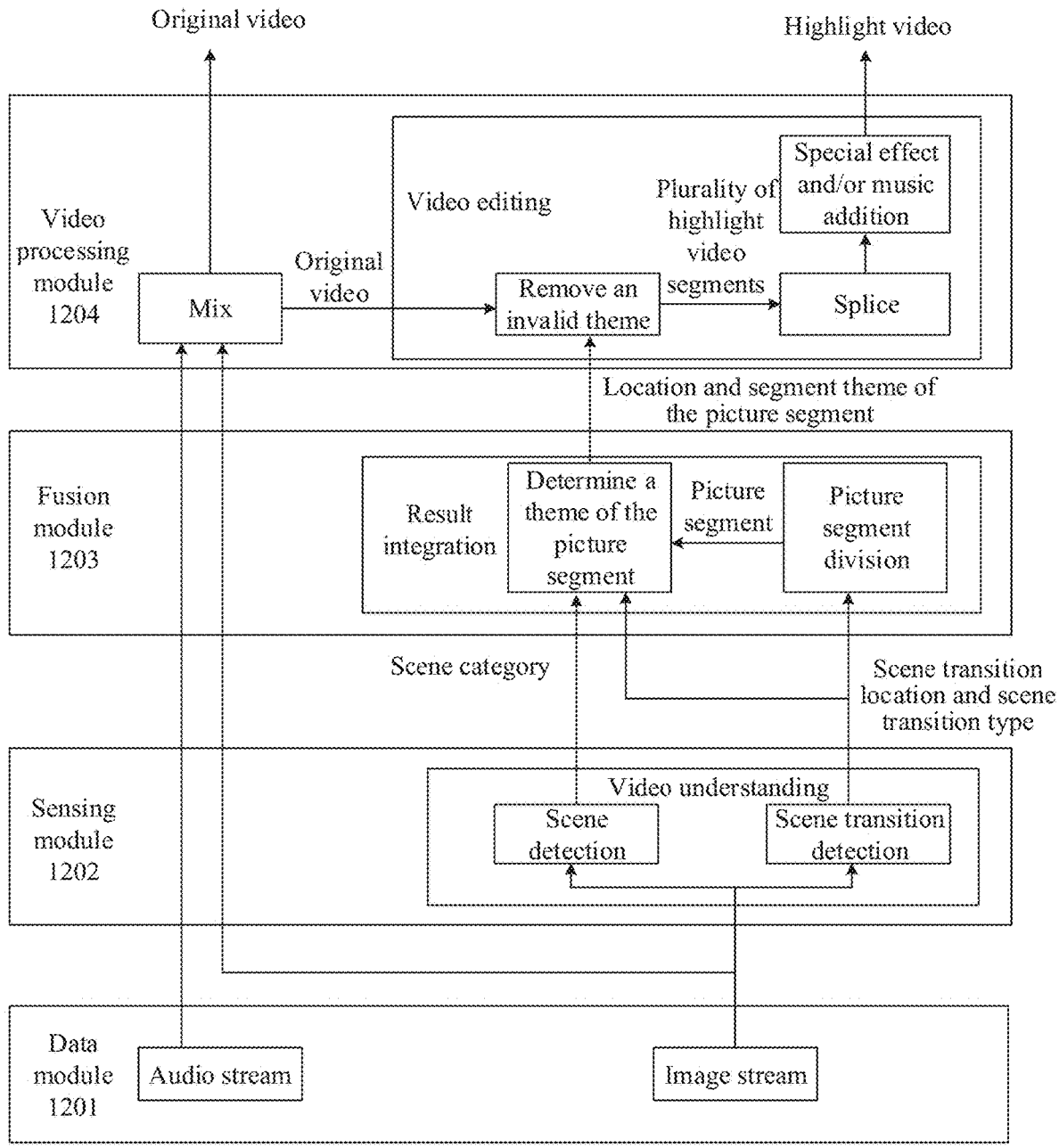
FIG. 12 is a schematic diagram of a module in a video processing system according to an embodiment of this application.

FIG. 12 is a diagram of a functional module in a video processing system according to an embodiment of this application.

As shown in FIG. 12, the video processing system 1200 may include a data module 1201, a sensing module 1202, a fusion module 1203, and a video processing module 1204.

The data module 1201 is configured to obtain an image stream and an audio stream existing when a video is recorded. The data module 1201 may transmit the image stream to the sensing module 1202, and transmit the image stream and the audio stream to the video processing module 1204.

The sensing module 1202 may perform video understanding on the image stream. The video understanding includes scene transition detection and scene detection. Specifically, the sensing module 1202 may perform scene detection on the image stream, to recognize a scene category of each picture frame in the image stream. The sensing module 1202 may perform scene transition detection on the image stream, to recognize a scene transition location at which scene transition occurs in the image stream and a scene transition type. For specific content of the scene transition detection and the scene detection performed on the image stream, refer to step S902 and step S903 in the embodiment shown in FIG. 9. Details are not described herein.

The sensing module 1202 may transmit the scene category of each picture frame, the scene transition location at which scene transition occurs in the image stream, and the scene transition category to the fusion module 1203.

The fusion module 1203 may divide the image stream into a plurality of picture segments based on the scene transition location at which scene transition occurs in the image stream. The fusion module 1203 may determine a segment theme of each of the plurality of picture segments based on the scene transition location at which scene transition occurs, the scene transition type, and the scene category of each picture frame. For specific content, refer to step S905 in the embodiment shown in FIG. 9. Details are not described herein.

The fusion module 1203 may present locations and segment themes of the plurality of picture segments to the video processing module 1204.

The video processing module 1204 may mix the audio stream and the image stream into an original video. The video processing module 1204 may remove a picture segment themed "invalid" from the original video based on the locations and the segment themes of the plurality of picture segments, to extract a plurality of highlight video segments. For specific content, refer to step S906 and step S907 in the embodiment shown in FIG. 9. Details are not described herein.

The video processing module 1204 may fuse the plurality of highlight video segments into one highlight video. A fusion process includes: splicing the highlight video segments, adding a special effect, adding music, and the like. For specific content, refer to step S908 in the embodiment shown in FIG. 9. Details are not described herein.

The video processing module 1204 may output the original video and the highlight video.

Figure 13:
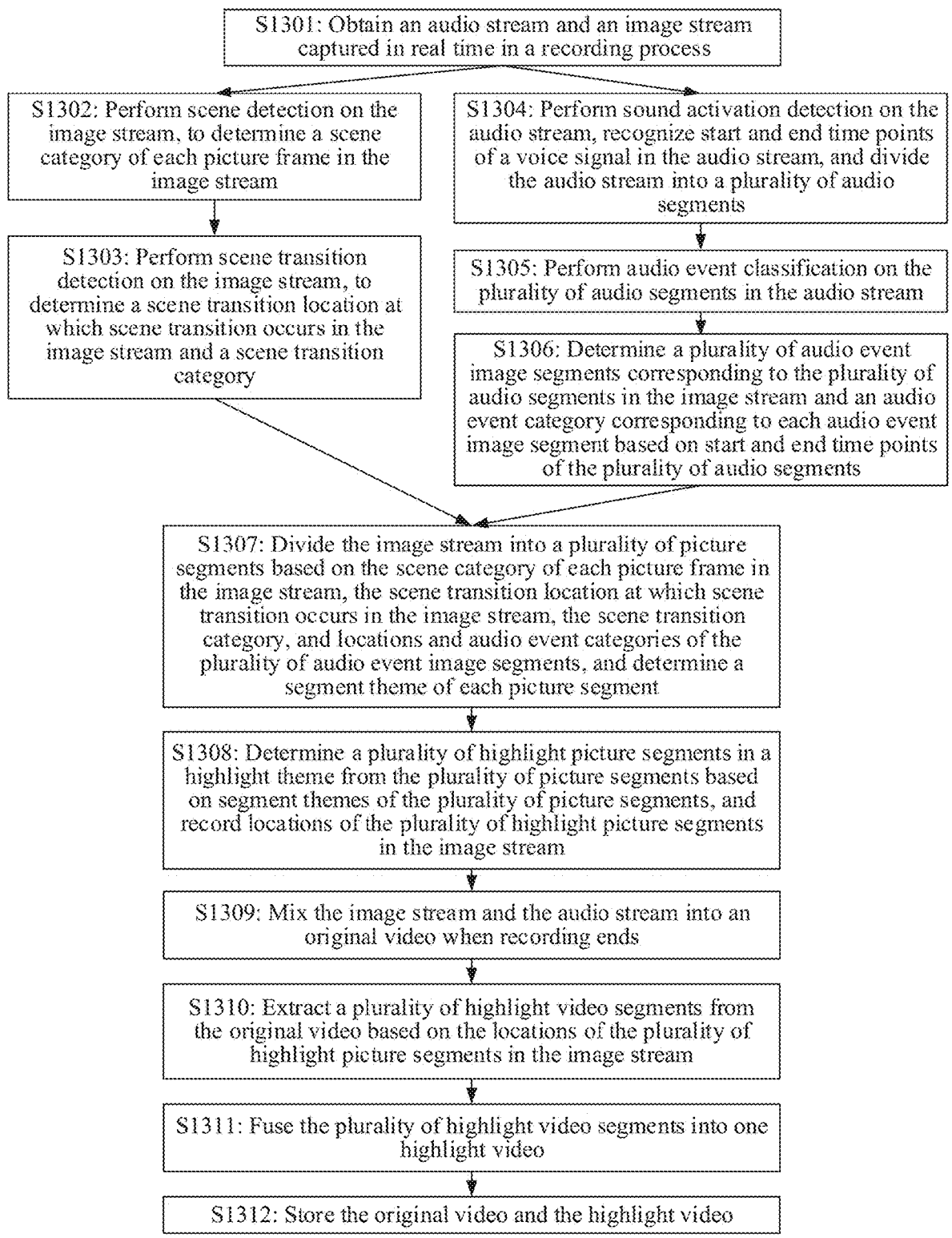
FIG. 13 is a schematic flowchart of a video processing method according to another embodiment of this application.

FIG. 13 is a schematic flowchart of a video processing method according to another embodiment of this application.

As shown in FIG. 13, the video processing method includes the following steps.

S1301: An electronic device 100 obtains an audio stream and an image stream captured in real time in a recording process.

For specific content, refer to step S901 in the embodiment shown in FIG. 9. Details are not described herein.

S1302: The electronic device 100 performs scene detection on the image stream, to determine a scene category of each picture frame in the image stream.

For specific content, refer to step S902 in the embodiment shown in FIG. 9. Details are not described herein.

S1303: The electronic device 100 performs scene transition detection on the image stream, to determine a scene transition location at which scene transition occurs in the image stream and a scene transition category.

For specific content, refer to step S903 in the embodiment shown in FIG. 9. Details are not described herein.

In this embodiment of this application, an execution sequence of step S1302 and step S1303 is not limited. Step S1302 may be performed first, step S1303 may be performed first, or step S1302 and step S1303 may be performed in parallel.

S1304: The electronic device 100 performs sound activation detection on the audio stream, recognizes start and end time points of a voice signal in the audio stream, and divides the audio stream into a plurality of audio segments.

The electronic device 100 may slice the voice signal in a sliding window, and detect an audio feature of an audio signal and the voice signal in the sliding window. The electronic device 100 may recognize the start and end time points of the voice signal in the image stream based on the audio feature in the image stream. The electronic device 100 may divide the audio stream into a plurality of audio segments based on the start and end time points of the voice signal in the audio stream. The audio feature may include a feature such as a spectral slope, a correlation coefficient, a log likelihood ratio, a cepstral coefficient, or a weighted cepstral coefficient.

S1305: The electronic device 100 performs audio event classification on the plurality of audio segments in the audio stream.

The electronic device 100 may recognize an audio event category of the audio segment by using a trained audio event classification model. For training of the audio event classification model, a data set may be established in advance by using a large amount of data for which an audio signal and an audio event category are marked. Then, the data set is input to the audio event classification model to train the audio event classification model. A neural network used for the scene transition recognition model is not limited, for example, may be a recurrent neural network (RNN) classification model or a long short-term memory (LSTM) artificial neural network classification model.

The audio event type may include a speech sound, laughter, music, noise, or the like. Optionally, the noise may be subdivided into a vehicle traveling sound, an animal sound, a birdcall, a dog barking sound, a wind sound, and the like.

S1306: The electronic device 100 determines a plurality of audio event image segments corresponding to the plurality of audio segments in the image stream and an audio event category corresponding to each audio event image segment based on start and end time points of the plurality of audio segments.

S1307: The electronic device 100 divides the image stream into a plurality of picture segments based on the scene category of each picture frame in the image stream, the scene transition location at which scene transition occurs in the image stream, the scene transition category, and locations and audio event categories of the plurality of audio event image segments, and determines a segment theme of each picture segment.

Specifically, the electronic device 100 may divide the image stream into a plurality of picture segments based on the locations of the audio event image segments and the scene transition location at which scene transition occurs in the image stream. A union set of the locations of the audio event image segments and the scene transition location may be collected to divide the image stream into a plurality of picture segments.

Then, the electronic device 100 may determine the theme of each picture segment based on a scene category corresponding to each picture segment, the scene transition category, and the audio event type.

Figure 14:
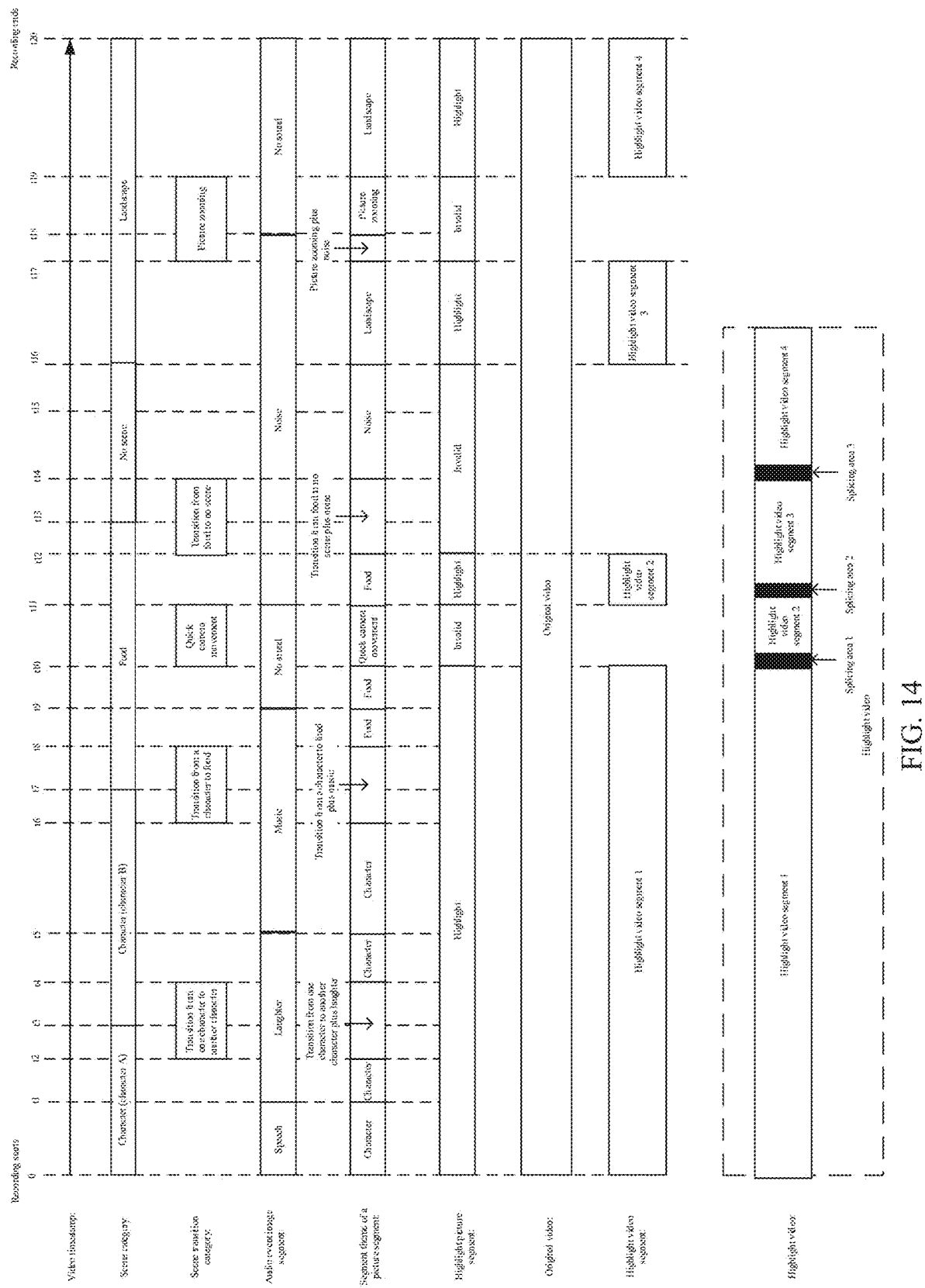
FIG. 14 is a schematic diagram of a time sequence for generating a highlight video according to another embodiment of this application.

For example, as shown in FIG. 14, a time length of an original video may be 0~t20. A result of recognizing the scene category in the image stream may be as follows: A scene category of a segment from 0 to t3 in the image stream is "character (character A)", a scene category of a segment from t3 to t7 in the image stream is "character (character B)", a scene category of a segment from t7 to t13 in the image stream is "food", a scene category of a segment from t13 to t16 in the image stream is "no scene", and a scene category of a segment from t16 to t20 in the image stream is "landscape".

A result of recognizing scene transition in the image stream may be as follows: A scene transition category of a segment from t2 to t4 in the image stream is "transition from a character to a character", a scene transition category of a segment from 16 to t8 in the image stream is "transition from a character to food", a scene transition category of a segment from t10 to t11 in the image stream is "quick camera movement", a scene transition category of a segment from t12 to t14 in the image stream is "transition from food to no scene", and a scene transition category of a segment from t17 to t19 in the image stream is "picture zooming".

The locations of the audio event image segments and a result of recognizing the audio event category in the image stream may be as follows: An audio event category of a segment from t0 to t1 in the image stream is "speech", an audio event category of a segment from t1 to t5 in the image stream is "laughter", an audio event category of a segment from t5 to t9 in the image stream is "music", an audio event category of a segment from 19 to t11 in the image stream is "no sound", an audio event category of a segment from t11 to t18 in the image stream is "noise", and an audio event category of a segment from t18 to t20 in the image stream is "no sound".

Division of the image stream into picture segments and the segment theme may be as follows: The image stream may be divided into a picture segment from t0 to t1, a picture segment from t1 to t2, a picture segment from t2 to t4, a picture segment from t4 to t5, a picture segment from t5 to t6, a picture segment from t6 to t8, a picture segment from t8 to t9, a picture segment from t9 to t10, a picture segment from t10 to t11, a picture segment from t11 to t12, a picture segment from t12 to t14, a picture segment from t14 to t16, a picture segment from t16 to t17, a picture segment from t17 to t18, a picture segment from t18 to t19, and a picture segment from t19 to t20. A segment theme of the picture segment from t0 to t1 is "character", a segment theme of the picture segment from t1 to t2 is "character", a segment theme of the picture segment from t2 to t4 is "transition from a character to a character plus laughter", a segment theme of the picture segment from t4 to t5 is "character", a segment theme of the picture segment from t5 to t6 is "character", a segment theme of the picture segment from t6 to t8 is "transition from a character to food plus music", a segment theme of the picture segment from 8 to t9 is "food", a segment theme of the picture segment from t9 to t10 is "food", a segment theme of the picture segment from t10 to t11 is "quick camera movement", a segment theme of the picture segment from t11 to t12 is "food", a segment theme of the picture segment from t12 to t14 is "transition from food to no scene plus noise", a segment theme of the picture segment from t14 to t16 is "noise", a segment theme of the picture segment from t16 to t17 is "landscape", a segment theme of the picture segment from t17 to t18 is "picture zooming plus noise", a segment theme of the picture segment from t18 to t19 is "picture zooming", and a segment theme of the picture segment from t19 to t20 is "landscape".

S1308: The electronic device 100 determines a plurality of highlight picture segments in a highlight theme from the plurality of picture segments based on segment themes of the plurality of picture segments, and records locations of the plurality of highlight picture segments in the image stream.

The electronic device 100 may determine a picture segment in a preset highlight theme in the plurality of picture segments as a highlight picture segment.

The electronic device 100 may determine a picture segment that includes only scene transition and includes no valid sound (for example, speech, laughter, or music) and a picture segment that includes no valid sound, no scene transition, and no scene category as invalid segments, and determine a picture segment other than the invalid segment in the plurality of picture segments as a highlight picture segment.

For example, as shown in FIG. 14, the electronic device 100 may determine the picture segment from t0 to t1, the picture segment from t1 to t2, the picture segment from t2 to t4, the picture segment from t4 to t5, the picture segment from t5 to t6, the picture segment from t6 to t8, the picture segment from t8 to t9, and the picture segment from t9 to t10 as highlight picture segments, determine the picture segment from t10 to t11 as an invalid segment, determine the picture segment from t11 to t12 as a highlight picture segment, determine the picture segment from t12 to t14 and the picture segment from t14 to t16 as invalid segments, determine the picture segment from t16 to t17 as a highlight picture segment, determine the picture segment from t17 to t18 and the picture segment from t18 to t19 as invalid segments, and determine the picture segment from t19 to t20 as a highlight picture segment.

S1309: The electronic device 100 mixes the image stream and the audio stream into an original video when recording ends.

S1310: The electronic device 100 extracts a plurality of highlight video segments from the original video based on the locations of the plurality of highlight picture segments in the image stream.

As shown in FIG. 14, the picture segment from t0 to t1, the picture segment from t1 to t2, the picture segment from t2 to t4, the picture segment from t4 to t5, the picture segment from t5 to t6, the picture segment from t6 to t8, the picture segment from t8 to t9, and the picture segment from t9 to t10 are continuous and are all highlight picture segments, and therefore the electronic device 100 may determine a video segment from t0 to t10 in the original video as a highlight video segment 1; the picture segment from t11 to t12 is a highlight picture segment, and therefore the electronic device 100 determines a video segment from t11 to t12 in the original video as a highlight video segment 2: the picture segment from t16 to t17 is a highlight picture segment, and therefore the electronic device 100 determines a video segment from t16 to t17 in the original video as a highlight video segment 3; and the picture segment from t19 to t20 is a highlight picture segment, and therefore the electronic device 100 determines a video segment from t19 to t20 in the original video as a highlight video segment 4.

S1311: The electronic device 100 fuses the plurality of highlight video segments into one highlight video.

S1312: The electronic device 100 stores the original video and the highlight video.

The electronic device 100 may directly splice the plurality of highlight video segments into one highlight video in a time sequence.

In a possible implementation, in a splicing process, the electronic device 100 may add a video special effect to a splicing area of the highlight video segments, to implement video transition. The video special effect may include a picture special effect. Optionally, the video special effect may further include an audio special effect.

In the splicing area, a time area may be added between an end location of a former highlight video segment and a start location of a latter highlight video segment in the two highlight video segments. For example, as shown in FIG. 14, there may be a splicing area 1 between an end location of the highlight video segment 1 and a start position of the highlight video segment 2, there may be a splicing area 2 between an end location of the highlight video segment 2 and a start position of the highlight video segment 3, and there may be a splicing area 3 between an end location of the highlight video segment 3 and a start position of the highlight video segment 4.

In a possible implementation, the splicing area may be an area including an end part area (for example, an end 500-ms part) of the former highlight video segment and a start part area (for example, a start 500-ms part) of the latter highlight video segment in the two highlight video segments. For details, refer to the embodiment shown in FIG. 11. Details are not described herein.

The picture special effect in the splicing area may include fly-in, fly-out, picture fusion of two adjacent highlight video segments, or the like. For example, in a splicing area of two highlight video segments, a picture of a former highlight video segment may gradually fly out of a video display window from a left side, and a picture of a latter highlight video segment may gradually fly into the video display window from a right side.

The audio special effect in the splicing area may include absolute music, a song, or the like. In a possible implementation, when the splicing area may be an area including an end part area of the former highlight video segment and a start part area (for example, a start 500-ms part) of the latter highlight video segment in the two highlight video segments, the electronic device 100 may gradually decrease audio volume of the former highlight video segment, and gradually increase audio volume of the latter highlight video segment in the splicing area.

In a possible implementation, the electronic device 100 may select, based on segment themes corresponding to the two highlight video segments before and after the splicing area, a video special effect to be used in the splicing area.

In a possible implementation, after splicing the plurality of highlight video segments into one highlight video in a time sequence, the electronic device 100 may add background music to the highlight video. Optionally, the electronic device 100 may select the background music based on segment themes of the plurality of highlight video segments. For example, the electronic device 100 may select a segment theme that appears for a longest time from the segment themes of the plurality of highlight video segments as a theme of the highlight video, select music corresponding to the theme of the highlight video as the background music based on the theme of the highlight video, and add the background music to the highlight video.

In a possible implementation, the electronic device 100 may separately add music to the plurality of highlight video segments based on segment themes of the plurality of highlight video segments, and then splice, in a time sequence, the plurality of highlight video segments obtained after the music is added into one highlight video.

According to the video processing method provided in this embodiment of this application, scene analysis, scene transition analysis, and audio event analysis may be performed on a video recorded by a user, an invalid segment may be deleted from the recorded video, a plurality of highlight video segments may be edited from the recorded video, and the plurality of highlight video segments may be fused into one highlight video. In this way, viewing experience of the video recorded by the user can be improved.

Figure 15:
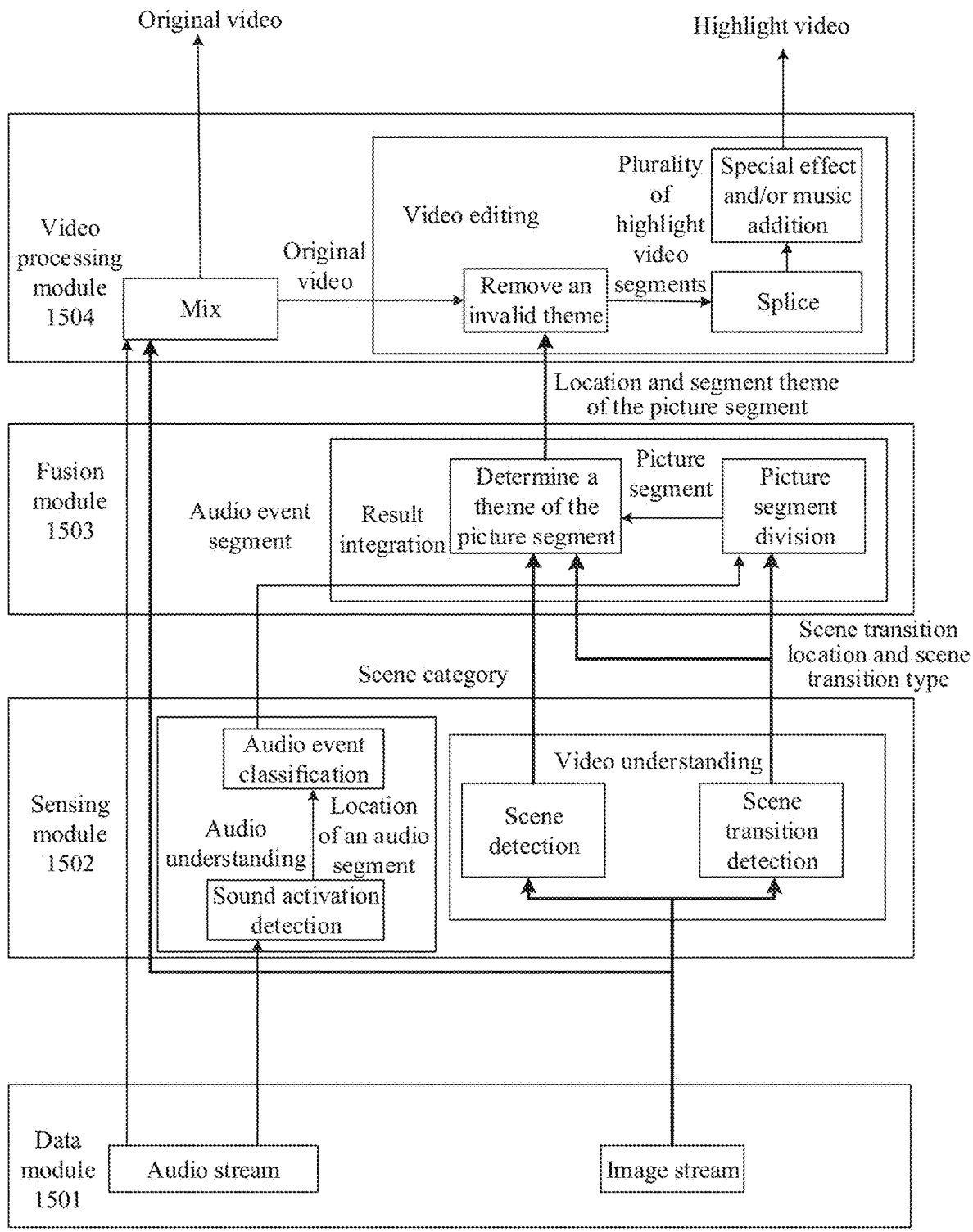
FIG. 15 is a schematic diagram of a module in a video processing system according to another embodiment of this application.

FIG. 15 is a diagram of a functional module in a video processing system according to an embodiment of this application.

As shown in FIG. 15, the video processing system 1500 may include a data module 1501, a sensing module 1502, a fusion module 1503, and a video processing module 1504.

The data module 1501 is configured to obtain an image stream and an audio stream existing when a video is recorded. The data module 1501 may transmit the image stream and the audio stream to the sensing module 1502, and transmit the image stream and the audio stream to the video processing module 1504.

The sensing module 1502 may perform video understanding on the image stream. The video understanding includes scene transition detection and scene detection. Specifically, the sensing module 1502 may perform scene detection on the image stream, to recognize a scene category of each picture frame in the image stream. The sensing module 1502 may perform scene transition detection on the image stream, to recognize a scene transition location at which scene transition occurs in the image stream and a scene transition type. For specific content of the scene transition detection and the scene detection performed on the image stream, refer to step S1302 and step S1303 in the embodiment shown in FIG. 13. Details are not described herein.

The sensing module 1502 may further perform audio understanding on the audio stream. The audio understanding includes sound activation detection and audio event classification. Specifically, the sensing module 1502 may perform sound activation detection on the audio stream, recognize start and end time points of a voice signal in the audio stream, and divide the audio stream into a plurality of audio segments. The sensing module 1502 may perform audio event classification on the plurality of audio segments in the audio stream. For specific content of the sound activation detection and the audio event classification performed on the audio stream, refer to step S1304 and step S1305 in the embodiment shown in FIG. 13. Details are not described herein.

The sensing module 1502 may transmit the scene category of each picture frame, the scene transition location at which scene transition occurs in the image stream, the scene transition category, and locations and audio event types of the audio segments to the fusion module 1503.

The fusion module 1503 may divide the image stream into a plurality of picture segments based on locations of audio event image segments corresponding to the audio segments and the scene transition location at which scene transition occurs in the image stream. The fusion module 1503 may determine a theme of each picture segment based on a scene category corresponding to each picture segment, the scene transition category, and the audio event type. For specific content, refer to step S1307 in the embodiment shown in FIG. 13. Details are not described herein.

The fusion module 1503 may present locations and segment themes of the plurality of picture segments to the video processing module 1504.

The video processing module 1504 may mix the audio stream and the image stream into an original video. The video processing module 1504 may remove a picture segment themed "invalid" from the original video based on the locations and the segment themes of the plurality of picture segments, to extract a plurality of highlight video segments. For specific content, refer to step S1308 to step S1310 in the embodiment shown in FIG. 13. Details are not described herein.

The video processing module 1504 may fuse the plurality of highlight video segments into one highlight video. A fusion process includes: splicing the highlight video segments, adding a special effect, adding music, and the like. For specific content, refer to step S1311 in the embodiment shown in FIG. 13. Details are not described herein.

The video processing module 1504 may output the original video and the highlight video.

The foregoing embodiments are merely used to describe the technical solutions of this application, but are not intended to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A video processing method, comprising:
  displaying, by an electronic device, a video album interface, wherein the video album interface comprises options of one or more video files, the one or more video files including a first video;
  detecting, by the electronic device, a first input for the first video;
  in response to the first input, displaying, by the electronic device, a first interface, wherein the first interface comprises a display area of the first video and a first control, wherein the first control is used to generate a second video from the first video;

detecting, by the electronic device, a second input for the first control;

in response to the second input, displaying, by the electronic device, a second interface, wherein the second interface comprises a display area of the first video and a first window, wherein the first window is used to indicate generation progress of the second video; and after the second video is generated, displaying, by the electronic device, a third interface, wherein the third interface comprises a display area of the second video;

wherein the first video comprises a first video segment, a second video segment, and a third video segment, an end moment of the first video segment is earlier than or equal to a start moment of the second video segment, and an end moment of the second video segment is earlier than or equal to a start moment of the third video segment; and wherein the second video comprises the first video segment and the third video segment, and does not comprise the second video segment.

2. The method according to claim 1, wherein a duration of the first video is greater than a duration of the second video;

wherein the duration of the first video is less than the duration of the second video; or wherein the duration of the first video is equal to the duration of the second video.

3. The method according to claim 1, wherein before the displaying, by the electronic device, the third interface, the method further comprises:

splicing, by the electronic device, the first video segment and the third video segment in the first video, to obtain the second video.

4. The method according to claim 3, wherein the splicing, by the electronic device, the first video segment and the third video segment in the first video, to obtain the second video comprises:

splicing, by the electronic device, an end location of the first video segment and a start location of the third video segment, to obtain the second video; or splicing, by the electronic device, the end moment of the first video segment and a start moment of a first special effect segment, and splicing an end moment of the first special effect segment and the start moment of the third video segment, to obtain the second video.

5. The method according to claim 1, wherein the first video segment and the third video segment are highlight video segments, and the second video segment is an invalid video segment.

6. The method according to claim 1, wherein the first video further comprises a fourth video segment; and wherein:

based on the fourth video segment being a highlight video segment, the second video comprises the fourth video segment; or based on the fourth video segment being an invalid video segment, the second video does not comprise the fourth video segment.

7. The method according to claim 5, wherein a highlight video segment comprises a video segment in which a photographing scene is a highlight scene and does not comprise a scene transition segment.

8. The method according to claim 5, wherein a highlight video segment comprises a video segment in which a photographing scene is a highlight scene and does not comprise a scene transition segment with noise or without sound.

9. The method according to claim 7, wherein the highlight scene comprises one or more of a character, a landscape, food, Spring Festival, Christmas, a building, a beach, fireworks, a plant, a snow scene, or a traveling scene.

10. The method according to claim 1, wherein the third interface further comprises a share control and an edit control, wherein the share control is used to share the second video, and wherein the edit control is used to edit the second video.

11. The method according to claim 1, wherein the third interface further comprises a display area of the first video; and wherein in response to a third input on the display area of the second video, the display area of the first video zooms out, and the display area of the second video zooms in.

12. The method according to claim 1, wherein before the displaying, by the electronic device, the video album interface, the method further comprises:

displaying, by the electronic device, a photographing interface, wherein the photographing interface comprises a preview box and a recording start control, and wherein a picture captured by a camera of the electronic device in real time is displayed in the preview box;

detecting, by the electronic device, a fourth input for the recording start control;

in response to the fourth input, starting, by the electronic device, to record the first video;

displaying, by the electronic device, a recording interface, wherein the recording interface comprises a recording end control and a video picture that is of the first video and that is recorded by the electronic device in real time;

detecting, by the electronic device, a fifth input for the recording end control;

ending, by the electronic device, recording of the first video in response to the fifth input; and storing, by the electronic device, the first video.

13. The method according to claim 12, wherein the recording interface further comprises a snapshot control, and when the electronic device displays the recording interface, the method further comprises:

receiving, by the electronic device, a sixth input from for the snapshot control; and in response to the sixth input, storing, by the electronic device as a first image, a first video picture that is of the first video and that is captured by the camera of the electronic device when the sixth input is received.

14. The method according to claim 12, wherein after the detecting the fourth input for the recording start control, the method further comprises:

capturing, by the electronic device, an image stream of the first video in real time by using the camera, and capturing an audio stream of the first video in real time by using a microphone;

performing, by the electronic device, scene detection on the image stream of the first video, to determine a scene category of each picture frame in the image stream of the first video;

performing, by the electronic device, scene transition detection on the image stream of the first video, to determine a scene transition location at which scene transition occurs in the image stream of the first video and a scene transition category;

dividing, by the electronic device, the image stream of the first video into a plurality of picture segments based on the scene category of each picture frame in the image stream of the first video, the scene transition location at which scene transition occurs in the image stream of the first video, and the scene transition category, and determining a segment theme of each picture segment of the plurality of picture segments;

determining, by the electronic device, a plurality of highlight picture segments in a highlight theme from the plurality of picture segments based on segment themes of the picture segments, and recording locations of the plurality of highlight picture segments in the image stream of the first video;

mixing, by the electronic device, the image stream of the first video and the audio stream of the first video into the first video after the electronic device detects the fifth input for the recording end control;

extracting, by the electronic device, the first video segment and the third video segment from an original video based on the locations of the plurality of highlight picture segments in the image stream of the first video; and generating, by the electronic device, the second video based on the first video segment and the third video segment.

15. The method according to claim 13, wherein after the detecting the fourth input for the recording start control, the method further comprises:

capturing, by the electronic device, an image stream of the first video in real time by using the camera, and capturing an audio stream of the first video in real time by using a microphone;

performing, by the electronic device, scene detection on the image stream of the first video, to determine a scene category of each picture frame in the image stream of the first video;

performing, by the electronic device, scene transition detection on the image stream of the first video, to determine a scene transition location at which scene transition occurs in the image stream of the first video and a scene transition category;

dividing, by the electronic device, the image stream of the first video into a plurality of picture segments based on the scene category of each picture frame in the image stream of the first video, the scene transition location at which scene transition occurs in the image stream of the first video, and the scene transition category, and determining a segment theme of each picture segment of the plurality of picture segments;

determining, by the electronic device, a plurality of highlight picture segments in a highlight theme from the plurality of picture segments based on segment themes of the picture segments, and recording locations of the plurality of highlight picture segments in the image stream of the first video;

mixing, by the electronic device, the image stream of the first video and the audio stream of the first video into the first video after the electronic device detects the fifth input for the recording end control;

extracting, by the electronic device, the first video segment and the third video segment from an original video based on the locations of the plurality of highlight picture segments in the image stream of the first video; and generating, by the electronic device, the second video based on the first video segment and the third video segment.

16. The method according to claim 12, wherein after the detecting the fourth input for the recording start control, the method further comprises:

capturing, by the electronic device, an image stream of the first video in real time by using the camera, and capturing an audio stream of the first video in real time by using a microphone;

performing, by the electronic device, scene detection on the image stream of the first video, to determine a scene category of each picture frame in the image stream of the first video;

performing, by the electronic device, scene transition detection on the image stream of the first video, to determine a scene transition location at which scene transition occurs in the image stream of the first video and a scene transition category;

performing, by the electronic device, sound activation detection on the audio stream of the first video, recognizing start and end time points of a voice signal in the audio stream of the first video, and dividing the audio stream of the first video into a plurality of audio segments based on the start and end time points of the voice signal;

performing, by the electronic device, audio event classification on the plurality of audio segments in the audio stream of the first video, and determining an audio event type of each audio segment of the plurality of audio segments;

dividing, by the electronic device, the image stream of the first video into a plurality of picture segments based on the scene category of each picture frame in the image stream of the first video, the scene transition location at which scene transition occurs in the image stream of the first video, and the scene transition category, and determining a segment theme of each of the plurality of picture segments;

determining, by the electronic device, a plurality of audio event image segments corresponding to the plurality of audio segments in the image stream of the first video and an audio event type corresponding to each audio event image segment based on start and end time points of the plurality of audio segments and the segment theme of each of the plurality of picture segments;

dividing, by the electronic device, the image stream of the first video into a plurality of picture segments based on the scene category of each picture frame in the image stream of the first video, the scene transition location at which scene transition occurs in the image stream of the first video, the scene transition category, and audio event categories of the plurality of audio event image segments, and determining a segment theme of each of the plurality of picture segments;

mixing, by the electronic device, the image stream of the first video and the audio stream of the first video into the first video after the electronic device detects the fifth input for the recording end control;

extracting, by the electronic device, the first video segment and the third video segment from the first video based on locations of the plurality of highlight picture segments in the image stream of the first video; and generating, by the electronic device, the second video based on the first video segment and the third video segment.

17. The method according to claim 13, wherein after the detecting the fourth input for the recording start control, the method further comprises:

capturing, by the electronic device, an image stream of the first video in real time by using the camera, and capturing an audio stream of the first video in real time by using a microphone;

performing, by the electronic device, scene detection on the image stream of the first video, to determine a scene category of each picture frame in the image stream of the first video;

performing, by the electronic device, scene transition detection on the image stream of the first video, to determine a scene transition location at which scene transition occurs in the image stream of the first video and a scene transition category;

performing, by the electronic device, sound activation detection on the audio stream of the first video, recognizing start and end time points of a voice signal in the audio stream of the first video, and dividing the audio stream of the first video into a plurality of audio segments based on the start and end time points of the voice signal;

performing, by the electronic device, audio event classification on the plurality of audio segments in the audio stream of the first video, and determining an audio event type of each audio segment of the plurality of audio segments;

dividing, by the electronic device, the image stream of the first video into a plurality of picture segments based on the scene category of each picture frame in the image stream of the first video, the scene transition location at which scene transition occurs in the image stream of the first video, and the scene transition category, and determining a segment theme of each of the plurality of picture segments;

determining, by the electronic device, a plurality of audio event image segments corresponding to the plurality of audio segments in the image stream of the first video and an audio event type corresponding to each audio event image segment based on start and end time points of the plurality of audio segments and the segment theme of each of the plurality of picture segments;

dividing, by the electronic device, the image stream of the first video into a plurality of picture segments based on the scene category of each picture frame in the image stream of the first video, the scene transition location at which scene transition occurs in the image stream of the first video, the scene transition category, and audio event categories of the plurality of audio event image segments, and determining a segment theme of each of the plurality of picture segments;

mixing, by the electronic device, the image stream of the first video and the audio stream of the first video into the first video after the electronic device detects the fifth input for the recording end control;

extracting, by the electronic device, the first video segment and the third video segment from the first video based on locations of the plurality of highlight picture segments in the image stream of the first video; and generating, by the electronic device, the second video based on the first video segment and the third video segment.

18. The method according to claim 14, wherein after the generating, by the electronic device, the second video, the method further comprises:

adding, by the electronic device, background music to the second video; and storing, by the electronic device, the second video obtained after the background music is added.

19. An electronic device, comprising:

a display;

one or more processors; and one or more memories, wherein the one or more memories are coupled to the one or more processors, the one or more memories are configured to store computer program code, the computer program code comprises computer instructions, and when the one or more processors execute the computer instructions, the electronic device is enabled to perform operations comprising:

displaying a video album interface on the display, wherein the video album interface comprises options of one or more video files, the one or more video files including a first video;

detecting a first input for the first video;

in response to the first input, displaying a first interface on the display, wherein the first interface comprises a display area of the first video and a first control, wherein the first control is used to generate a second video from the first video;

detecting a second input for the first control;

in response to the second input, displaying a second interface on the display, wherein the second interface comprises a display area of the first video and a first window, wherein the first window is used to indicate generation progress of the second video; and after the second video is generated, displaying a third interface on the display, wherein the third interface comprises a display area of the second video;

wherein the first video comprises a first video segment, a second video segment, and a third video segment, an end moment of the first video segment is earlier than or equal to a start moment of the second video segment, and an end moment of the second video segment is earlier than or equal to a start moment of the third video segment; and wherein the second video comprises the first video segment and the third video segment, and does not comprise the second video segment.

20. A chip system, wherein the chip system is applied to an electronic device, the chip system comprises one or more processors and one or more memories storing computer instructions, and the one or more processors are configured to invoke the computer instructions to enable the electronic device to perform operations comprising:

displaying a video album interface, wherein the video album interface comprises options of one or more video files, the one or more video files including a first video;

detecting a first input for the first video;

in response to the first input, displaying a first interface, wherein the first interface comprises a display area of the first video and a first control, wherein the first control is used to generate a second video from the first video;

detecting a second input for the first control;

in response to the second input, displaying a second interface, wherein the second interface comprises a display area of the first video and a first window, wherein the first window is used to indicate generation progress of the second video; and after the second video is generated, displaying a third interface, wherein the third interface comprises a display area of the second video;

wherein the first video comprises a first video segment, a second video segment, and a third video segment, an end moment of the first video segment is earlier than or equal to a start moment of the second video segment, and an end moment of the second video segment is earlier than or equal to a start moment of the third video segment; and wherein the second video comprises the first video segment and the third video segment, and does not comprise the second video segment.

* * * * *